US012130366B2

(12) United States Patent
Su

(10) Patent No.: US 12,130,366 B2
(45) Date of Patent: Oct. 29, 2024

(54) ERROR MODEL CALIBRATION METHOD AND APPARATUS, ELECTRONIC DEVICE, ERROR MODEL-BASED POSITIONING METHOD AND APPARATUS, TERMINAL, COMPUTER-READABLE STORAGE MEDIUM, AND PROGRAM PRODUCT

(71) Applicant: Tencent Technology (Shenzhen) Company Limited, Guangdong (CN)

(72) Inventor: Jinglan Su, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 239 days.

(21) Appl. No.: 17/973,080

(22) Filed: Oct. 25, 2022

(65) Prior Publication Data

US 2023/0055363 A1 Feb. 23, 2023

Related U.S. Application Data

(63) Continuation of application No. PCT/CN2022/072825, filed on Jan. 19, 2022.

(30) Foreign Application Priority Data

Jan. 27, 2021 (CN) .......................... 202110109222.7

(51) Int. Cl.
*G01S 19/07* (2010.01)
*G01S 19/23* (2010.01)
*G01S 19/25* (2010.01)

(52) U.S. Cl.
CPC .......... *G01S 19/071* (2019.08); *G01S 19/235* (2013.01); *G01S 19/254* (2013.01)

(58) Field of Classification Search
CPC .......... G01S 19/07; G01S 19/08; G01S 19/15; G01S 19/071; G01S 19/072; G01S 19/20;
(Continued)

(56) References Cited

U.S. PATENT DOCUMENTS

| 6,760,582 B2 * | 7/2004 | Gaal | G01S 19/23 |
| | | | 455/67.14 |
| 11,683,684 B2 * | 6/2023 | Lund | H04W 12/033 |
| | | | 726/2 |

(Continued)

FOREIGN PATENT DOCUMENTS

| CN | 109459778 A | 3/2019 |
| CN | 109709591 A | 5/2019 |

(Continued)

OTHER PUBLICATIONS

International Search Report and Written Opinion for priority application No. PCT/CN2022/072825 dated Mar. 29, 2022, in Chinese language, with English language translation of the International Search Report, 10p.

(Continued)

*Primary Examiner* — Andrew Joseph Rudy
(74) *Attorney, Agent, or Firm* — Crowell & Moring LLP

(57) ABSTRACT

An error model calibration method can analyze discrete distribution situations of a pseudo-range measurement error and a Doppler measurement error under different carrier-to-noise ratios and altitude helping to calibrate and improve the universality of error model calibration. Observation data is received and satellite data is acquired based on the observation data. A pseudo-range error array and a Doppler error array are calibrated based on the observation data, geometric (Continued)

parameters, and the satellite data. The pseudo range error array describes errors of two terminals under a carrier-to-noise ratio and altitude angle of a satellite. The Doppler error array describes a discrete distribution of the two terminals. The pseudo-range error models respectively corresponding to the at least two terminals are fit using the pseudo-range error array. The Doppler error models respectively corresponding to the at least two terminals are fit using the Doppler error array.

18 Claims, 15 Drawing Sheets

(58) Field of Classification Search
CPC ...... G01S 19/21; G01S 19/235; G01S 19/254; G01S 19/40; G01S 19/41; G08G 9/02; G08G 5/0013; G08G 5/0021; H04W 4/02; B60W 2050/0078; B60W 2556/50
USPC ...................................... 701/470; 342/357.24
See application file for complete search history.

(56) References Cited

U.S. PATENT DOCUMENTS

| | | | |
|---|---|---|---|
| 2011/0102252 A1* | 5/2011 | Watanabe | G01S 19/40 |
| | | | 342/357.24 |
| 2013/0120187 A1 | 5/2013 | Dai et al. | |
| 2014/0348275 A1 | 11/2014 | Gao | |
| 2019/0187295 A1* | 6/2019 | Lee | G01S 19/072 |

FOREIGN PATENT DOCUMENTS

| | | |
|---|---|---|
| CN | 111221011 A | 6/2020 |
| CN | 111736185 A | 10/2020 |
| CN | 112433236 A | 3/2021 |
| EP | 3009860 A1 | 4/2016 |
| JP | 2016-075646 A | 5/2016 |
| WO | WO 2022/161229 A1 | 8/2022 |

OTHER PUBLICATIONS

Extended European Search Report for corresponding EP application No. 22745104.4 dated Jul. 12, 2024, 8p.

* cited by examiner

ERROR MODEL CALIBRATION METHOD AND APPARATUS, ELECTRONIC DEVICE, ERROR MODEL-BASED POSITIONING METHOD AND APPARATUS, TERMINAL, COMPUTER-READABLE STORAGE MEDIUM, AND PROGRAM PRODUCT

RELATED APPLICATION

This application claims priority as a continuation to PCT/CN2022/072825, filed on Jan. 19, 2022, published as WO2022161229A1, and entitled "ERROR MODEL CALIBRATION METHOD AND APPARATUS, ELECTRONIC DEVICE, ERROR MODEL-BASED POSITIONING METHOD AND APPARATUS, TERMINAL, COMPUTER-READABLE STORAGE MEDIUM, AND PROGRAM PRODUCT," which claims priority to Chinese Patent Application No. 202110109222.7, filed on Jan. 27, 2021, and entitled "ERROR MODEL CALIBRATION METHOD, DEVICE, EQUIPMENT AND COMPUTER READABLE STORAGE MEDIUM," each of which are incorporated herein by reference in their entirety.

FIELD OF THE TECHNOLOGY

This application relates to a satellite positioning technology, and in particular, to an error model calibration method and apparatus, an electronic device, an error model-based positioning method and apparatus, a terminal, a non-transitory computer-readable storage medium, and a program product.

BACKGROUND OF THE DISCLOSURE

Global navigation satellite systems have been widely used in aviation, navigation, communications, personnel tracking, consumption entertainment, mapping, timing, vehicle monitoring and management, vehicle navigation and information services, among others, and the general trend is to provide high-precision services for real-time applications. Since there is an error between a pseudo-range measurement value and a Doppler observation value obtained by a satellite positioning device and real values, it is helpful to determine pseudo-range and Doppler error models before positioning. In can be difficult to implement error model calibration in various types of computers, resulting in low universality of error model calibration.

SUMMARY

Embodiments of this application provide an error model calibration method and apparatus, an electronic device, an error model-based positioning method and apparatus, a terminal, a non-transitory computer-readable storage medium, and a program product, which can improve the universality of error model calibration.

The embodiments of this application provide an error model calibration method. The method includes:
receiving observation data collected by a calibration device, and acquiring satellite data according to the observation data;
calibrating a pseudo-range error array and a Doppler error array, respectively, for at least two terminals in the calibration device based on the observation data, geometric parameters of the calibration device, and satellite data,
the pseudo-range error array describing a discrete distribution of pseudo-range measurement errors of the at least two terminals under a carrier-to-noise ratio and an altitude angle of a satellite, and the Doppler error array describing a discrete distribution of Doppler measurement errors of the at least two terminals under the carrier-to-noise ratio and the altitude angle of the satellite; and
fitting pseudo-range error models respectively corresponding to the at least two terminals by using the pseudo-range error array, and fitting Doppler error models respectively corresponding to the at least two terminals by using the Doppler error array, the pseudo-range error models and the Doppler error models being collectively configured to position the at least two terminals.

The embodiments of this application provide an error model calibration apparatus configured to:
receive observation data collected by a calibration device, and acquire satellite data according to the observation data;
calibrate a pseudo-range error array and a Doppler error array, respectively, for at least two terminals in the calibration device based on the observation data, geometric parameters in the calibration device, and satellite data, the pseudo-range error array describing a discrete distribution of pseudo-range measurement errors of the at least two terminals under a carrier-to-noise ratio and an altitude angle of a satellite, and the Doppler error array describing a discrete distribution of Doppler measurement errors of the at least two terminals under the carrier-to-noise ratio and the altitude angle of the satellite; and
fit pseudo-range error models respectively corresponding to the at least two terminals by using the pseudo-range error array, and fit Doppler error models respectively corresponding to the at least two terminals by using the Doppler error array, the pseudo-range error models and the Doppler error models being collectively configured to position the at least two terminals.

The embodiments of this application provide an error model-based positioning method. The method includes:
acquiring, when a trigger operation is received in a map interface, a pseudo-range error model and a Doppler error model in response to the trigger operation,
the pseudo-range error model being obtained by fitting a pseudo-range error array, the Doppler error model being obtained by fitting a Doppler error array, and the pseudo-range error array and the Doppler error array being determined by an electronic device based on observation data collected by a calibration device, satellite data corresponding to the observation data, and geometric parameters of the calibration device;
determining a current position based on the pseudo-range error model, the Doppler error model, and collected current observation data;
acquiring map information within a position region where the current position is located from a map information database; and
displaying the map information on the map interface, and presenting a positioning identifier on the current position.

The embodiments of this application provide an error model-based positioning apparatus configured to:
acquire, when a trigger operation is received in a map interface, a pseudo-range error model and a Doppler error model in response to the trigger operation, the pseudo-range error model being obtained by fitting a pseudo-range error array, the Doppler error model being obtained by fitting a Doppler error array, and the pseudo-range error array and the Doppler error array being determined by an electronic device based on observation data collected by a calibration device, satellite data corresponding to the observation data, and
geometric parameters of the calibration device;

determine a current position based on the pseudo-range
error model, the Doppler error model, and collected
current observation data;

acquire map information within a position region where
the current position is located from a map information
database; and display the map information on the map interface, and
present a positioning identifier on the current position.

An embodiment of this application provides an electronic
device for error model calibration, including:

a memory, configured to store executable instructions;
a processor, configured to perform the error model calibration method according to the embodiments of this application when executing the executable instructions stored in the first memory.

An embodiment of this application provides a terminal for error model-based positioning, including:

a memory, configured to store executable instructions;
a processor, configured to perform the error model-based positioning method according to the embodiments of this application when executing the executable instructions stored in the second memory.

An embodiment of this application provides a non-transitory computer-readable storage medium storing executable instructions, the executable instructions, when executed by a first processor, implementing the error model calibration method; or, is configured to implement the error model-based positioning method according to the embodiments of this application when executed by a second processor.

An embodiment of this application provides a computer program product including a computer program or instructions, the computer program or instructions being used for, when executed by a first processor, implementing the error model calibration method; or, is configured to implement the error model-based positioning method according to the embodiments of this application when executed by a second processor.

This embodiment of this application may have the following beneficial effects: Based on observation data collected by a calibration device, geometric parameters of various devices in the calibration device, and satellite data extracted according to the observation data, an electronic device can count the distribution of a pseudo-range measurement error and a Doppler measurement error of a terminal, to analyze described discrete distribution situations of the pseudo-range measurement error and the Doppler measurement error of the terminal under different carrier-to-noise ratios and altitude angles respectively, and fit the discrete distribution situations to obtain a pseudo-range error model and a Doppler error model. Thus, the error models of the terminal can be calibrated, thereby improving the universality of error model calibration.

DESCRIPTION OF EMBODIMENTS

Figure 1A:
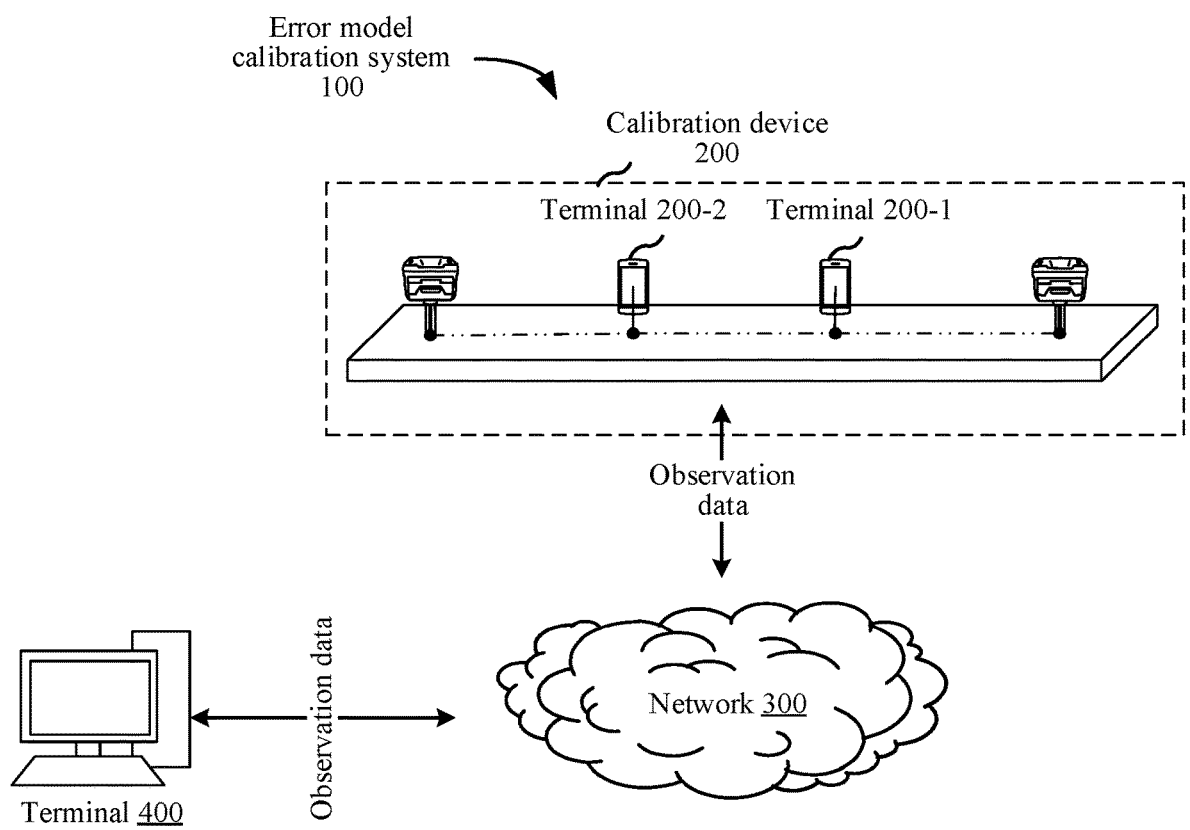
FIG. 1A is an example schematic architectural diagram of an error model calibration system according to some embodiments of this application.

The objectives, technical solutions, and advantages of this application are described below with reference to the accompanying drawings. The described embodiments are merely examples and are not intended to be considered as limiting to this disclosure.

In the following descriptions, related "some embodiments" describe a subset of all possible embodiments. However, it may be understood that the "some embodiments" may be the same subset or different subsets of all the possible embodiments, and may be combined with each other.

In the following descriptions, the included term "first/second/third/fourth" is merely intended to distinguish similar objects, and does not necessarily indicate a specific order of an object. Thus, it should be understood that the order of sequence of "first/second/third/fourth" may be interchangeable if permitted.

Unless otherwise defined, meanings of all technical and scientific terms used in this specification are the same as those usually understood by a person of ordinary skill in the art. Terms used in this specification are merely intended to describe objectives of the embodiments of this application, and are not intended to limit this application.

Before the embodiments of this application are further described in detail, some terms involved in the embodiments of this application are described. The terms provided in the embodiments of this application are applicable to the following explanations.

1) Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, AI is a comprehensive technology in computer science. This technology attempts to understand the essence of intelligence and produce a new intelligent machine that can react in a manner similar to human intelligence. AI is to study the design principles and implementation methods of various intelligent machines, so that the machines can perceive, infer, and make decisions.

2) A global navigation satellite system (GNSS), also referred to as a global satellite navigation system, is a space-based radio navigation positioning system capable of providing users with all-weather, 3-dimensional coordinates, speed, and time information anywhere on the earth's surface or terrestrial space.

Common satellite navigation systems are four satellite navigation systems: a global positioning system (GPS), a BeiDou navigation satellite system (BDS), GLONASS, and GALILEO.

3) A terminal refers to a computer device that may be used in motion, including a mobile phone, a notebook computer, a tablet computer, a point of sale machine, a vehicle-mounted computer, etc. In most cases, the terminal refers to a mobile phone or a smart phone or tablet computer with multiple application functions. With the development of network technology towards broadband, the mobile communication industry will move towards the real mobile information era. With the rapid development of integrated circuit technologies, the terminal already has a powerful processing capability and is turning from a simple communication tool into a comprehensive information processing platform.

The terminal has a very rich communication mode. That is, the terminal may communicate through wireless operation networks such as a global system for mobile communication (GSM), a code division multiple access (CDMA), a wideband code division multiple access (WCDMA), and the 4th generation communication technology (4G), and may also communicate through a wireless local area network, Bluetooth, and infrared light. In addition, the terminal is integrated with a GNSS positioning chip for processing satellite signals and performing accurate positioning of users, which has been widely used for location services.

4) A satellite positioning device is an electronic device for tracking and processing satellite signals, and measuring a geometric distance (pseudo-range observation value) between a device and a satellite and a Doppler effect (Doppler observation value) of the satellite signals. The satellite positioning device generally includes modules such as an antenna, a satellite signal tracking loop, and baseband signal processing.

The terminal integrated with the satellite positioning device can calculate current position coordinates of the terminal according to the pseudo-range observation value and the Doppler observation value. The satellite positioning device is widely used in map navigation, mapping, aerospace, location services, and other fields, such as smart phone map navigation, high-precision geodesy, and civil aviation.

5) An error model represents a functional relationship of error statistical characteristics of the satellite positioning device (variance and standard deviation) about a signal-to-noise ratio, a satellite altitude angle, and other factors. There is an error between a pseudo-range measurement value and a Doppler observation value obtained by the satellite positioning device and real values due to the influences of a multi-path effect, a measurement noise of a receiver, etc. This error is related to a satellite carrier-to-noise ratio, a satellite altitude angle, and other factors.

6) The pseudo-range measurement value is a geometric distance from a satellite signal receiver (for example, satellite positioning device) to a satellite during a satellite positioning process.

7) The Doppler observation value is a Doppler ranging value or Doppler count of a radio signal measured by the satellite signal receiver and transmitted by the satellite. The Doppler ranging value is a value obtained by measuring the distance between two objects according to the Doppler effect.

8) Epochs, belonging to the concept of astronomy, are points of time with some astronomical variables as references, such as celestial coordinates or elliptical orbit elements of celestial bodies. In brief, an epoch refers to an observation time of the satellite signal receiver.

9) A carrier-to-noise ratio is a standard measurement scale of a carrier-to-carrier noise ratio.

10) An altitude angle is an angle between a direction line from a point where the satellite signal receiver is located to a satellite and a horizontal plane.

11) A precise ephemeris refers to satellite orbit information calculated from observation data of several satellite tracking stations. The satellite orbit information may be used for satellite precision positioning.

12) A clock error of a satellite is an error between a clock face of an atomic clock mounted on the satellite and a standard time.

13) A clock error of a device refers to a clock error between the satellite signal receiver and an identified satellite.

The GNSS has been widely used in aviation, navigation, communications, personnel tracking, consumption entertainment, mapping, timing, vehicle monitoring and management, vehicle navigation and information services, etc. and the general trend is to provide high-precision services for real-time applications.

Since there is an error between the pseudo-range measurement value and the Doppler observation value obtained by the satellite positioning device and real values, it is helpful to determine a pseudo-range error model and a Doppler error model before positioning. There are several technologies associated with error model calibration:

In the first mode, a single-difference observation model between satellites is established according to an original observation model so as to establish a double-difference observation model between epochs. Observation values of two adjacent epochs of a selected common satellite are acquired, and observation values of the two adjacent epochs of a receiver are also acquired. Then, a measurement noise of the receiver is determined according to the single-difference observation model, the double-difference observation model between the epochs, the observation values of the two adjacent epochs of the common satellite, and the observation values of the two adjacent epochs of the receiver.

However, this mode uses the single-difference observation model and the double-difference observation model between the epochs to acquire the measurement noise of the receiver, and does not perform statistical analysis on the acquired measurement noise of the receiver. Thus, the statistical characteristics of a pseudo-range measurement error cannot be determined, and a method for analyzing a Doppler measurement noise is not provided, so that the statistical characteristics of a Doppler measurement error cannot be obtained. Thus, it is difficult to apply to the positioning of a mobile terminal, and the universality is poor.

In the second mode, a satellite observation value of a BDS and a pre-adjusted observable residual are acquired, a weight ratio of observation values of different orbit types of the BDS is determined, a pseudo-range observation value noise of each satellite in a current epoch is then calculated in real time according to an original observation value, and an observation value variance matrix is finally calculated in real time by using the weight ratio of observation values and a pseudo-range observation value variance.

However, this mode does not provide a method for analyzing a Doppler observation noise. Thus, a Doppler error model cannot be obtained. It is difficult to apply in a mobile terminal and other devices, and the universality is poor. Meanwhile, the error model obtained in this mode is likely to be affected by the positioning accuracy and tropospheric and ionospheric correction models, and the reliability is poor. Moreover, this mode estimates variance components, the algorithm is complex, the amount of calculation is large, and this mode is not convenient to use.

In the third mode, pseudo-range and phase noises are estimated in real-time by using sliding window and memory attenuation methods based on the degree of dispersion of a difference between a combined observation value and cubic difference phase observation values between epochs during the positioning data processing of the GNSS, and a ratio of the pseudo-range and phase noises is calculated as an index of a pseudo-range-phase weight ratio in a random positioning model.

It can be seen that this mode merely estimates the pseudo-range-phase weight ratio and does not calibrate a pseudo-range error model and a Doppler error model. Thus, it is difficult to apply in the positioning of a mobile terminal (for example, a smart terminal or a vehicle navigation system), and the universality is poor.

In the fourth mode, a station-satellite carrier double-difference observation mode is constructed through carrier phase observation values observed by two receivers simultaneously, a high-precision baseline vector of antenna phase centers of the two receivers is then obtained through fixed ambiguity solution, and the baseline vector is then projected to compensate a baseline influence part in a station-satellite pseudo-range double-difference observation equation, so as to obtain a pseudo-range double-difference residual estimation result.

It can be seen therefrom that this mode is mainly used for evaluating the consistency of pseudo-range measurement of receivers, a method for calibrating a pseudo-range error model and a Doppler error model is not proposed, and the pseudo-range error model and the Doppler error model cannot be obtained. It is difficult to apply in positioning scenarios such as mobile terminals and vehicle navigation systems, and the universality is relatively low.

In the fifth mode, observation values of the GNSS are first acquired, a satellite altitude angle, a satellite azimuth angle, and a carrier-to-noise ratio corresponding to the respective observation values are determined, a weighting function which takes into account the satellite altitude angle, the satellite azimuth angle, and the carrier-to-noise ratio is then constructed, and a random model is constructed by using the weighting function to realize the navigation and positioning of the GNSS.

However, this mode calculates the weights of the observation values of the GNSS according to an error model provided in advance, so that the universality is poor.

It can be seen from the above that a pseudo-range error model and a Doppler error model cannot be provided simultaneously for various types of mobile devices. That is, it is difficult to implement error model calibration in various types of terminals, thus making the universality of error model calibration low. Moreover, often with a pseudo-range error model, the calibration accuracy is low. Thus, the overall accuracy of the error model is low, thereby affecting the positioning accuracy.

Embodiments of this application provide an error model calibration method and apparatus, an electronic device, an error model-based positioning method and apparatus, a terminal, a non-transitory computer-readable storage medium, and a program product, which can improve the universality of error model calibration. The following continues to describe example applications of the electronic device provided in the embodiments of this application.

The electronic device provided in this embodiment of this application may be implemented as a terminal, or may be implemented as a server. The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. A user terminal may be a smartphone, a tablet computer, a notebook computer, a desktop computer, a smart speaker, a smartwatch, or the like, but is not limited thereto. The terminal or the server may be directly or indirectly connected to the calibration device in a wired or wireless communication manner. This is not limited in this application. An example application that the electronic device when being implemented as a terminal is described in the following.

Reference is now made to FIG. 1A. FIG. 1A is an example schematic architectural diagram of an error model calibration system according to an embodiment of this application. In order to support an error model calibration application, in an error model calibration system 100, a calibration device 200 is connected to a terminal 400 through a network 300. The network 300 may be a wide area network or a local area network, or a combination of both.

The calibration device 200 is configured to observe satellites, collect observation data, and transmit the observation data to the terminal 400 through the network 300. In some embodiments, the calibration device 200 includes a terminal 200-1, a terminal 200-2, a first satellite receiver, a second satellite receiver, a fixing apparatus, and a fixture plate, and the terminal 200-1, the terminal 200-2, the first satellite receiver, and the second satellite receiver are all fixed to the fixing plate through the fixing apparatus. A phase center of the terminal 200-1, a phase center of the terminal 200-2, a phase center of the first satellite receiver, and a phase center of the second satellite receiver all remain on the same straight line.

The terminal 400 receives the observation data transmitted by the calibration device 200, acquires satellite data according to the observation data, and then calibrates a pseudo-range error array and a Doppler error array, respectively, for at least two terminals in the calibration device 200, i.e. the terminal 200-1 and the terminal 200-2 based on the observation data, geometric parameters of the calibration device 200, and the acquired satellite data. The pseudo-range error array describes a discrete distribution of pseudo-range measurement errors of the terminal 200-1 and the terminal 200-2 under a carrier-to-noise ratio and an altitude angle of a satellite. The Doppler error array describes a discrete distribution of Doppler measurement errors of the terminal 200-1 and the terminal 200-2 under the carrier-to-noise ratio and the altitude angle of the satellite. The terminal 400 fits pseudo-range error models of the terminal 200-1 and the terminal 200-2 by using the pseudo-range error array, and fits Doppler error models of the terminal 200-1 and the terminal 200-2 by using the Doppler error array. The pseudo-range error models and the Doppler error models are collectively configured to position the terminal 200-1 and the terminal 200-2.

Figure 1B:
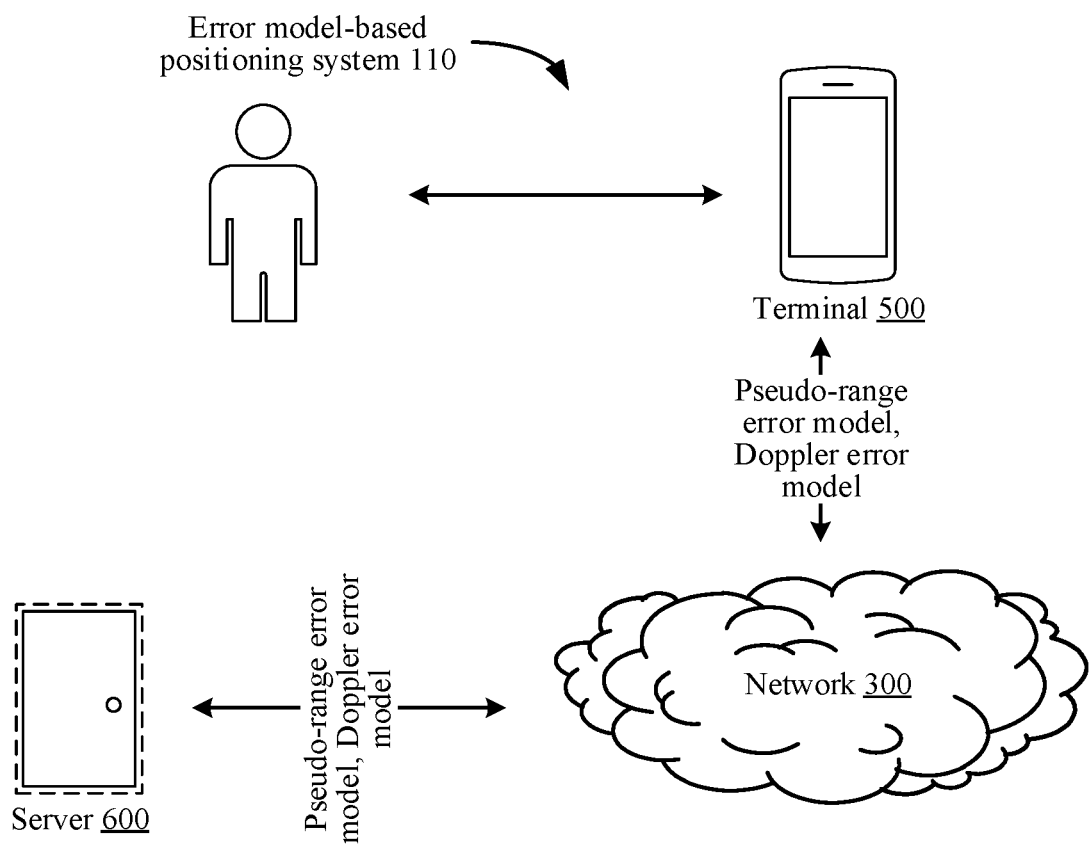
FIG. 1B is an example schematic architectural diagram of an error model-based positioning system according to some embodiments of this application.

Reference is now made to FIG. 1B. FIG. 1B is an example schematic architectural diagram of an error model-based positioning system according to an embodiment of this application. In order to support an error model-based positioning application, in a positioning system 110, a terminal 500 (either the terminal 200-1 or the terminal 200-2 in FIG. 1A) is connected to server 600 through a network 300. The network 300 may be a wide area network or a local area network, or a combination of both.

The terminal 500 is configured to receive a trigger operation in a map interface displayed by a graphical interface 510, and acquire a pseudo-range error model and a Doppler error model from the server 600 through the network 300 in response to the trigger operation. Next, the terminal 500 determines a current position based on the pseudo-range error model, the Doppler error model, and collected current observation data, and acquires map information within a position region where the current position is located from a map information database. Finally, the terminal 500 displays the map information on the map interface, and presents a positioning identifier on the current position.

Figure 2A:
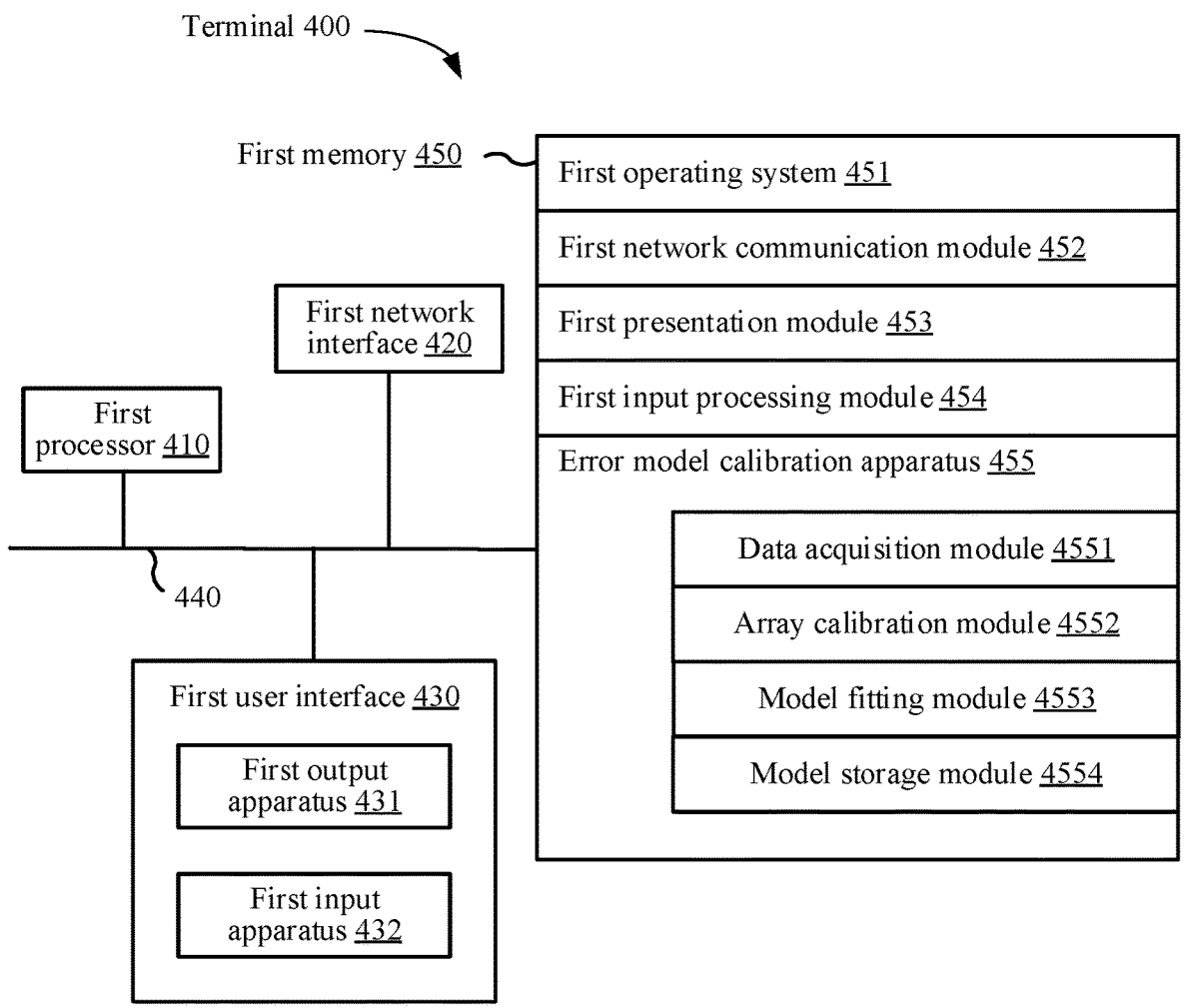
FIG. 2A is a example schematic structural diagram of a terminal 400 in FIG. 1A according to some embodiments of this application.

Referring to FIG. 2A, FIG. 2A is a schematic structural diagram of a terminal 400 in FIG. 1A according to an embodiment of this application. The terminal 400 includes: at least one first processor 410, a first memory 450, at least one first network interface 420, and a first user interface 430. All the components in the terminal 400 are coupled together by a first bus system 440. It may be understood that the first bus system 440 is configured to implement connection and communication between the components. In addition to a data bus, the first bus system 440 further includes a power bus, a control bus, and a state signal bus. However, for clear description, various types of buses in FIG. 2A are marked as the first bus system 440.

The first processor 410 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The first user interface 430 includes one or more first output apparatuses 431 that can display media content, including at least one loudspeaker and more visual display screen. The first user interface 430 further includes one or more first input apparatuses 432, including user interface components that facilitate inputting of a user, such as a keyboard, a mouse, a microphone, a touch display screen, a camera, and other input button and control.

The first memory 450 may be a removable memory, a non-removable memory, or a combination thereof. Example hardware devices comprise a solid-state memory, a hard disk drive, an optical disc driver, or the like. The first memory 450 may includes one or more storage devices physically remote from the first processor 410.

The first memory 450 includes a volatile memory or a non-volatile memory, or may include both a volatile memory and a non-volatile memory. The non-volatile memory may be a read-only memory (ROM). The volatile memory may be a random access memory (RAM). The first memory 450 described in this embodiment of this application is to include any other suitable type of memories.

In some embodiments, the first memory 450 may store data to support various operations. Examples of the data include a program, a module, and a data structure, or a subset or a superset thereof, which are described below by using examples.

A first operating system 451 includes a system program configured to process various basic system services and perform a hardware-related task, such as a framework layer, a core library layer, or a driver layer, and is configured to implement various basic services and process a hardware-based task.

A first network communication module 452 is configured to access other computing devices via one or more (wired or wireless) first network interfaces 420, example first network interfaces 420 including: Bluetooth, Wireless Fidelity (Wi-Fi), Universal Serial Bus (USB), etc.

A first display module 453 is configured to display information by using an output apparatus 431 (for example, a display screen or a speaker) associated with one or more user interfaces 430 (for example, a user interface configured to operate a peripheral device and display content and information).

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

A first input processing module 454 is configured to detect one or more first user inputs or interactions from one of the one or more input apparatuses 432 and translate the detected input or interaction.

In some embodiments, the error model calibration apparatus according to the embodiments of this application may be implemented in the form of software (including executable instructions for implementing an error model calibration method). FIG. 2A shows an error model calibration apparatus 455 stored in the first memory 450, which may be software in the form of a program and a plug-in, etc., and includes the following software modules: a data acquisition module 4551, an array calibration module 4552, a model fitting module 4553, and a model storage module 4554. These modules are logical. Therefore, any combination or further division may be performed according to the functions realized. The following describes functions of the modules.

Figure 2B:
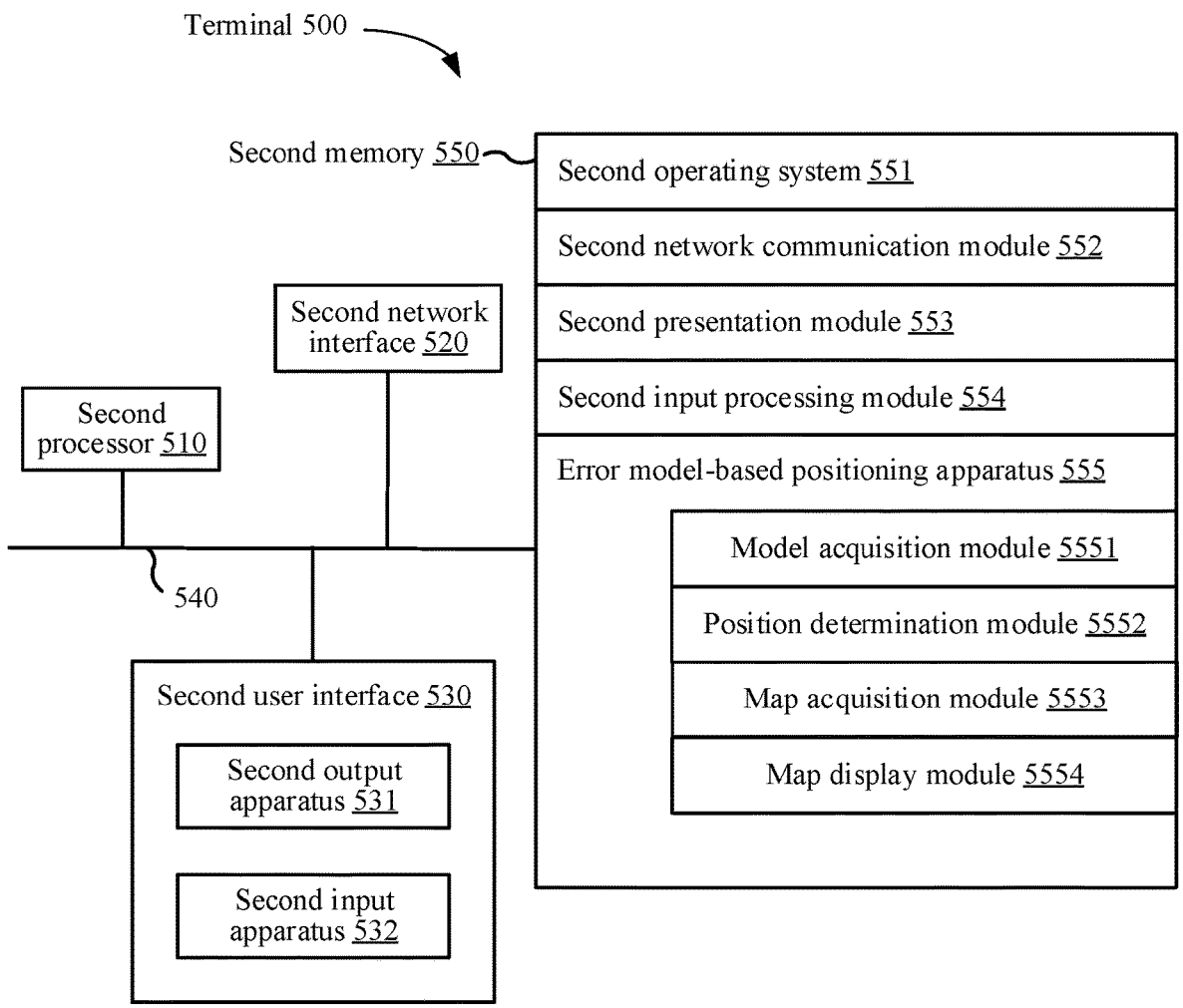
FIG. 2B is an example schematic structural diagram of a terminal 500 in FIG. 1B according to some embodiments of this application.

Referring to FIG. 2B, FIG. 2B is a schematic structural diagram of a terminal 500 in FIG. 1B according to an embodiment of this application. As shown in FIG. 2B, a terminal 500 includes: at least one second processor 510, a second memory 550, at least one second network interface 520, and a second user interface 530. All the components in the terminal 500 are coupled together by a second bus system 540. It may be understood that the second bus system 540 is configured to implement connection and communication between the components. In addition to a data bus, the second bus system 540 further includes a power bus, a control bus, and a state signal bus. However, for clear description, various types of buses in FIG. 2B are marked as the second bus system 540.

The second processor 510 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The implementation of the second user interface 530 may be similar to the first user interface 430.

In some embodiments, the second memory 550 may store data to support various operations. Examples of the data include a program, a module, and a data structure, or a subset or a superset thereof, which are described below by using examples.

The implementation of a second operating system 551 may be similar to the first operating system 451.

The implementation of a second network communication module 552 may be similar to the first network communication module 452.

The implementation of a second presentation module 553 may be similar to the first presentation module 453.

The implementation of a second input processing module 554 may be similar to the first input processing module 454.

In some embodiments, the error model-based positioning apparatus according to the embodiments of this application may be implemented in the form of software (including, for example, executable instructions for an error model-based positioning method). FIG. 2B shows an error model-based positioning apparatus 555 stored in the second memory 550, which may be software in the form of a program and a plug-in, etc., and includes the following software modules: a model acquisition module 5551, a position determination module 5552, a map acquisition module 5553, and a map display module 5554. These modules are logical. Therefore, any combination or further division may be performed according to the functions realized. The following describes functions of the modules.

The error model calibration method according to the embodiments of this application may be implemented by processing observation data collected by a calibration device according to the embodiments of this application. That is, the calibration device according to the embodiments of this application is configured to collect observation data.

Figure 3:
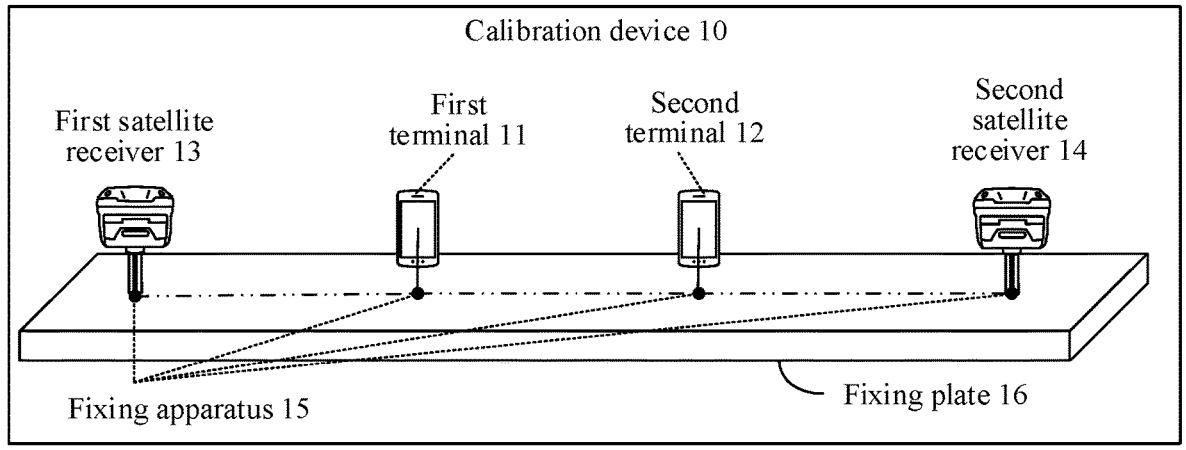
FIG. 3 is an example schematic structural diagram of a calibration device according to some embodiments of this application.

FIG. 3 is a schematic structural diagram of a calibration device according to an embodiment of this application. Referring to FIG. 3, a calibration device 10 according to the embodiments of this application includes: a first terminal 11, a second terminal 12, a first satellite receiver 13, a second satellite receiver 14, a fixing apparatus 15, and a fixing plate 16. The first terminal 11 and the second terminal 12 have the same model.

That is, in the embodiments of this application, pseudo-range error models and Doppler error models are calibrated for two terminals of the same model, i.e. the first terminal 11 and the second terminal 12.

It is to be understood that the first terminal 11, the second terminal 12, the first satellite receiver 13, and the second satellite receiver 14 are all fixed to the fixing plate 16 through the fixing apparatus 15. The fixing apparatus 15 may be a screw, a buckle, etc.

A phase center of the first terminal 11, a phase center of the second terminal 12, a phase center of the first satellite receiver 13, and a phase center of the second satellite receiver 14 all remain on the same straight line. That is to say, the first terminal 11, the second terminal 12, the first satellite receiver 13, and the second satellite receiver 14 need to remain horizontal or vertical.

It is to be understood that there are certain distances between the first terminal 11 and the second terminal 12, between the first satellite receiver 13 and the first terminal 11, and between the second terminal 12 and the second satellite receiver 14. These distances are collectively referred to as geometric parameters of the calibration device. The geometric parameters are used in a calibration process of error models.

Figure 4:
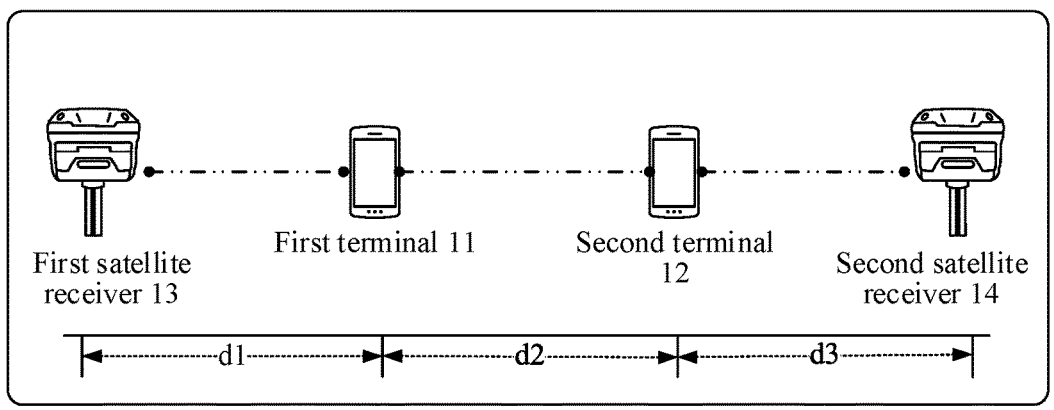
FIG. 4 is an example schematic diagram of geometric parameters of a calibration device according to some embodiments of this application.

FIG. 4 is an example schematic diagram of geometric parameters of a calibration device according to an embodiment of this application. Referring to FIG. 4, a distance between the first satellite receiver 13 and the first terminal 11 is d1, a distance between the first terminal 11 and the second terminal 12 is d2, and a distance between the second terminal 12 and the second satellite receiver 14 is d3. The geometric parameters are collectively referred to as d1, d2, and d3.

It is to be noted that the structures of the first terminal 11 and the second terminal 12 may be implemented according to the structure of the terminal 500 in FIG. 2B.

The error model calibration method according to the embodiments of this application will be described below in combination with example applications and implementations of the electronic device and the calibration device according to the embodiments of this application. It is to be understood that the embodiments of this application may also be implemented by means of an artificial intelligence technology.

Figure 5:
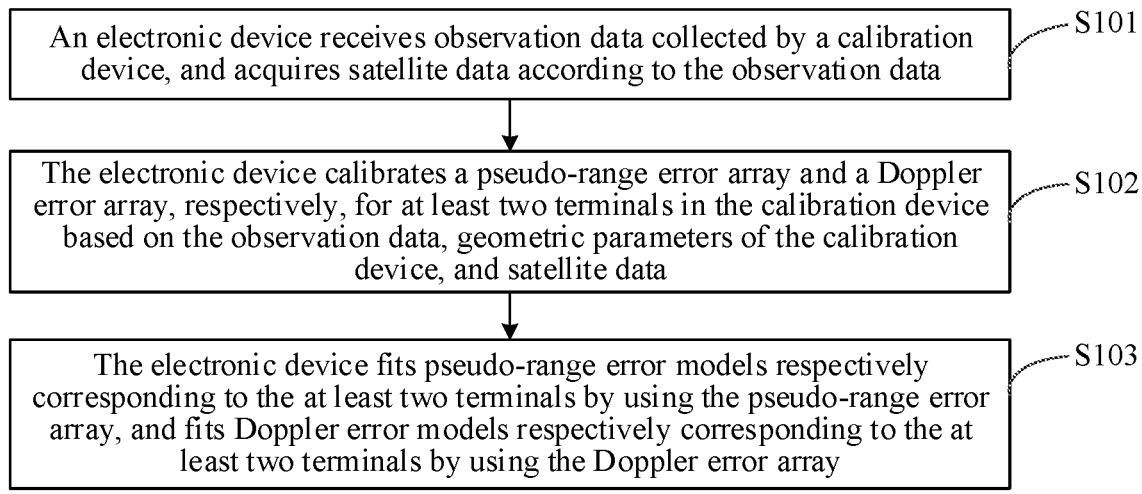
FIG. 5 is an example schematic flowchart of an error model calibration method according to some embodiments of this application.

Reference is now made to FIG. 5. FIG. 5 is an example schematic flowchart of an error model calibration method according to an embodiment of this application. The description will be made in conjunction with the steps shown in FIG. 5.

S101. An electronic device receives observation data collected by a calibration device, and acquires satellite data according to the observation data.

The embodiments of this application are implemented in a scenario where an error model is calibrated for a terminal in a calibration device, i.e. the error model is obtained for the terminal. First, when the calibration device is in an open field or fixed to a vehicle frame, the calibration device starts to observe a satellite and collect observation data of the observed satellite, stops collection when an observation duration reaches a set duration, and then transmits the collected observation data to the electronic device. After receiving the observation data transmitted by the calibration device, the electronic device selects satellite data corresponding to the satellite observed by the calibration device from data of respective satellites provided by a precise ephemeris (for example, three-dimensional coordinates with an error less than 2.5 cm, a clock error with an error less than 75 ps, etc.) according to information of a satellite recorded by the observation data (the satellite is observed by the calibration device). The satellite data may include the coordinates, operating speed, clock error, etc. of the satellite.

It is to be noted that the calibration device experiences a plurality of epochs from the beginning of the observation to the end of the observation, and thus the observation data is actually composed of sub-observation data of each epoch in the plurality of epochs. The sub-observation data may include a carrier-to-noise ratio, an altitude angle, pseudo-range observation data, Doppler observation data, etc. of an observed satellite.

It is to be understood that since the calibration device includes at least two terminals and at least two satellite receivers, the sub-observation data of each epoch may be composed of terminal data and receiver data. The terminal data is data collected by the terminals, and the receiver data is data collected by the satellite receivers.

It is also to be understood that the at least two terminals and the at least two satellite receivers in the calibration device may all collect data for all satellites observed thereby. The collected data may include a Doppler measurement value and a pseudo-range measurement value. Meanwhile, the at least two satellite receivers may also output own coordinates.

Figure 6:
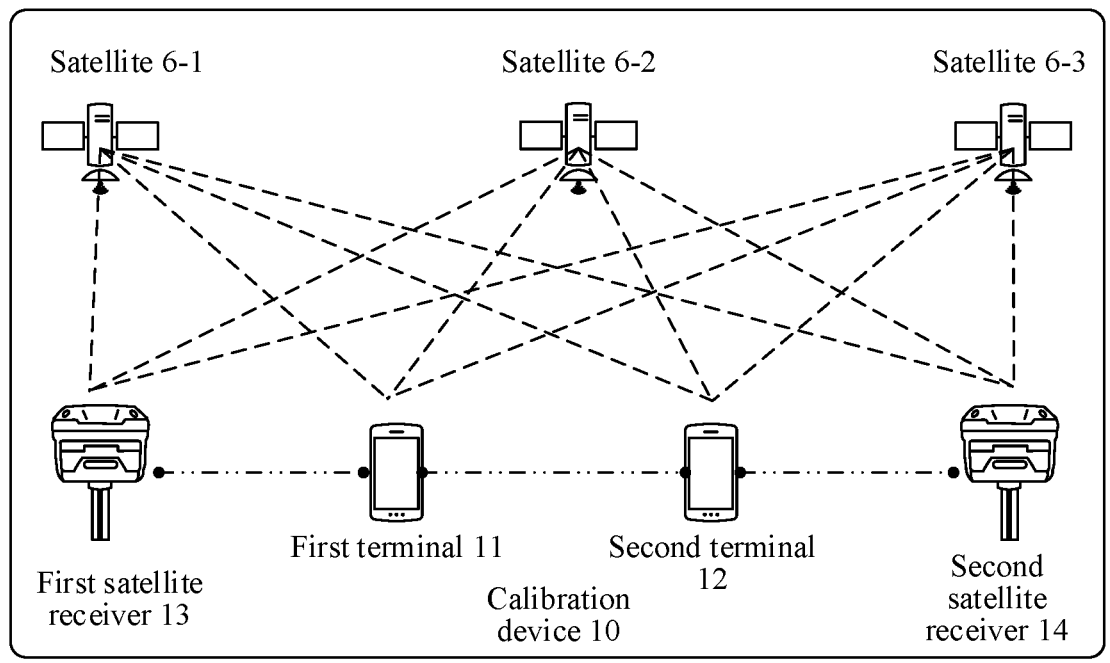
FIG. 6 is an example schematic diagram of observation data collected by a calibration device according to some embodiments of this application.

FIG. 6 is an example schematic diagram of observation data collected by a calibration device according to an embodiment of this application. As shown in FIG. 6, the first terminal 11, the second terminal 12, the first satellite receiver 13, and the second satellite receiver 14 in the calibration device 10 all observe three satellites: a satellite 6-1, a satellite 6-2, and a satellite 6-3. The first terminal 11, the second terminal 12, the first satellite receiver 13, and the second satellite receiver 14 all observe the three satellites, thereby collecting observation data.

It is to be understood that a duration threshold may be 1 day or 3 days, or other set durations. This is not limited by the embodiments of this application herein.

S102. The electronic device calibrates a pseudo-range error array and a Doppler error array, respectively, for at least two terminals in the calibration device based on the observation data, geometric parameters of the calibration device, and satellite data.

After obtaining the observation data and the satellite data, the electronic device uses the observation data, the satellite data, and the geometric parameters of the calibration device to construct a pseudo-range error array and a Doppler error array for two terminals of the same model in the calibration device. It is to be noted that the pseudo-range error array describes a discrete distribution of pseudo-range measurement errors of the at least two terminals under a carrier-to-noise ratio and an altitude angle of a satellite, and the Doppler error array describes a discrete distribution of Doppler measurement errors of the at least two terminals under the carrier-to-noise ratio and the altitude angle of the satellite.

The discrete distribution of the pseudo-range measurement errors under the carrier-to-noise ratio and the altitude angle of the satellite may be represented by the following form:

$$A = \begin{bmatrix} a(b_m, d_0) & \cdots & a(b_m, d_n) \\ \vdots & \ddots & \vdots \\ a(b_0, d_0) & \cdots & a(b_0, d_n) \end{bmatrix}$$

where $b_i$ is different carrier-to-noise ratios ($0 \leq i \leq m$), $d_1$ is different altitude angles ($0 \leq j \leq n$), ($b_i$, $d_j$) is a two-dimensional interval determined by the carrier-to-noise ratios and the altitude angles (similar to category units below), and $a(b_i, d_j)$ is pseudo-range measurement errors under different carrier-to-noise ratios and altitude angles.

Similarly, the discrete distribution of the Doppler measurement errors under the carrier-to-noise ratio and the altitude angle of the satellite may be represented by the following form:

$$B = \begin{bmatrix} b(b_m, d_0) & \cdots & b(b_m, d_n) \\ \vdots & \ddots & \vdots \\ b(b_0, d_0) & \cdots & b(b_0, d_n) \end{bmatrix}$$

where $b(b_i, d_j)$ is pseudo-range measurement errors under different carrier-to-noise ratios and altitude angles.

It is to be noted that the electronic device may perform statistical analysis on the pseudo-range measurement errors of the terminals according to the observation data, the satellite data, and the geometric parameters so as to determine pseudo-range measurement errors under different carrier-to-noise ratios and altitude angles, also perform statistical analysis on the Doppler measurement error of the mobile terminal so as to determine Doppler measurement errors under different carrier-to-noise ratios and altitude angles, and respectively classify the pseudo-range measurement errors and the Doppler measurement errors into category units gridded based on the carrier-to-noise ratios and altitude angles (the category unit may be understood as a position in an ith row and a jth column in an array. The position may be filled with an error parameter. The process of gridding the category units based on the carrier-to-noise ratios and the altitude angles will be described below in conjunction with steps S1021b, S402, and S502. Then, an error parameter is calculated for each category unit (the process of calculating an error parameter will be described below in conjunction with steps S1021c-S1021d, S403-S404, and S503-S504). Next, the calculated error parameter is filled into the corresponding category unit to obtain minimum elements of an error array. Finally, these minimum elements are arranged according to the position of the category unit to obtain the error array. Thus, a pseudo-range error array and a Doppler error array are obtained.

That is to say, in the embodiments of this application, as long as the pseudo-range measurement errors and the Doppler measurement errors are calculated for different carrier-to-noise ratios and altitude angles, the pseudo-range error array and the Doppler error array can be constructed.

In some embodiments, the electronic device may substitute the observation data, the satellite data, and the geometric parameters into a mathematical model for calculating pseudo-range measurement values (the mathematical model will be described below by taking equation (9) as an example), so as to obtain expressions of pseudo-range measurement values of at least two terminals respectively under observed satellites and reference satellites of the observed satellites, i.e. to obtain expressions of a plurality of pseudo-range measurement values. Then the expressions of the plurality of pseudo-range measurement values are differentially analyzed so as to eliminate terms to be eliminated in the expressions, thus obtaining the pseudo-range measurement errors. The electronic device may substitute the observation data, the satellite data, and the geometric parameters into a mathematical model for calculating Doppler measurement values (the mathematical model will be described below by taking equation (18) as an example), so as to obtain expressions of Doppler measurement values between each terminal and satellites obtained thereby respectively, and expressions of Doppler measurement values between each terminal and reference satellites of the observed satellites. Then differential processing is performed by using the expressions of the plurality of Doppler measurement values of each terminal to determine an inter-satellite single-difference observation value (the formula of the inter-satellite single-difference observation value will be described below in conjunction with equation (17)). The inter-satellite single-difference observation value, a Doppler calculation factor (the generation of the Doppler calculation factor will be described below in conjunction with equation (15)) of each terminal under the observed satellites constructed according to the satellite data and the observation data, and a Doppler construction factor (the generation of the Doppler construction factor will be described below in conjunction with equation (16)) of each terminal under the reference satellites of the observed satellites are differentially analyzed to obtain Doppler measurement error values.

In other embodiments, the electronic device may separate pseudo-range measurement data measured by at least two terminals and receiver data of a satellite receiver from the observation data, separate distance parameters of the at least two terminals from the geometric parameters, acquire satellite coordinates (three-dimensional coordinates with an error less than 2.5 cm) in the satellite data, calculate respective true coordinates of the at least two terminals by using receiver coordinates and the distance parameters in the receiver data, calculate a true spatial distance from the terminals to the satellites by using the true coordinates and the satellite coordinates, and then calculate pseudo-range measurement errors based on the true spatial distance and the pseudo-range measurement data (which may be calculated by multiplying the time of a signal from the satellites to the terminals by the speed of light), for example, by subtracting the true spatial distance from the pseudo-range measurement data. Similarly, the electronic device may separate Doppler measurement data measured by at least two terminals from the observation data, acquire a satellite coordinate variation of satellite coordinates from the satellite data, perform reverse deduction by using the coordinate variation, receiver coordinates in the receiver data, and true coordinates of the terminals calculated from distance parameters between the terminals and the satellite receiver (this process may be implemented by equation (4) and equation (5)), so as to obtain a Doppler true value (for example, different motion variations may have corresponding Doppler frequency shifts, and the Doppler true value may be matched by determining the motion variations of the terminals according to the coordinate variation and the true coordinates), and then difference the Doppler real value and the Doppler measurement data to obtain Doppler measurement errors.

It is to be understood that the geometric parameters of the calibration device may have been measured before the start of the calibration process of error models, and since the respective devices in the calibration device are fixed and will not change, the geometric parameters may be stored directly in the electronic device. Thus, the geometric parameters may be used for calculation directly after the start of the calibration process of the error models, so as not to take too much time to measure the geometric parameters and not to affect the calibration efficiency of the error models.

S103. The electronic device fits pseudo-range error models respectively corresponding to the at least two terminals by using the pseudo-range error array, and fits Doppler error models respectively corresponding to the at least two terminals by using the Doppler error array.

After calibrating the pseudo-range error array and the Doppler error array, the electronic device fits the respective data in the pseudo-range error array through a function fitting algorithm, and continuous functions obtained by fitting are pseudo-range error models of the at least two terminals. Meanwhile, the electronic device also uses a fitting algorithm to fit the respective data in the Doppler error array, and continuous functions obtained by fitting are Doppler error models. It is to be understood that the pseudo-range error models and the Doppler error models are collectively configured to position the at least two terminals.

It is to be noted that the at least two terminals in the calibration device have the same model and thus have the same indexes regarding satellite observations, and the electronic device determines pseudo-range error models and Doppler error models simultaneously for the at least two terminals.

In some embodiments, the function fitting algorithm may include least squares, Bezier curve fitting, etc. For example, the electronic device may fit the pseudo-range error array and the Doppler error array by using the least squares to obtain pseudo-range error models and Doppler error models. In other embodiments, the electronic device may also obtain pseudo-range error models and Doppler error models by performing function fitting on the pseudo-range error array and the Doppler error array through an artificial neural network, a convolutional neural network, or the like in an artificial intelligence technology (due to the powerful function fitting capability of a neural network).

In the embodiments of this application, based on observation data collected by a calibration device, own geometric parameters of the calibration device, and satellite data corresponding to the observation data, an electronic device can count a discrete distribution of a pseudo-range measurement error and a Doppler measurement error of a mobile terminal, analyze a pseudo-range error array describing distribution situations of the pseudo-range measurement error of the mobile terminal under different carrier-to-noise ratios and altitude angles and a Doppler error array describing distribution situations of the Doppler measurement error of the mobile terminal under different carrier-to-noise ratios and altitude angles, and fit the counted Doppler error array and pseudo-range error array into a continuous pseudo-range error model and Doppler error model. Thus, the error models of the terminal can be calibrated, thereby improving the universality of error model calibration.

In some embodiments of this application, the at least two terminals include: a first terminal and a second terminal. The observation data includes: sub-observation data of each epoch in a plurality of epochs. In this case, an example implementation process of S102 in which the electronic device calibrates a pseudo-range error array and a Doppler error array, respectively, for at least two terminals in the calibration device based on the observation data, geometric parameters of the calibration device, and satellite data may include: the following S1021-S1022:

S1021. The electronic device calibrates a pseudo-range error array collectively corresponding to the first terminal and the second terminal based on the sub-observation data of each epoch, the geometric parameters, and matched satellite parameters of each epoch in the satellite data.

In each epoch, a satellite observed by the first terminal and a satellite observed by the second terminal may be different, and the pseudo-range error array is calibrated in combination with parameters corresponding to satellites collectively observed by the first terminal and the second terminal and parameters corresponding to reference satellites corresponding to the collectively observed satellites. The electronic device denotes the parameters corresponding to the collectively observed satellites and the parameters of the reference satellites of the collectively observed satellites as matched satellite parameters. That is to say, the matched satellite parameters include parameters of satellites collectively observed by the first terminal and the second terminal and parameters of reference satellites of the collectively observed satellites.

When calibrating a pseudo-range error array and a Doppler error array, the electronic device analyzes sub-observation data of each epoch and matched satellite parameters of each epoch. For example, by substituting the matched satellite parameters, the sub-observation data, and geometric parameters into a mathematical model for calculating pseudo-range measurement values, or calculating a true spatial distance by using the matched satellite parameters, the sub-observation data, and the geometric parameters, pseudo-range measurement errors are determined and then classified into category units gridded based on a carrier-to-noise ratio and an altitude angle, so as to obtain distribution situations of the pseudo-range measurement errors under different carrier-to-noise ratios and altitude angles, thus obtaining the pseudo-range error array.

It is to be understood that since the satellite data is obtained from orbit data of respective satellites calculated according to a precise ephemeris based on the observation data, matched satellite data is also a part of the orbit data of the respective satellites calculated according to the precise ephemeris.

S1022. The electronic device calibrates a Doppler error array collectively corresponding to the first terminal and the second terminal according to the sub-observation data corresponding to each epoch, the geometric parameters, and first satellite parameters and second satellite parameters of each epoch in the satellite data.

In the embodiments of this application, a satellite observed by the first terminal is denoted as a first satellite, a satellite observed by the second terminal is denoted as a second satellite, parameters of the first satellite and parameters of a reference satellite corresponding to the first satellite are denoted as first satellite parameters, and parameters of the second satellite and parameters of a reference satellite corresponding to the second satellite are denoted as second satellite parameters. That is to say, the first satellite parameters include parameters of a first satellite observed by the first terminal and parameters of a reference satellite of the first satellite. The second satellite parameters include parameters of a second satellite observed by the second terminal and parameters of a reference satellite of the second satellite. It is to be understood that the first satellite parameters and the second satellite parameters also belong to a part of the orbit data of the respective satellites calculated according to the precise ephemeris.

And then the electronic device performs analysis in combination with the first satellite parameters, the second satellite parameters, the geometric parameters, and the sub-observation data of each epoch. For example, the first satellite parameters and the second satellite parameters are respectively substituted into a mathematical model for calculating a Doppler measurement value together with the sub-observation data and the geometric parameters, or a true Doppler value is calculated with the sub-observation data and the geometric parameters based on the first satellite parameters and the second satellite parameters respectively, so as to calculate a first Doppler measurement error and a second Doppler measurement error. Then the calculated Doppler measurement error is classified into a category unit divided based on a carrier-to-noise ratio and an altitude angle, and then the obtained Doppler error sub-arrays of the first terminal and the second terminal are respectively fused into a Doppler error array collectively corresponding to the first terminal and the second terminal according to a mode of adding or multiplying according to corresponding elements.

In the embodiment of this application, the electronic device may determine a pseudo-range error array based on the matched satellite parameters in the satellite data and a Doppler error array based on the first satellite parameters and the second satellite parameters in the satellite data to facilitate subsequent fitting of pseudo-range error models and Doppler error models.

In some embodiments of this application, the calibration device includes: at least two satellite receivers. The sub-observation data of each epoch includes: terminal data collected by the first terminal and the second terminal, receiver data collected by the at least two satellite receivers, and time information of each epoch. In this case, an example implementation process of S1021 in which the electronic device calibrates a pseudo-range error array collectively corresponding to the first terminal and the second terminal based on the sub-observation data of each epoch, the geometric parameters, and matched satellite parameters of each epoch in the satellite data may include: the following S1021a-S1021e:

S1021a. The electronic device extracts carrier-to-noise ratios and altitude angles of satellites collectively observed by the first terminal and the second terminal of each epoch from the terminal data.

The terminal data includes data of all satellites collectively observed by the first terminal and the second terminal. The data includes carrier-to-noise ratios and altitude angles of all the satellites collectively observed by the first terminal and the second terminal. The electronic device extracts the carrier-to-noise ratios and the altitude angles of these satellites so as to facilitate subsequent construction of system carrier-to-noise ratio and altitude angle category units.

It is to be understood that the number of the collectively observed satellites is one or more, and the plurality of collectively observed satellites come from one or more satellite systems. The satellite system may include GPS and GLONASS, and may also include a satellite system such as GALILEO and BDS. This is not limited by the embodiments of this application herein.

S1021b. The electronic device grids, for each satellite system, a plurality of system carrier-to-noise ratio-altitude angle category units based on the carrier-to-noise ratios and the altitude angles of the collectively observed satellites.

The electronic device constructs a plurality of carrier-to-noise ratio-altitude angle category units for a satellite system to which the collectively observed satellites belong by using the carrier-to-noise ratios and the altitude angles of the collectively observed satellites, and denotes the carrier-to-noise ratio-altitude angle category units as system carrier-to-noise ratio-altitude angle category units. Thus, the electronic device obtains a plurality of system carrier-to-noise ratio-altitude angle category units.

It is to be understood that a plurality of system carrier-to-noise ratio-altitude angle category units of each satellite system may constitute a grid array corresponding to each satellite system. The grid array may be understood as a two-dimensional interval array for quantifying a carrier-to-noise ratio and an altitude angle. Each unit in the array is a two-dimensional interval.

Figure 7:
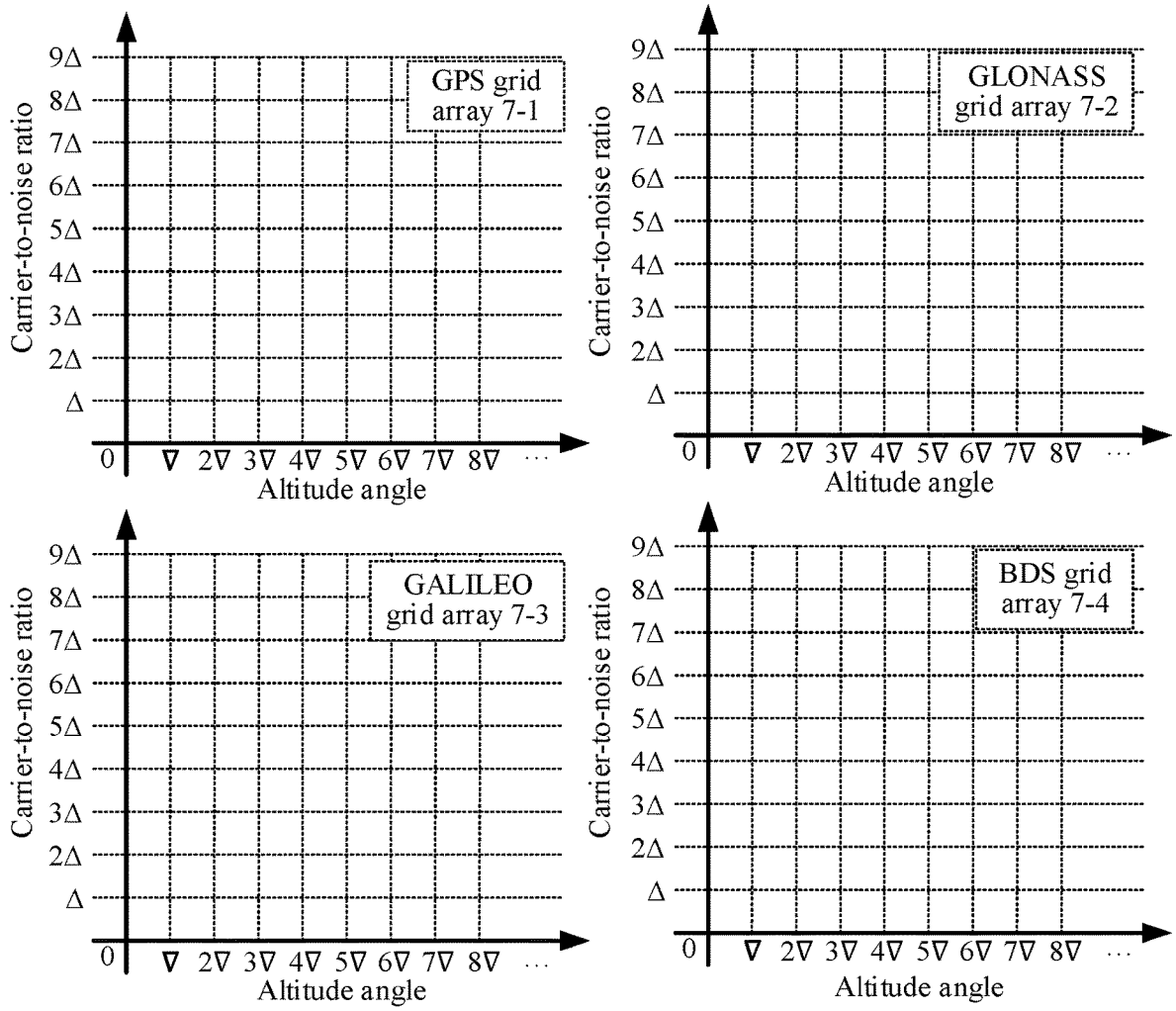
FIG. 7 is an example schematic diagram of a grid array corresponding to each satellite system according to some embodiments of this application.

FIG. 7 is an example schematic diagram of a grid array corresponding to each satellite system according to an embodiment of this application. As shown in FIG. 7, the satellite system includes GPS, GLONASS, GALILEO, and BDS. The electronic device determines a plurality of system carrier-to-noise ratio-altitude angle category units for each satellite system, so as to obtain four grid arrays: a GPS grid array 7-1, a GLONASS grid array 7-2, a GALILEO grid array 7-3, and a BDS grid array 7-4.

S1021c. The electronic device determines a corresponding pseudo-range double-difference residual sequence for each carrier-to-noise ratio-altitude angle category unit according to the time information, the receiver data, the geometric parameters, and the matched satellite parameters.

The electronic device determines, according to a satellite system to which each collectively observed satellite belongs, a corresponding grid array for each satellite from the grid array corresponding to each satellite system, and then classifies each satellite into the corresponding system carrier-to-noise ratio-altitude angle category unit according to whether the carrier-to-noise ratio and the altitude angle of each satellite are inside the system carrier-to-noise ratio-altitude angle category unit, so as to determine the system carrier-to-noise ratio-altitude angle category unit to which the satellite belongs. For example, each system carrier-to-noise ratio-altitude angle category unit has a minimum carrier-to-noise ratio, a minimum altitude angle, a maximum carrier-to-noise ratio, and a maximum altitude angle corresponding thereto (equivalent to dividing a two-dimensional interval by using the minimum carrier-to-noise ratio, the minimum altitude angle, the maximum carrier-to-noise ratio, and the maximum altitude angle). When the carrier-to-noise ratio of a satellite is greater than the minimum carrier-to-noise ratio and less than or equal to the maximum carrier-to-noise ratio, and the altitude angle of the satellite is greater than the minimum altitude angle and less than or equal to the minimum altitude angle, the electronic device classifies the satellite into the system carrier-to-noise ratio-altitude angle category unit. Thereafter, the electronic device determines a corresponding pseudo-range double-difference residual sequence for each system carrier-to-noise ratio-altitude angle category unit (this process will be described below in conjunction with steps S3010-S303).

It is to be noted that the pseudo-range double-difference residual sequence of the system carrier-to-noise ratio-altitude angle category unit may include a pseudo-range double-difference residual value corresponding to a satellite combination classified into the system carrier-to-noise ratio-altitude angle category unit (the satellite combination is the satellite combination in S301), and may also be a null sequence (at this moment, the system carrier-to-noise ratio-altitude angle category unit does not have a satellite belonging thereto). This is not limited by the embodiments of this application herein.

S1021d. The electronic device calculates a pseudo-range error parameter of each system carrier-to-noise ratio-altitude angle category unit by using the pseudo-range double-difference residual sequence, and generates a pseudo-range error sub-array corresponding to each satellite system by using the pseudo-range error parameter of each system carrier-to-noise ratio-altitude angle category unit.

After calculating the pseudo-range double-difference residual sequence corresponding to each system carrier-to-noise ratio-altitude angle category unit, the electronic device may perform statistical processing on elements in the pseudo-range double-difference residual sequence, e.g. variance calculation (which will be described below in conjunction with equation (1) in S201) or standard deviation calculation, so as to obtain a pseudo-range error parameter corresponding to each system carrier-to-noise ratio-category unit. Then, the electronic device constitutes a pseudo-range error sub-array corresponding to each satellite system by using the pseudo-range error parameter corresponding to each system carrier-to-noise ratio-altitude angle category unit in each satellite system. That is to say, the electronic device fills the grid array corresponding to each satellite system by using the pseudo-range error parameter.

In some embodiments of this application, the pseudo-range error parameter is: a pseudo-range variance value or a pseudo-range standard deviation value. The pseudo-range double-difference residual sequence includes: at least two target pseudo-range double-difference residual values. In this case, an example implementation process of S1021d in which the electronic device calculates a pseudo-range error parameter corresponding to each carrier-to-noise ratio-altitude angle category unit by using the pseudo-range double-difference residual sequence, and generates a pseudo-range error sub-array corresponding to each satellite system by using the pseudo-range error parameter corresponding to each system carrier-to-noise ratio-altitude angle category unit may include: the following S201 or S202:

S201. The electronic device performs variance calculation on the at least two target pseudo-range double-difference residual values to obtain a pseudo-range variance value corresponding to each system carrier-to-noise ratio-altitude angle category unit, and generates a pseudo-range error sub-array corresponding to each satellite system by using the pseudo-range variance value corresponding to each system carrier-to-noise ratio-altitude angle category unit.

In the embodiments of this application, the electronic device first calculates a mean value of at least two target pseudo-range double-difference residual values in the pseudo-range double-difference residual sequence, subtracts the mean value from each target pseudo-range double-difference residual value, accumulates a difference value between each target pseudo-range double-difference residual value and the mean value together to obtain an accumulated sum, and then divides the square of the accumulated sum by the number of target pseudo-range double-difference residual values to obtain a pseudo-range variance value of each system carrier-to-noise ratio-altitude angle category unit. Thereafter, the electronic device combines the pseudo-range variance values of each system carrier-to-noise ratio-altitude angle category unit together, i.e. fills a corresponding pseudo-range variance value into each system carrier-to-noise ratio-altitude angle category unit, thereby obtaining a pseudo-range error sub-array corresponding to each satellite system. That is to say, in this step, the pseudo-range error sub-array corresponding to each satellite system is, actually, a pseudo-range variance sub-array corresponding to each satellite system.

When the pseudo-range double-difference residual sequence corresponding to each system carrier-to-noise ratio-altitude angle category unit is $s_{SYS}([a_i, b_i], [c_j, d_j])=\{z_1, z_2, \ldots, z_l\}$, the pseudo-range error parameter corresponding to each system carrier-to-noise ratio-altitude angle category may be calculated in a manner as shown in equation (1):

$$\tilde{\sigma}^2_{SYS}(b_i, d_j) \approx \frac{1}{l} \cdot \sum_{k=1}^{l}\left(z_k - \frac{1}{l} \cdot \sum_{m=1}^{l} z_m\right)^2 \quad (1)$$

where $(b_i, d_j)$ is each system carrier-to-noise ratio-altitude angle category unit (a simple representation of $[a_i, b_i]$, $[c_j, d_j]$), $i=0, 1, \ldots$ ; $j=0, 1, \ldots$ . SYS is a satellite system, and SYS is any one of GPS, GLO, GAL, and BDS. k and m are labels of target pseudo-range double-difference residuals, $k \leq l$, $m \leq l$, l is the number of target pseudo-range double-difference residual values, $z_k$ and $z_m$ both represent the target pseudo-range double-difference residual values, and $\tilde{\sigma}^2_{SYS}(b_i, d_j)$ represents a pseudo-range variance value. After obtaining at least two target pseudo-range double-difference residual values, the electronic device may substitute values of these parameters into equation (1), so as to calculate a pseudo-range variance value of each system carrier-to-noise ratio-altitude angle category unit.

S202. The electronic device performs standard deviation calculation on the at least two target pseudo-range double-difference residual values to obtain a pseudo-range standard deviation value corresponding to each system carrier-to-noise ratio-altitude angle category unit, and generates a pseudo-range error sub-array corresponding to each satellite system by using the pseudo-range standard deviation value corresponding to each system carrier-to-noise ratio-altitude angle category unit.

The electronic device may also perform standard deviation calculation on the at least two target pseudo-range double-difference residual values, so as to obtain a pseudo-range standard deviation value corresponding to each system carrier-to-noise ratio-altitude angle category unit, and then generate a pseudo-range error sub-array corresponding to each satellite system by using the pseudo-range standard deviation values of all system carrier-to-noise ratio-altitude angle category units. Thus, in this step, the pseudo-range error sub-array corresponding to each satellite system is a pseudo-range standard deviation sub-array corresponding to each satellite system.

It is to be understood that the electronic device may first calculate pseudo-range variance values of at least two target pseudo-range double-difference residual values, and then perform a root extraction operation on the pseudo-range variance values to obtain a pseudo-range standard deviation value of each system carrier-to-noise ratio-altitude angle category unit.

At this point, the electronic device completes the determination of the pseudo-range error sub-array of each satellite system.

S1021e. The electronic device determines a pseudo-range error sub-array corresponding to each satellite system as the pseudo-range error array to which the first terminal and the second terminal collectively correspond.

After obtaining the pseudo-range error sub-array corresponding to each satellite system, the electronic device may determine the pseudo-range error sub-arrays corresponding to the satellite systems as the pseudo-range error arrays. In some embodiments, the electronic device may also multiply the pseudo-range error sub-array (actually, multiply the pseudo-range variance sub-array or the pseudo-range standard deviation sub-array) and determine the multiplied pseudo-range error sub-array of each satellite system as the pseudo-range error array.

For example, the pseudo-range variance sub-array corresponding to each satellite system may be as follows:

$$\tilde{Y}^2_{m \times n, GPS} = \begin{bmatrix} \tilde{\sigma}^2_{GPS}(b_m, d_0) & \ldots & \tilde{\sigma}^2_{GPS}(b_m, d_n) \\ \vdots & \ddots & \vdots \\ \tilde{\sigma}^2_{GPS}(b_0, d_0) & \ldots & \tilde{\sigma}^2_{GPS}(b_0, d_n) \end{bmatrix}$$

$$\tilde{Y}^2_{m \times n, GLO} = \begin{bmatrix} \tilde{\sigma}^2_{GLO}(b_m, d_0) & \ldots & \tilde{\sigma}^2_{GLO}(b_m, d_n) \\ \vdots & \ddots & \vdots \\ \tilde{\sigma}^2_{GLO}(b_0, d_0) & \ldots & \tilde{\sigma}^2_{GLO}(b_0, d_n) \end{bmatrix}$$

$$\tilde{Y}^2_{m \times n, GAL} = \begin{bmatrix} \tilde{\sigma}^2_{GAL}(b_m, d_0) & \ldots & \tilde{\sigma}^2_{GAL}(b_m, d_n) \\ \vdots & \ddots & \vdots \\ \tilde{\sigma}^2_{GAL}(b_0, d_0) & \ldots & \tilde{\sigma}^2_{GAL}(b_0, d_n) \end{bmatrix}$$

$$\tilde{Y}^2_{m \times n, BDS} = \begin{bmatrix} \tilde{\sigma}^2_{BDS}(b_m, d_0) & \ldots & \tilde{\sigma}^2_{BDS}(b_m, d_n) \\ \vdots & \ddots & \vdots \\ \tilde{\sigma}^2_{BDS}(b_0, d_0) & \ldots & \tilde{\sigma}^2_{BDS}(b_0, d_n) \end{bmatrix}$$

where $\tilde{Y}^2_{m \times n, GPS}$ represents a pseudo-range variance sub-array corresponding to a GPS satellite system, $\tilde{Y}^2_{m \times n, GLO}$ represents a pseudo-range variance sub-array corresponding to a GLONASS satellite system, $\tilde{Y}^2_{m \times n, GAL}$ represents a pseudo-range variance sub-array corresponding to a GALILEO satellite system, and $\tilde{Y}^2_{m \times n, BDS}$ represents a pseudo-range variance sub-array corresponding to a BDS satellite system.

At this moment, the pseudo-range error sub-array corresponding to each satellite system may be represented as:

$$\tilde{\Psi}^2_{m \times n, GPS} = \frac{1}{4} \cdot \begin{bmatrix} \tilde{\sigma}^2_{GPS}(b_m, d_0) & \ldots & \tilde{\sigma}^2_{GPS}(b_m, d_n) \\ \vdots & \ddots & \vdots \\ \tilde{\sigma}^2_{GPS}(b_0, d_0) & \ldots & \tilde{\sigma}^2_{GPS}(b_0, d_n) \end{bmatrix}$$

$$\tilde{\Psi}^2_{m \times n, GLO} = \frac{1}{4} \cdot \begin{bmatrix} \tilde{\sigma}^2_{GLO}(b_m, d_0) & \ldots & \tilde{\sigma}^2_{GLO}(b_m, d_n) \\ \vdots & \ddots & \vdots \\ \tilde{\sigma}^2_{GLO}(b_0, d_0) & \ldots & \tilde{\sigma}^2_{GLO}(b_0, d_n) \end{bmatrix}$$

$$\tilde{\Psi}^2_{m \times n, GAL} = \frac{1}{4} \cdot \begin{bmatrix} \tilde{\sigma}^2_{GAL}(b_m, d_0) & \ldots & \tilde{\sigma}^2_{GAL}(b_m, d_n) \\ \vdots & \ddots & \vdots \\ \tilde{\sigma}^2_{GAL}(b_0, d_0) & \ldots & \tilde{\sigma}^2_{GAL}(b_0, d_n) \end{bmatrix}$$

$$\tilde{\Psi}^2_{m \times n, BDS} = \frac{1}{4} \cdot \begin{bmatrix} \tilde{\sigma}^2_{BDS}(b_m, d_0) & \ldots & \tilde{\sigma}^2_{BDS}(b_m, d_n) \\ \vdots & \ddots & \vdots \\ \tilde{\sigma}^2_{BDS}(b_0, d_0) & \ldots & \tilde{\sigma}^2_{BDS}(b_0, d_n) \end{bmatrix}$$

where $\sigma^2_{BDS}(b_i, d_j)$ represents a pseudo-range variance value of each system carrier-to-noise ratio-altitude angle category unit, $\tilde{\Psi}^2_{m \times n, GPS}$ represents a pseudo-range error sub-array corresponding to a GPS satellite system, $\tilde{\Psi}^2_{m \times n, GLO}$ represents a pseudo-range error sub-array corresponding to a GLONASS satellite system, $\tilde{\Psi}^2_{m \times n, GAL}$ represents a pseudo-range error sub-array corresponding to a GALILEO satellite system, and $\tilde{\Psi}^2_{m \times n, BDS}$ represents a pseudo-range error sub-array corresponding to a BDS satellite system. The pseudo-range error array to which the first terminal and the second terminal collectively correspond may be composed of these four pseudo-range error sub-arrays.

As another example, when the pseudo-range error sub-array of each satellite system is composed of the pseudo-range standard deviations of each system carrier-to-noise ratio-altitude angle category unit, the pseudo-range error sub-array corresponding to each satellite system may be represented as:

$$\Psi_{m \times n, GPS} = \frac{1}{2} \cdot \begin{bmatrix} \tilde{\sigma}_{GPS}(b_m, d_0) & \cdots & \tilde{\sigma}_{GPS}(b_m, d_n) \\ \vdots & \ddots & \vdots \\ \tilde{\sigma}_{GPS}(b_0, d_0) & \cdots & \tilde{\sigma}_{GPS}(b_0, d_n) \end{bmatrix}$$

$$\Psi_{m \times n, GLO} = \frac{1}{2} \cdot \begin{bmatrix} \tilde{\sigma}_{GLO}(b_m, d_0) & \cdots & \tilde{\sigma}_{GLO}(b_m, d_n) \\ \vdots & \ddots & \vdots \\ \tilde{\sigma}_{GLO}(b_0, d_0) & \cdots & \tilde{\sigma}_{GLO}(b_0, d_n) \end{bmatrix}$$

$$\Psi_{m \times n, GAL} = \frac{1}{2} \cdot \begin{bmatrix} \tilde{\sigma}_{GAL}(b_m, d_0) & \cdots & \tilde{\sigma}_{GAL}(b_m, d_n) \\ \vdots & \ddots & \vdots \\ \tilde{\sigma}_{GAL}(b_0, d_0) & \cdots & \tilde{\sigma}_{GAL}(b_0, d_n) \end{bmatrix}$$

$$\Psi_{m \times n, BDS} = \frac{1}{2} \cdot \begin{bmatrix} \tilde{\sigma}_{BDS}(b_m, d_0) & \cdots & \tilde{\sigma}_{BDS}(b_m, d_n) \\ \vdots & \ddots & \vdots \\ \tilde{\sigma}_{BDS}(b_0, d_0) & \cdots & \tilde{\sigma}_{BDS}(b_0, d_n) \end{bmatrix}$$

where $\tilde{\sigma}_{GPS}(b_i, d_j)$ represents a pseudo-range variance value of each system carrier-to-noise ratio-altitude angle category unit.

In the embodiments of this application, the electronic device calibrates a pseudo-range error array to which the first terminal and the second terminal collectively correspond for each system carrier-to-noise ratio-altitude angle category unit by using the satellite carrier-to-noise ratio and the altitude angle in each of the utilized sub-observation data, the receiver data, the geometric parameters, and the matched satellite parameters, thereby determining the statistical characteristics of pseudo-range errors of the first terminal and the second terminal.

In some embodiments of this application, an example implementation process of S1021b in which the electronic device grids, for each satellite system, a plurality of system carrier-to-noise ratio-altitude angle category units based on the carrier-to-noise ratios and the altitude angles of the collectively observed satellites may include: the following S203-S204:

S203. The electronic device extracts a maximum system carrier-to-noise ratio and a maximum system altitude angle corresponding to each satellite system from the carrier-to-noise ratios and the altitude angles of the collectively observed satellites.

The electronic device first classifies all satellites collectively observed by the first terminal and the second terminal in each epoch so as to determine a satellite corresponding to each satellite system, searches for a maximum carrier-to-noise ratio and a maximum altitude angle from the carrier-to-noise ratios and the altitude angles of the respective satellites of each satellite system, and then denotes the maximum carrier-to-noise ratio as a maximum system carrier-to-noise ratio and the maximum altitude angle as a maximum system altitude angle.

S204. The electronic device divides the maximum system carrier-to-noise ratio and the maximum system altitude angle according to a carrier-to-noise ratio interval and an altitude angle interval to obtain the plurality of system carrier-to-noise ratio-altitude angle category units.

The electronic device acquires a carrier-to-noise ratio interval and an altitude angle interval, segments and quantifies the maximum carrier-to-noise ratio according to the carrier-to-noise ratio interval, and segments and quantifies the maximum system altitude angle according to the altitude angle interval. After the segmentation is completed, segmentation results of the maximum system carrier-to-noise ratio are subjected to the construction of a two-dimensional quantification region one by one with segmentation results of the maximum system altitude angle, and a plurality of system carrier-to-noise ratio-altitude angle category units corresponding to each satellite can be obtained.

It is to be understood that the carrier-to-noise ratio interval may be set to $\Delta$ dBHz, and the altitude angle interval may be set to $\nabla°$. The values of $\Delta$ and $\nabla$ may be set according to actual requirements. For example, $\Delta$ and $\nabla$ are set to 5, i.e. $\Delta=\nabla=5$. Or, $\Delta$ is set to 10, $\nabla$ is set to 8, etc. This is not limited by the embodiments of this application herein.

When the maximum carrier-to-noise ratio corresponding to each satellite system is $CN0_{max}$ and the maximum altitude angle is $el_{max}$, a plurality of system carrier-to-noise ratio-altitude angle category units corresponding to each satellite system, i.e. a grid array corresponding to each satellite system, may be represented as:

$$\Upsilon_{m \times n, GPS} = \begin{bmatrix} s_{GPS}([a_m, b_m], [c_0, d_0]) & \cdots & s_{GPS}([a_m, b_m], [c_n, d_n]) \\ \vdots & \ddots & \vdots \\ s_{GPS}([a_0, b_0], [c_0, d_0]) & \cdots & s_{GPS}([a_0, b_0], [c_n, d_n]) \end{bmatrix}$$

$$\Upsilon_{m \times n, GLO} = \begin{bmatrix} s_{GLO}([a_m, b_m], [c_0, d_0]) & \cdots & s_{GLO}([a_m, b_m], [c_n, d_n]) \\ \vdots & \ddots & \vdots \\ s_{GLO}([a_0, b_0], [c_0, d_0]) & \cdots & s_{GLO}([a_0, b_0], [c_n, d_n]) \end{bmatrix}$$

$$\Upsilon_{m \times n, GAL} = \begin{bmatrix} s_{GAL}([a_m, b_m], [c_0, d_0]) & \cdots & s_{GAL}([a_m, b_m], [c_n, d_n]) \\ \vdots & \ddots & \vdots \\ s_{GAL}([a_0, b_0], [c_0, d_0]) & \cdots & s_{GAL}([a_0, b_0], [c_n, d_n]) \end{bmatrix}$$

$$\Upsilon_{m \times n, BDS} = \begin{bmatrix} s_{BDS}([a_m, b_m], [c_0, d_0]) & \cdots & s_{BDS}([a_m, b_m], [c_n, d_n]) \\ \vdots & \ddots & \vdots \\ s_{BDS}([a_0, b_0], [c_0, d_0]) & \cdots & s_{BDS}([a_0, b_0], [c_n, d_n]) \end{bmatrix}$$

In some embodiments, a relationship between equations (2) and (3) may be constructed for each system carrier-to-noise ratio-altitude angle category unit:

$$\begin{cases} a_i = i \cdot \Delta \\ c_j = j \cdot \nabla \end{cases} \quad (2)$$

$$\begin{cases} b_i - a_i = \Delta \\ d_j - c_j = \nabla \end{cases} \text{ where } i = 0, 1, \ldots; j = 0, 1, \ldots. \quad (3)$$

In the embodiments of this application, the electronic device grids the maximum system carrier-to-noise ratio and the maximum system altitude angle extracted from the carrier-to-noise ratios and the altitude angles of all the collectively observed satellites according to the carrier-to-noise ratio interval and the altitude angle interval to obtain a plurality of system carrier-to-noise ratio-altitude angle category units corresponding to each satellite system, so as to facilitate the classification of the pseudo-range measurement error and the Doppler measurement error using the system carrier-to-noise ratio-altitude angle category units.

Figure 8:
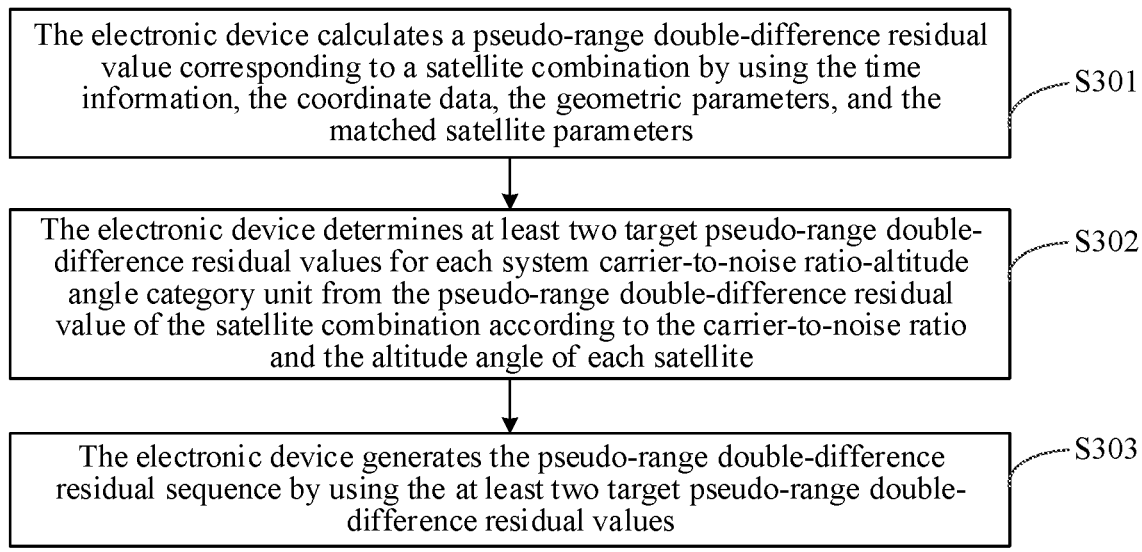
FIG. 8 is an example schematic flowchart of an error model calibration method according to some embodiments of this application.

Reference is now made to FIG. 8. FIG. 8 is another example schematic flowchart of an error model calibration method according to an embodiment of this application. In some embodiments of this application, the satellite receiver may acquire own precise coordinates (with an error less than 2.5 cm). Thus, the receiver data includes coordinate data. In this case, an example implementation process of S1021c in which the electronic device determines a corresponding pseudo-range double-difference residual sequence for each system carrier-to-noise ratio-altitude angle category unit according to the time information, the receiver data, the geometric parameters, and the matched satellite parameters may include: the following S301-S303:

S301. The electronic device calculates a pseudo-range double-difference residual value corresponding to a satellite combination by using the time information, the coordinate data, the geometric parameters, and the matched satellite parameters.

The satellite combination is composed of each satellite in the collectively observed satellites and a reference satellite of each satellite. The electronic device calculates pseudo-range double-difference residual errors of the first terminal and the second terminal under each satellite and a reference satellite corresponding to each satellite by using the coordinate data, the geometric parameters, and the matched satellite data (the calculation process will be described in conjunction with the following S3011-S3016), so as to obtain a pseudo-range double-difference residual value corresponding to each satellite combination.

S302. The electronic device determines at least two target pseudo-range double-difference residual values for each system carrier-to-noise ratio-altitude angle category unit from the pseudo-range double-difference residual value of the satellite combination according to the carrier-to-noise ratio and the altitude angle of each satellite.

The electronic device selects an appropriate system carrier-to-noise ratio-altitude angle category unit from the plurality of system carrier-to-noise ratio-altitude angle units according to the carrier-to-noise ratio and the altitude angle of each satellite, and classifies the pseudo-range double-difference residual value corresponding to the satellite combination to which each satellite belongs into the selected system carrier-to-noise ratio-altitude angle category unit. For a certain system carrier-to-noise ratio-altitude angle category unit, there may be a plurality of pseudo-range double-difference residual values divided into the system carrier-to-noise ratio-altitude angle category unit, and therefore these pseudo-range double-difference residual values are target pseudo-range double-difference residual values of the system carrier-to-noise ratio-altitude angle category unit. That is, the system carrier-to-noise ratio-altitude angle category unit has at least two target pseudo-range double-difference residual values. For other system carrier-to-noise ratio-altitude angle category units, there may be one or none of the pseudo-range double-difference residual values divided into the category units, and then the electronic device may generate at least two target pseudo-range double-difference residual values therefor by means of zero padding.

Figure 9:
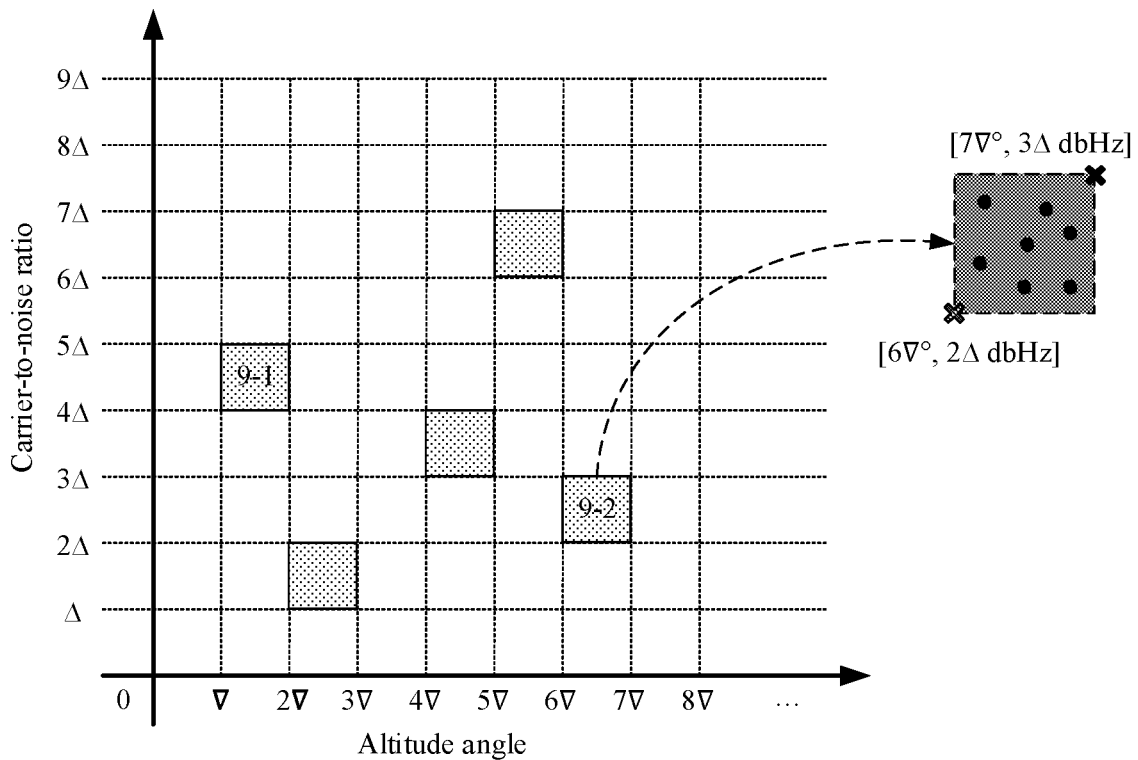
FIG. 9 is an example schematic diagram of determining a target pseudo-range double-difference residual value for each system carrier-to-noise ratio-altitude angle category unit according to some embodiments of this application.

The embodiments of this application provide an example schematic diagram of determining a target pseudo-range double-difference residual value for each system carrier-to-noise ratio-altitude angle category unit. Referring to FIG. 9, a grid array corresponding to each satellite system is shown. The unit of a horizontal axis is an altitude angle interval ($\nabla=5°$), and the unit of a vertical axis is a carrier-to-noise ratio interval ($\Delta=5$ dBHz). When the carrier-to-noise ratio of a certain satellite is 21 dBHz and an altitude angle is 8 degrees, a pseudo-range double-difference residual value corresponding to the satellite is divided into a category unit 8-1, and so on, one or more corresponding target pseudo-range double-difference residual values can be determined for each system carrier-to-noise ratio-altitude angle category unit. For example, seven target pseudo-range double-difference residual values are determined for a category unit 9-2 (the coordinates of a lower left vertex of the category unit are [$6\nabla°$, $2\Delta$dBHz], and the coordinates of an upper right vertex are [$7\nabla°$, $3\Delta$dBHz]).

S303. The electronic device generates the pseudo-range double-difference residual sequence by using the at least two target pseudo-range double-difference residual values.

The electronic device constitutes a sequence of target pseudo-range double-difference residual values of each system carrier-to-noise ratio-altitude angle category unit in a random order or a descending order, so as to obtain a corresponding pseudo-range double-difference residual sequence corresponding to each system carrier-to-noise ratio-altitude angle category unit.

In the embodiments of this application, the electronic device initially establishes a discrete relationship between a pseudo-range measurement value and a carrier-to-noise ratio-altitude angle by classifying a pseudo-range double-difference residual value corresponding to each satellite combination into each system carrier-to-noise ratio-altitude angle category unit, so as to determine the actual situations of pseudo-range observations of the first terminal and the second terminal.

In some embodiments of this application, the matched satellite data includes: coordinates and an operating speed of each satellite and coordinates and an operating speed of a reference satellite of each satellite. In this case, an example implementation process of S301 in which the electronic device calculates a pseudo-range double-difference residual value corresponding to a satellite combination by using the time information, the coordinate data, the geometric parameters, and the matched satellite parameters may include: the following S3011-S3016:

S3011. The electronic device calculates first coordinates of the first terminal and second coordinates of the second terminal according to the coordinate data and the geometric parameters.

The geometric parameters include a distance between the first terminal and the first satellite receiver, a distance between the first terminal and the second terminal, and a distance between the second terminal and the second satellite receiver. The electronic device first sums the distance between the first terminal and the first satellite receiver, the distance between the first terminal and the second terminal, and the distance between the second terminal and the second satellite receiver to obtain a distance sum, and then subtracts the coordinates of the first satellite receiver from the coordinates of the second satellite receiver to obtain a first coordinate difference value. Next, the electronic device divides the first coordinate difference value by the distance sum to obtain a first ratio result, multiplies the first ratio result by the distance between the first terminal and the first satellite receiver, and then adds the product to the coordinates of the first satellite receiver to obtain the coordinates of the first terminal.

The embodiments of this application provide a formula for calculating the coordinates of the first terminal, referring to equation (4):

$$r_a(t_i) = r_A(t_i) + \frac{r_B(t_i) - r_A(t_i)}{d_1 + d_2 + d_3} \cdot d_1 \quad (4)$$

where $r_A(t_i)$ represents the coordinates of the first satellite receiver, $r_B(t_i)$ represents the coordinates of the second satellite receiver, $d_1$ represents the distance between the first terminal and the first satellite receiver, $d_2$ represents the distance between the first terminal and the second terminal, $d_3$ represents the distance between the second terminal and the second satellite receiver, and $r_a(t_i)$ represents the coordinates of the first terminal. After obtaining the values of the above parameters, the error model calibration device will substitute the values into equation (4) to calculate values of the coordinates of the first terminal.

The electronic device subtracts the coordinates of the second satellite receiver from the coordinates of the first satellite receiver to obtain a second coordinate difference value, divides the second coordinate difference value by the obtained distance sum to obtain a second ratio result, multiplies the second ratio result by the distance between the second terminal and the second satellite receiver, and then adds the product to the coordinates of the second satellite receiver to obtain the coordinates of the second terminal.

The embodiments of this application provide a formula for calculating the coordinates of the second terminal, referring to equation (5):

$$r_b(t_i) = r_B(t_i) + \frac{r_A(t_i) - r_B(t_i)}{d_1 + d_2 + d_3} \cdot d_3 \quad (5)$$

where $r_A(t_i)$ represents the coordinates of the first satellite receiver, $r_B(t_i)$ represents the coordinates of the second satellite receiver, $d_1$ represents the distance between the first terminal and the first satellite receiver, $d_2$ represents the distance between the first terminal and the second terminal, $d_3$ represents the distance between the second terminal and the second satellite receiver, and $r_b(t_i)$ represents the coordinates of the second terminal. After obtaining the values of the above parameters, the electronic device will substitute the values into equation (5) to calculate values of the coordinates of the second terminal.

S3012. The electronic device calculates a first operating speed of the first terminal and a second operating speed of the second terminal according to the time information, the coordinate data, and the geometric parameters.

The coordinate data includes coordinates of the first satellite receiver and coordinates of the second satellite receiver. The electronic device first arbitrarily selects one epoch from each epoch as a current epoch. In this way, next and previous epochs of the current epoch will be determined. The electronic device subtracts the coordinates of the first satellite receiver at the previous epoch from the coordinates of the first satellite receiver at the current epoch to obtain a first epoch coordinate difference value while subtracting the coordinates of the second satellite receiver at the previous epoch from the coordinates of the second satellite receiver at the current epoch to obtain a second epoch coordinate difference value. Meanwhile, the electronic device will extract time corresponding to the current epoch and time corresponding to the previous epoch from the time information, and denote a difference value between the time corresponding to the current epoch and the time corresponding to the previous epoch as a time difference value. Thereafter, the electronic device subtracts a ratio of the first epoch coordinate difference value to the time difference value from a ratio of the second epoch coordinate difference value to the time difference value, denotes the ratio as a ratio parameter of the first terminal, divides the ratio parameter of the first terminal by the distance sum, multiplies by a distance from the first terminal to the first satellite receiver to obtain a first speed parameter, and then adds the ratio of the first epoch coordinate difference value to the time difference value to the first speed parameter, so as to obtain the operating speed of the first terminal.

The embodiments of this application provide a formula for calculating the operating speed of the first terminal, referring to equation (6):

$$v_a(t_i) \approx \frac{r_A(t_i) - r_A(t_{i-1})}{t_i - t_{i-1}} + \frac{\frac{r_B(t_i) - r_B(t_{i-1})}{t_i - t_{i-1}} - \frac{r_A(t_i) - r_A(t_{i-1})}{t_i - t_{i-1}}}{d_1 + d_2 + d_3} \cdot d_2 \quad (6)$$

where $t_i$ represents the time corresponding to the current epoch, $t_{i-1}$ represents the time corresponding to the previous epoch, $r_A(t_i)$ represents the coordinates of the first satellite receiver at the current epoch, $r_A(t_{i-1})$ represents the coordinates of the first satellite receiver at the previous epoch, $r_B(t_i)$ represents the coordinates of the second satellite receiver at the current epoch, $r_B(t_{i-1})$ represents the coordinates of the second satellite receiver at the previous epoch, $d_1$ represents the distance between the first terminal and the first satellite receiver, $d_2$ represents the distance between the first terminal and the second terminal, $d_3$ represents the distance between the second terminal and the second satellite receiver, and $v_a(t_i)$ represents the operating speed of the first terminal. After obtaining the values of the above parameters, the electronic device will substitute the values into equation (6) to calculate values of the first operating speed.

Similarly, the electronic device subtracts a ratio of the second epoch coordinate difference value to the time difference value from a ratio of the first epoch coordinate difference to the time difference value, denotes the ratio as a ratio parameter of the second terminal, divides the ratio parameter of the second terminal by the distance sum, multiplies by a distance from the second terminal to the first terminal to the second terminal to obtain a second speed parameter, and then adds the ratio of the second epoch coordinate difference value to the time difference value to the second speed parameter, so as to obtain the second operating speed.

The embodiments of this application provide a formula for calculating the second operating speed, as shown in equation (7):

$$v_b(t_i) \approx \frac{r_B(t_i) - r_B(t_{i-1})}{t_i - t_{i-1}} + \frac{\frac{r_A(t_i) - r_A(t_{i-1})}{t_i - t_{i-1}} - \frac{r_B(t_i) - r_B(t_{i-1})}{t_i - t_{i-1}}}{d_1 + d_2 + d_3} \cdot d_2 \quad (7)$$

where $t_i$ represents the time corresponding to the current epoch, $t_{i-1}$ represents the time corresponding to the previous epoch, $r_A(t_i)$ represents the coordinates of the first satellite receiver at the current epoch, $r_A(t_{i-1})$ represents the coordinates of the first satellite receiver at the previous epoch, $r_B(t_i)$ represents the coordinates of the second satellite receiver at the current epoch, $r_B(t_{i-1})$ represents the coordinates of the second satellite receiver at the previous epoch, $d_1$ represents the distance between the first terminal and the first satellite receiver, $d_2$ represents the distance between the first terminal and the second terminal, $d_3$ represents the distance between the second terminal and the second satellite receiver, and $v_b(t_i)$ represents the operating speed of the second terminal. After obtaining the values of the above parameters, the electronic device will substitute the values into equation (7) to calculate values of the second operating speed.

S3013. The electronic device constructs a double-difference observation value of the satellite combination based on the first coordinates, the first operating speed, the second coordinates, the second operating speed, the coordinates of each satellite, the operating speed of each satellite, the coordinates of the reference satellite of each satellite, and the operating speed of the reference satellite of each satellite.

The electronic device first substitutes the first coordinates, the first operating speed, the coordinates of each satellite, and the operating speed of each satellite into a mathematical model for calculating pseudo-range measurement values, so as to obtain a pseudo-range observation relationship including unknown terms such as a clock error term of the first terminal, a clock error term of each satellite, an error correction number term between the first terminal and each satellite, and a pseudo-range measurement error parameter between the first terminal and each satellite, i.e. a first pseudo-range observation relationship of the first terminal under each satellite (the mathematical model for calculating pseudo-range measurement values will be described below in conjunction with the first pseudo-range observation relationship, i.e. equation (9)). Similarly, the electronic device substitutes the second coordinates, the second operating speed, the coordinates of each satellite, and the operating speed of each satellite into the mathematical model for calculating pseudo-range measurement values, so as to obtain a second pseudo-range observation relationship of the second terminal under each satellite. A clock error term of the second terminal, a clock error term of each satellite, an error correction number term between the first terminal and each satellite, and a pseudo-range measurement error parameter between the second terminal and each satellite in the second pseudo-range observation relationship are unknown.

The electronic device substitutes the first coordinates, the first operating speed, the coordinates of the reference satellite of each satellite, and the operating speed of the reference satellite of each satellite into the mathematical model for calculating pseudo-range measurement values, so as to obtain a third pseudo-range observation relationship including unknown terms such as a clock error term of the first terminal, a clock error term of the reference satellite of each satellite, an error correction number term between the first terminal and each satellite, and a pseudo-range measurement error parameter between the first terminal and the reference satellite of each satellite. And the second coordinates, the second operating speed, the coordinates of the reference satellite of each satellite, and the operating speed of the reference satellite of each satellite are substituted into the mathematical model for calculating pseudo-range measurement values, so as to obtain a fourth pseudo-range observation relationship including a clock error term of the second terminal, a clock error term of the reference satellite of each satellite, an error correction number term between the second terminal and each satellite, and a pseudo-range measurement error parameter between the second terminal and the reference satellite of each satellite.

Finally, the electronic device first subtracts the third pseudo-range observation relationship and the fourth pseudo-range observation relationship to obtain a relationship difference value, and then successively subtracts the second pseudo-range observation relationship and the relationship difference value from the first pseudo-range observation relationship. At this moment, the obtained value is a double-difference observation value.

The embodiments of this application provide a formula for calculating the double-difference observation value, as shown in equation (8):

$$\nabla \tilde{\rho}_{ab}^{s^r s}(t_i) = \tilde{\rho}_a^s(t_i) - \tilde{\rho}_b^s(t_i) - (\tilde{\rho}_a^{s^r}(t_i) - \tilde{\rho}_b^{s^r}(t_i)) \quad (8)$$

where $\tilde{\rho}_a^s(t_i)$ represents the first pseudo-range observation relationship, $\tilde{\rho}_b^s(t_i)$ represents the second pseudo-range observation relationship, $\tilde{\rho}_a^{s^r}(t_i)$ represents the third pseudo-range observation relationship, and $\tilde{\rho}_b^{s^r}(t_i)$ represents the fourth pseudo-range observation relationship.

It is to be noted that in the embodiments of this application, the clock error term of the first terminal, the clock error term of the second terminal, the clock error term of each satellite, the clock error term of the reference satellite of each satellite, the respective error correction number terms, and the respective pseudo-range measurement error parameters are unknown terms. That is, although unknown terms are included in the respective pseudo-range observation relationships, these unknown terms can be canceled by performing a difference operation between the respective pseudo-range observation relationships.

The mathematical model for calculating pseudo-range measurement values is described below by taking the generation of the first pseudo-range observation relationship (equation (9)) as an example. In the mathematical model, a norm operation is first performed on a difference value between the first coordinates and the coordinates of each satellite to obtain a spatial geometric distance from the first terminal to each satellite, and then a transposition vector of a ratio of a difference value between the coordinates of each satellite and the coordinates of the first terminal to the spatial geometric distance is determined as a first unit observation vector. Next, the first unit observation vector is multiplied by the operating speed of the first terminal, the product of the first unit observation vector and the operating speed of the first terminal is added to the speed of light, and a summation result is multiplied by the clock error of the first terminal to construct a sub-pseudo-range parameter corresponding to the first terminal. The first unit observation vector is multiplied by the operating speed of each satellite, the product is added to the speed of light, and a summation result is multiplied by the clock error of each satellite to construct a sub-pseudo-range parameter corresponding to each satellite. A difference value between the sub-pseudo-range parameter corresponding to the first terminal and the sub-pseudo-range parameter corresponding to each satellite is added to the spatial geometric distance from the first terminal to each satellite, a pseudo-range measurement error parameter between the first terminal and each satellite, and an error correction number between the first terminal and each satellite, so as to obtain a first pseudo-range measurement relationship of the first terminal under each satellite.

The embodiments of this application provide a constructed first pseudo-range observation relationship, referring to equation (9):

$$\tilde{\rho}_a^s(t_i) = \|r_a^s\| + (e_a^s \cdot v_a(t_i) + c)dt_a(t_i) - (e_a^s \cdot v^s(t_i) + c)dt^s(t_i) + \zeta_a^s + \delta\rho_a^s(t_i) \quad (9)$$

where $\|r_a^s\|$ represents the spatial geometric distance, $\|r_a^s\| = \|r_a(t_i) - r^s(t_i)\|$, $e_a^s$ represents the first unit observation vector from the first terminal to each satellite, $$e_a^s = \left(\frac{r^s(t_i) - r_a(t_i)}{\|r_a^s\|}\right)^T,$$

$v_a(t_i)$ represents the operating speed of the first terminal, $dt_a(t_i)$ is the clock error term of the first terminal, $vs(t_i)$ represents the operating speed of each satellite, $dt^s(t_i)$ represents the clock error term of each satellite, $\zeta_a^s$ represents the error correction number between the first terminal and each satellite, $\delta\rho_a^s(t_i)$ represents the pseudo-range measurement error of the first terminal and each satellite, and $\tilde{\rho}_a^s(t_i)$ represents the first pseudo-range observation relationship of the first terminal under each satellite.

S3014. The electronic device constructs a first pseudo-range residual factor according to the first coordinates, the second coordinates, the coordinates of each satellite, and the coordinates of the reference satellite of each satellite.

The electronic device performs a norm operation on the difference value between the first coordinate and the coordinates of each satellite to obtain a spatial geometric distance between the first terminal and each satellite, and calculates a spatial geometric distance between the second terminal and each satellite, a spatial geometric distance between the first terminal and the reference satellite of each satellite, and a spatial geometric distance between the second terminal and the reference satellite of each satellite in the same manner. Next, the electronic device successively subtracts a difference value between the spatial geometric distance between the second terminal and each satellite, the spatial geometric distance between the first terminal and the reference satellite of each satellite, and the spatial geometric distance between the second terminal and the reference satellite of each satellite from the spatial geometric distance between the first terminal and each satellite, so as to obtain a first pseudo-range residual factor.

The embodiments of this application provide a formula for constructing the first pseudo-range residual factor, as shown in equation (10):

$$\Delta\nabla r_{ab}^{s^r s}(t_i) = \|r_a(t_i) - r^s(t_i)\| - \|r_b(t_i) - r^s(t_i)\| - (\|r_b(t_i) - r^{s^r}(t_i)\| - \|r_b(t_i) - r^{s^r}(t_i)\|) \quad (10)$$

where $r_a(t_i)$ is the first coordinates, $r^s(t_i)$ is the coordinates of each satellite, $r_b(t_i)$ is the second coordinates, $r^s(t_i)$ is the coordinates of each satellite, $r^{s^r}(t_i)$ is the coordinates of the reference satellite of each satellite, and $\Delta\nabla r_{ab}^{s^r s}(t_i)$ is the first pseudo-range residual factor. After obtaining the values of the above parameters, the electronic device will substitute the values into equation (10) to obtain the first pseudo-range residual factor.

S3015. The electronic device constructs a second pseudo-range residual factor based on the first coordinates, the second coordinates, the coordinates of each satellite, the coordinates of the reference satellite of each satellite, the operating speed of each satellite, and the operating speed of the reference satellite of each satellite.

The electronic device calculates a first unit measurement vector of the first terminal and each satellite according to the first coordinates and the coordinates of each satellite, calculates a second unit measurement vector of each satellite of the second terminal by using the second coordinates and the coordinates of each satellite, calculates a third unit measurement vector of the first terminal and the reference satellite of each satellite according to the first coordinates and the coordinates of the reference satellite of each satellite, and calculates a fourth unit measurement vector of the second terminal and the reference satellite of each satellite by using the second coordinates and the coordinates of the reference satellite of each satellite (the first unit measurement vector, the second unit measurement vector, the third unit measurement vector, and the fourth unit measurement vector are calculated in the similar manner, and the calculation process of the respective unit observation vectors will be described below by taking the first unit observation vector as an example). Thereafter, the electronic device subtracts the product of the second unit measurement vector and the operating speed of each satellite from the product of the first unit measurement vector and the operating speed of each satellite, and multiplies the difference value by the clock error term of each satellite, so as to obtain a first pseudo-range clock error product. Similarly, the electronic device subtracts the product of the fourth unit measurement vector and the operating speed of the reference satellite of each satellite from the product of the third unit measurement vector and the operating speed of the reference satellite of each satellite, and multiplies the obtained difference value by the clock error term of the reference satellite of each satellite, so as to obtain a second pseudo-range clock error product. Finally, the electronic device subtracts the first pseudo-range clock error product from the second pseudo-range clock error product to obtain a difference value result: a second pseudo-range residual factor.

The embodiments of this application provide a formula for calculating the second pseudo-range residual factor, referring to equation (11):

$$\Delta\nabla dt^{s^r s}(t_i) = (e_a^s \cdot v^s(t_i) - e_b^s \cdot v^s(t_i)) \cdot dt^s(t_i) - ((e_a^{s^r} \cdot v^{s^r}(t_i) - e_b^{s^r} \cdot v^{s^r}(t_i)) \cdot dt^{s^r}(t_i)) \quad (11)$$

where $e_a^s$ is the first unit observation vector between the first terminal and each satellite, $v^s(t_i)$ is the operating speed of each satellite, $e_b^s$ is the second unit observation vector between the second terminal and each satellite, $dt^s(t_i)$ is the clock error term of each satellite, $e_a^{s^r}$ is the third unit observation vector of the first terminal and the reference satellite of each satellite, $e_a^{s^r}$ is the fourth unit observation vector of the second terminal and the reference satellite of each satellite, $v^{s^r}(t_i)$ is the operating speed of the reference satellite of each satellite, and $dt^{s^r}(t_i)$ is the clock error term of the reference satellite of each satellite.

The calculation of the respective unit observation vectors is described below by taking the first unit observation vector as an example. The electronic device will perform a proportional operation on the spatial geometric distance and the spatial geometric distance between the first terminal and each satellite by using an absolute value of the difference value between the first coordinates and the coordinates of each satellite, and transpose the result obtained by the proportional operation to obtain the first unit observation vector. The spatial geometric distance is obtained by performing a norm operation on the difference value between the first coordinates and the coordinates of each satellite. Thus, the first unit observation vector may be represented as $$e_a^s = \left(\frac{r^s(t_i) - r_a(t_i)}{\|r_a^s\|}\right)^T,$$

where $\|r_a^s\|$ represents the spatial geometric distance, $\|r_a^s\| = \|r_a(t_i) - r^s(t_i)\|$, $r_a(t_i)$ is the first coordinates, and $r^s(t_i)$ is the coordinates of each satellite.

S3016. The electronic device successively subtracts the double-difference observation value, the first pseudo-range residual factor, and the second pseudo-range residual factor to obtain a pseudo-range double-difference residual value of the satellite combination.

The embodiments of this application provide a calculation formula for calculating the pseudo-range double-difference residual value, as shown in equation (12):

$$\delta\rho_{ab}^{s^r s}(t_i) = \Delta\nabla r_{ab}^{s^r s}(t_i) + \Delta\nabla dt^{s^r s}(t_i) - \Delta\nabla\tilde{\rho}_{ab}^{s^r s}(t_i) \quad (12)$$

where $\Delta\nabla r_{ab}^{s^r s}(t_i)$ is the first pseudo-range residual factor, $\Delta\nabla dt^{s^r s}(t_i)$ is the second pseudo-range residual factor, $\Delta\nabla\tilde{\rho}_{ab}^{s^r s}(t_i)$ is the double-difference observation value, and $\delta\rho_{ab}^{s^r s}(t_i)$ is the pseudo-range double-difference residual value. After obtaining the values of the above parameters, the electronic device will substitute the values into equation (12) to obtain values of the pseudo-range double-difference residual value.

In the embodiments of this application, the electronic device can calculate a pseudo-range double-difference residual value corresponding to a combination of each satellite and the reference satellite corresponding to each satellite by using the time information, the coordinate data, the geometric distance, and the matched satellite parameters, so as to subsequently determine a pseudo-range double-difference residual sequence. Meanwhile, during the calculation of pseudo-range double-difference parameter values, it is not necessary to calculate the clock error term, error correction parameters, and other unknown terms, thereby reducing time and resources consumed for calculation.

In some embodiments of this application, an example implementation process of S1022 in which the electronic device calibrates a Doppler error array collectively corresponding to the first terminal and the second terminal according to the sub-observation data corresponding to each epoch, the geometric parameters, and first satellite parameters and second satellite parameters of each epoch in the satellite data may include: the following S1022a-S1022d:

S1022a. The electronic device extracts, from the terminal data, time information corresponding to each epoch, a carrier-to-noise ratio and an altitude angle of a satellite observed by the first terminal in each epoch, and a carrier-to-noise ratio and an altitude angle of a satellite observed by the second terminal of each epoch.

It is to be noted that in the embodiments of this application, the electronic device respectively extracts a carrier-to-noise ratio and an altitude angle of a satellite observed by the first terminal at each epoch and a carrier-to-noise ratio and an altitude angle of a satellite observed by the second terminal at each epoch from terminal data so as to facilitate subsequent construction of carrier-to-noise ratio-altitude angle category units respectively corresponding to the first terminal and the second terminal.

S1022b. The electronic device calibrates a first Doppler error sub-array of the first terminal according to the carrier-to-noise ratio and the altitude angle of the satellite observed by the first terminal, the receiver data, the geometric parameters, the time information, and the first satellite parameters.

S1022c. The electronic device calibrates a second Doppler error sub-array of the second terminal by using the carrier-to-noise ratio and the altitude angle of the satellite observed by the second terminal, the receiver data, the geometric parameters, the time information, and the second satellite parameters.

The electronic device first calibrates a first Doppler error sub-matrix corresponding to the first terminal by using carrier-to-noise ratios and altitude angles of satellites observed by the first terminal of each epoch and carrier-to-noise ratios and altitude angles of reference satellites of these satellites in conjunction with the time information, the receiver data, the first satellite parameters, the geometric parameters, and other data (the calibration process will be described below in conjunction with steps S401-S404). The electronic device constructs a second Doppler error sub-array corresponding to the second terminal on the basis of carrier-to-noise ratios and altitude angles of satellites observed by the second terminal of each epoch and carrier-to-noise ratios and altitude angles of the corresponding reference satellites in conjunction with the receiver data, the geometric distance, the time information, and the second satellite parameters (the calibration process will be described below in conjunction with steps S501-S504).

It is to be understood that the order of execution of S1022b and S1022c does not affect the result of the calibrated Doppler error array. Thus, in some embodiments, the electronic device may execute S1022c and then S1022b.

S1022d. The electronic device fuses the first Doppler error sub-array and the second Doppler error sub-array to obtain a Doppler error array to which the first terminal and the second terminal collectively correspond.

It is to be understood that the electronic device may implement the fusion of the first Doppler error sub-matrix and the second Doppler error sub-matrix by weighting the first Doppler error sub-array and the second Doppler error sub-array, and may also implement the fusion of the first Doppler error sub-array and the second Doppler error sub-array by multiplying the first Doppler error sub-array and the second Doppler error sub-array. This is not limited by the embodiments of this application herein.

It is to be noted that the first Doppler error sub-array may be a Doppler variance sub-array or a Doppler standard deviation sub-array. Similarly, the second Doppler error sub-array may be a Doppler variance sub-array or a Doppler standard deviation sub-array.

When the first Doppler error sub-array is $\tilde{\Psi}_{m\times n,a}^2$, and the second Doppler error sub-array is $\tilde{\Psi}_{m\times n,b}^2$, the Doppler error array to which the first terminal and the second terminal collectively correspond is $$\tilde{\Psi}_{m\times n}^2 = \frac{1}{2}\left(\tilde{\Psi}_{m\times n,a}^2 + \tilde{\Psi}_{m\times n,b}^2\right).$$

When the first Doppler error sub-array is $\tilde{\Psi}_{m\times n,a}^2$, and the second Doppler error sub-array is $\tilde{\Psi}_{m\times n,b}^2$, the Doppler error array to which the first terminal and the second terminal collectively correspond is $$\Psi_{m\times n} = \frac{1}{2}\left(\Psi_{m\times n,a} + \Psi_{m\times n,b}\right).$$

In the embodiments of this application, the electronic device can respectively calibrate Doppler error sub-arrays corresponding to the first terminal and the second terminal therefor, and then fuse the first Doppler error sub-array and the second Doppler error sub-array to obtain a Doppler error array to which the first terminal and the second terminal collectively correspond.

In some embodiments of this application, an example implementation process of S1022b in which the electronic device calibrates a first Doppler error sub-array of the first terminal according to the carrier-to-noise ratios and the altitude angles of all satellites observed by the first terminal, the receiver data, the geometric parameters, the time information, and the first satellite parameters may include: the following S401-S404:

S401. The electronic device respectively extracts a maximum first carrier-to-noise ratio and a maximum first altitude angle corresponding to the first terminal from the carrier-to-noise ratio and the altitude angle of the satellite observed by the first terminal.

S402. The electronic device grids the maximum first carrier-to-noise ratio and the maximum first altitude angle according to a carrier-to-noise ratio interval and an altitude angle interval to obtain a plurality of first carrier-to-noise ratio-altitude angle category units.

The electronic device extracts the carrier-to-noise ratios and the altitude angles of the satellites observed by the first terminal from the carrier-to-noise ratios and the altitude angles of the satellites observed by the first terminal, and then compares the sizes of these carrier-to-noise ratios and the altitude angles to determine the maximum carrier-to-noise ratio and the maximum altitude angle, so as to obtain the maximum first carrier-to-noise ratio and the maximum first altitude angle. Next, the electronic device segments the maximum first carrier-to-noise ratio and the maximum first altitude angle according to a carrier-to-noise ratio interval and an altitude angle interval so as to obtain a plurality of first carrier-to-noise ratio-altitude angle category units corresponding to the first terminal. That is, the electronic device constructs a grid array about the carrier-to-noise ratio and the altitude angle for the first terminal.

The plurality of first carrier-to-noise ratio-altitude angle category units corresponding to the first terminal constructed by the electronic device may be represented as:

$$Y_{m \times n, a} = \begin{bmatrix} s_a([a_m, b_m], [c_0, d_0]) & \cdots & s_a([a_m, b_m], [c_n, d_n]) \\ \vdots & \ddots & \vdots \\ s_a([a_0, b_0], [c_0, d_0]) & \cdots & s_a([a_0, b_0], [c_n, d_n]) \end{bmatrix}$$

where $s_a([a_i, b_i], [c_j, d_j])$ is each first carrier-to-noise ratio-altitude angle category unit, $[a_i, b_i]$ is upper and lower boundary values of each first carrier-to-noise ratio-altitude angle category unit, and $[c_j, d_j]$ is left and right boundary values of each first carrier-to-noise ratio-altitude angle category unit. Moreover, a relationship between equations (2) and (3) may be constructed for each first carrier-to-noise ratio-altitude angle category unit.

Figure 10:
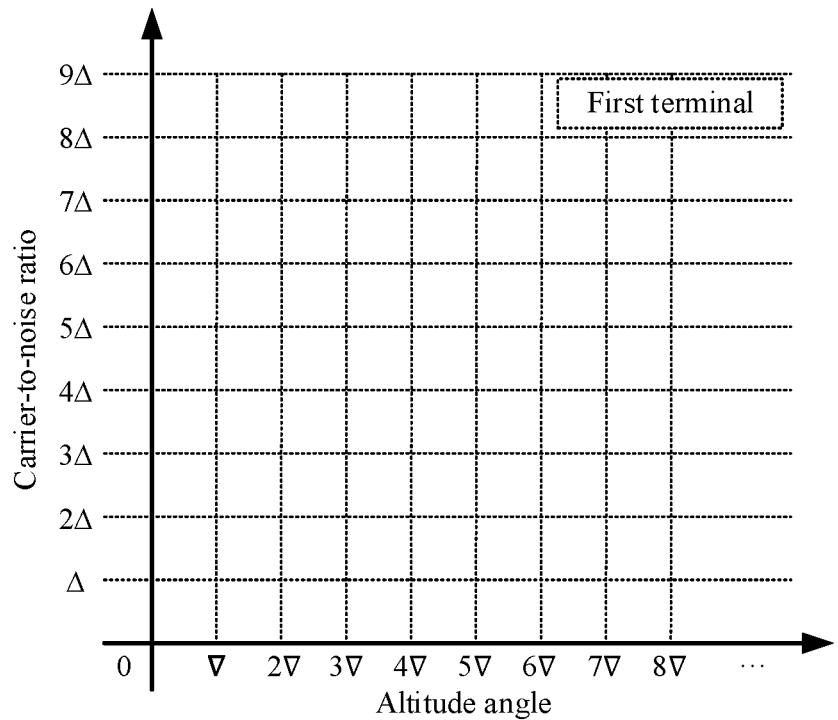
FIG. 10 is an example schematic diagram of a plurality of first carrier-to-noise ratio-altitude angle category units constructed according to some embodiments of this application.

The embodiments of this application provide a schematic diagram of the plurality of first carrier-to-noise ratio-altitude angle category units constructed. Referring to FIG. 10, the plurality of first carrier-to-noise ratio-altitude angle category units corresponding to the first terminal constitute a grid array corresponding to the first terminal. The unit of the horizontal axis is an altitude angle interval, i.e. the interval of each cell is $\nabla$. The unit of the vertical axis is a carrier-to-noise ratio interval, i.e. the interval of each cell is $\Delta$.

S403. The electronic device respectively determines first Doppler single-difference residual sequences for the plurality of first carrier-to-noise ratio-altitude angle category units according to the carrier-to-noise ratio and the altitude angle of the satellite observed by the first terminal, the receiver data, the geometric parameters, the time information, and the first satellite parameters.

After obtaining the plurality of first carrier-to-noise ratio-altitude angle category units observed by the first terminal, the electronic device will determine at least two first matched Doppler single-difference residual values for each first carrier-to-noise ratio-altitude angle category unit by using the carrier-to-noise ratio and the altitude angle of the satellite corresponding to the first terminal of each epoch, the receiver data, the geometric parameters, the time information, and the first satellite parameters (the description will be made below in conjunction with steps S4031-S4032), so as to constitute a first Doppler single-difference residual sequence by using the at least two first matched Doppler single-difference residual values, so as to facilitate subsequent construction of a first Doppler error sub-array.

S404. The electronic device calculates first Doppler error parameters respectively corresponding to the plurality of first carrier-to-noise ratio-altitude angle category units by using the first Doppler single-difference residual sequences, and generates a first Doppler error sub-array of a first device to be calibrated by using the first Doppler error parameters of the plurality of first carrier-to-noise ratio-altitude angle category units.

In the embodiments of this application, the first Doppler single-difference residual sequence includes one or more first matched Doppler single-difference residual values. The first Doppler error parameter may be a Doppler variance value or a Doppler standard deviation value.

When the first Doppler error parameter is a Doppler variance value, the electronic device performs variance calculation on one or more first matched Doppler single-difference residual values (which will be described below in conjunction with equation (13)). That is, a mean value of the first Doppler single-difference residual values is first subtracted from each first matched Doppler single-difference residual value, the squares of each difference value are accumulated, and then a mean value is calculated, so as to obtain a Doppler variance value of each first carrier-to-noise ratio-altitude angle category unit. Then the Doppler variance value of each first carrier-to-noise ratio-altitude angle category unit is filled into the grid array corresponding to the first terminal to obtain the first Doppler error sub-array.

The Doppler variance value of each first carrier-to-noise-ratio-altitude angle category unit may be calculated by using equation (13):

$$\tilde{\sigma}_X^2(b_i, d_j) \approx \frac{1}{f} \cdot \sum_{k=1}^{f}\left(z_k - \frac{1}{f} \cdot \sum_{m=1}^{f} z_m\right)^2 \qquad (13)$$

where $(b_i, d_j)$ is each first carrier-to-noise ratio-altitude angle category unit, $i=0, 1, \ldots$; $j=0, 1, \ldots$. X is the first terminal, i.e. X=a. k and m are labels of the first matched Doppler single-difference residual values, $k \leq f$, $m \leq f$, f is the number of the first matched Doppler single-difference residual values, $z_k$ and $z_m$ both represent the first matched Doppler single-difference residual values, and $\tilde{\sigma}_X^2(b_i, d_j)$ represents the Doppler variance value.

When the first Doppler error parameter is a Doppler variance, the first Doppler error sub-matrix may be represented as:

$$\Psi_{m \times n, a}^2 = \frac{1}{2} \cdot \begin{bmatrix} \tilde{\sigma}_a^2(b_m, d_0) & \cdots & \tilde{\sigma}_a^2(b_m, d_n) \\ \vdots & \ddots & \vdots \\ \tilde{\sigma}_a^2(b_0, d_0) & \cdots & \tilde{\sigma}_a^2(b_0, d_n) \end{bmatrix}$$

When the first Doppler error parameter is a Doppler standard deviation value, the electronic device performs standard deviation calculation on one or more first matched Doppler single-difference residual values. That is, a Doppler variance value of each first carrier-to-noise ratio-altitude angle category unit is first calculated, and then the Doppler variance value of each first carrier-to-noise ratio-altitude angle category unit is subjected to root extraction to obtain a Doppler standard deviation value of each first carrier-to-noise ratio-altitude angle category unit, so as to obtain the first Doppler error sub-array.

When the first Doppler error parameter is a Doppler standard deviation value, the first Doppler error sub-array may be represented as:

$$\Psi_{m \times n,a} = \frac{1}{\sqrt{2}} \cdot \begin{bmatrix} \bar{\sigma}_a(b_m, d_0) & \cdots & \bar{\sigma}_a(b_m, d_n) \\ \vdots & \ddots & \vdots \\ \bar{\sigma}_a(b_0, d_0) & \cdots & \bar{\sigma}_a(b_0, d_n) \end{bmatrix}$$

In the embodiments of this application, the electronic device can first construct a plurality of first carrier-to-noise ratio-altitude angle category units for the first terminal, determine a first Doppler single-difference residual sequence for each first carrier-to-noise ratio-altitude angle category unit, and then constitute a first Doppler error sub-array of the first terminal based on the first Doppler single-difference residual sequence, so as to subsequently determine a Doppler error array collectively corresponding to the first terminal and the second terminal based on the first Doppler error sub-array.

In some embodiments of this application, an example implementation process of S1022c in which the electronic device calibrates a second Doppler error sub-array of the second terminal by using the carrier-to-noise ratio and the altitude angle of the satellite observed by the second terminal, the receiver data, the geometric parameters, the time information, and the second satellite parameters may include: the following S501-S504:

S501. The electronic device extracts a maximum second carrier-to-noise ratio and a maximum second altitude angle from the carrier-to-noise ratio and the altitude angle of the satellite observed by the second terminal.

S502. The electronic device grids the maximum second carrier-to-noise ratio and the maximum second altitude angle according to a carrier-to-noise ratio interval and an altitude angle interval to obtain a plurality of second carrier-to-noise ratio-altitude angle category units.

It is to be noted that the processes of extracting a maximum second carrier-to-noise ratio and a second maximum altitude angle and gridding the maximum second carrier-to-noise ratio and the maximum second altitude angle are similar to the processes S401-S402 in the embodiments of this application.

The plurality of second carrier-to-noise ratio-altitude angle category units corresponding to the second terminal constructed by the electronic device may be represented as:

$$Y_{m \times n,b} = \begin{bmatrix} s_b([a_m, b_m], [c_0, d_0]) & \cdots & s_b([a_m, b_m], [c_n, d_n]) \\ \vdots & \ddots & \vdots \\ s_b([a_0, b_0], [c_0, d_0]) & \cdots & s_b([a_0, b_0], [c_n, d_n]) \end{bmatrix}$$

$s_b([a_i, b_j], [c_i, d_j])$ is each second carrier-to-noise ratio-altitude angle category unit, $[a_i, b_i]$ is upper and lower boundary values of each second carrier-to-noise ratio-altitude angle category unit, and $[c_j, d_j]$ is left and right boundary values of each first carrier-to-noise ratio-altitude angle category unit. Moreover, a relationship between equations (2) and (3) may also be constructed for each second carrier-to-noise ratio-altitude angle category unit.

Figure 11:
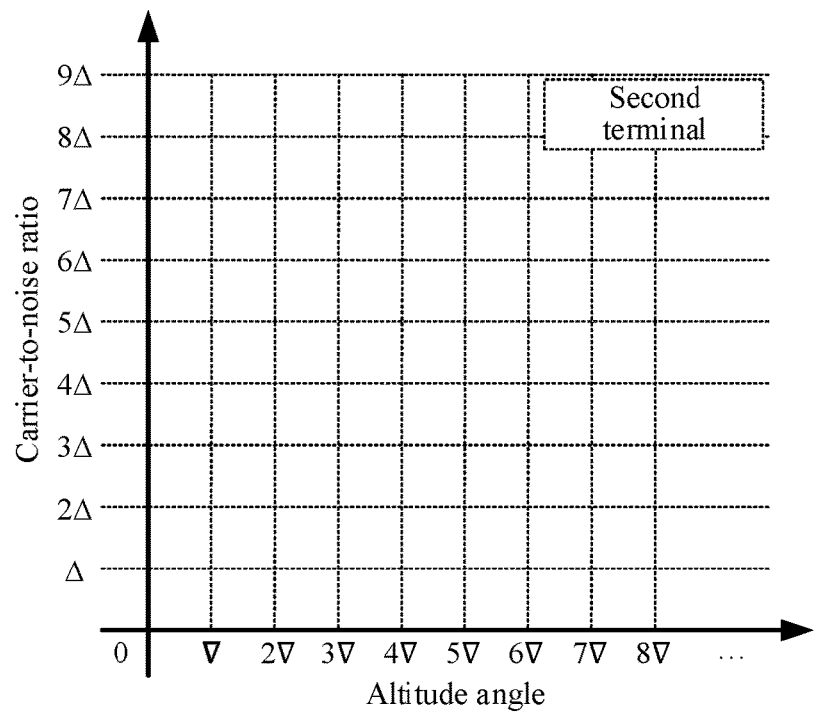
FIG. 11 is an example schematic diagram of a plurality of second carrier-to-noise ratio-altitude angle category units constructed according to some embodiments of this application.

The embodiments of this application provide a schematic diagram of the plurality of second carrier-to-noise ratio-altitude angle category units constructed. Referring to FIG. 11, the plurality of second carrier-to-noise ratio-altitude angle category units constitute a grid array corresponding to the second terminal. The unit of the horizontal axis is an altitude angle interval, i.e. the interval of each cell is ∇. The unit of the vertical axis is a carrier-to-noise ratio interval, i.e. the interval of each cell is Δ.

S503. The electronic device respectively determines second Doppler single-difference residual sequences for the plurality of second carrier-to-noise ratio-altitude angle category units according to the carrier-to-noise ratio and the altitude angle of the satellite observed by the second terminal, the receiver data, the geometric parameters, the time information, and the second satellite parameters.

S504. The electronic device calculates second Doppler error parameters respectively corresponding to the plurality of second carrier-to-noise ratio-altitude angle category units according to the second Doppler single-difference residual sequences, and generates a second Doppler error sub-array of the second terminal by using the second Doppler error parameters of the plurality of second carrier-to-noise ratio-altitude angle category units.

It is to be noted that the process of determining a second Doppler single-difference residual sequence for each second carrier-to-noise ratio-altitude angle category unit (this process will be described below in conjunction with steps S5031-S5033) and the process of determining a second Doppler error sub-array for the second terminal are similar to the processes S403 and S404.

When the second Doppler error parameter is a Doppler standard, the second Doppler error sub-matrix may be represented as:

$$\Psi^2_{m \times n,b} = \frac{1}{2} \cdot \begin{bmatrix} \bar{\sigma}^2_b(b_m, d_0) & \cdots & \bar{\sigma}^2_b(b_m, d_n) \\ \vdots & \ddots & \vdots \\ \bar{\sigma}^2_b(b_0, d_0) & \cdots & \bar{\sigma}^2_b(b_0, d_n) \end{bmatrix}$$

When the first Doppler error parameter is a Doppler standard deviation value, the first Doppler error sub-array may be represented as:

$$\Psi_{m \times n,b} = \frac{1}{\sqrt{2}} \cdot \begin{bmatrix} \bar{\sigma}_b(b_m, d_0) & \cdots & \bar{\sigma}_b(b_m, d_n) \\ \vdots & \ddots & \vdots \\ \bar{\sigma}_b(b_0, d_0) & \cdots & \bar{\sigma}_b(b_0, d_n) \end{bmatrix}$$

In the embodiments of this application, the electronic device can first construct a plurality of second carrier-to-noise ratio-altitude angle category units for the second terminal, determine a second Doppler single-difference residual sequence for each second carrier-to-noise ratio-altitude angle category unit, and then constitute a second Doppler error sub-array of the second terminal based on the second Doppler single-difference residual sequence, so as to subsequently determine a Doppler error array collectively corresponding to the first terminal and the second terminal based on the second Doppler error sub-array.

In some embodiments of this application, the receiver data includes: coordinate data. An example implementation process of S403 in which the electronic device respectively determines first Doppler single-difference residual sequences for the plurality of first carrier-to-noise ratio-altitude angle category units according to the carrier-to-noise ratio and the altitude angle of the satellite observed by the first terminal, the receiver data, the geometric parameters, the time information, and the first satellite parameters may include: the following S4031-S4033:

S4031. The electronic device calculates a first Doppler single-difference residual value corresponding to a combination of each first satellite and the reference satellite of each first satellite based on the coordinate data, the geometric parameters, the time information, and the first satellite parameters.

The first satellite parameters include coordinates and an operating speed of each first satellite and coordinates and an operating speed of a reference satellite of each first satellite. The electronic device first calculates first coordinates and a first operating speed of the first terminal and second coordinates and a second operating speed of the second terminal by using the coordinate data, the time information, and the geometric parameters, respectively. Next, the electronic device constructs an inter-satellite single-difference observation value corresponding to a combination of each first satellite and the reference satellite of each first satellite based on the first coordinates, the first operating speed, the coordinates of each first satellite, the operating speed of each first satellite, the coordinates of the reference satellite of each first satellite, and the operating speed of the reference satellite of each first satellite. The electronic device then calculates a first Doppler calculation factor based on the coordinates of the first terminal, the first operating speed, the coordinates of each first satellite, the operating speed of each first satellite, the operating speed of the reference satellite of each first satellite, and the operating speed of the reference satellite of each first satellite (the calculation process of the first Doppler calculation factor will be described below in conjunction with equation (15)). Next, the electronic device constructs a first Doppler construction factor based on the first coordinates, the coordinates of each first satellite, the operating speed of each first satellite, the operating speed of the reference satellite of each first satellite, the operating speed of the reference satellite of each first satellite, a clock error variation term of each first satellite, and a clock error variation term of the reference satellite of each first satellite (the calculation process of the first Doppler construction factor will be described below in conjunction with equation (16)). Finally, the electronic device successively subtracts the first Doppler calculation factor and the first Doppler construction factor from the inter-satellite single-difference observation value to obtain a first Doppler single-difference residual value.

The embodiments of this application provide a formula for calculating the first Doppler single-difference residual value, referring to equation (14):

$$\delta\dot{\rho}_a^{s's}(t_i)=\nabla\dot{\rho}_a^{s's}(t_i)-\nabla v_a^{s's}(t_i)-\nabla d\dot{t}^{s's}(t_i) \quad (14)$$

where $\nabla\dot{\rho}_a^{s's}(t_i)$ represents the inter-satellite single-difference observation value corresponding to the combination of each first satellite and the reference satellite of each first satellite, $\nabla v_a^{s's}(t_i)$ is the calculated first Doppler calculation factor, and $\nabla d\dot{t}^{s's}(t_i)$ is the constructed first Doppler construction factor.

The embodiments of this application provide a formula for calculating the first Doppler calculation factor, referring to equation (15):

$$\nabla v_a^{s's}(t_i)=e_a^s\cdot(v^s(t_i)-v_a(t_i))-e_a^{s'}\cdot(v^{s'}(t_i)-v_a(t_i)) \quad (15)$$

where $v^s(t_i)$ is the operating speed of each satellite, $v_a(t_i)$ is the operating speed of the first terminal, $e_a^s$ is the first unit observation vector, $v^{s'}(t_i)$ is the operating speed of the reference satellite of each satellite, and $e_a^{s'}$ is the unit observation vector constructed according to the coordinates of the first terminal and the coordinates of the reference satellite of each satellite.

The embodiments of this application provide a formula for the first Doppler construction factor, as shown in equation (16):

$$\nabla d\dot{t}^{s's}(t_i)=(e_a^{s'}\cdot v^{s'}(t_i)+c)\cdot d\dot{t}^{s'}(t_i)-(e_a^s\cdot v^s(t_i)+c)\cdot d\dot{t}^s(t_i) \quad (16)$$

where $e_a^{s'}$ is the unit observation vector constructed according to the coordinates of the first terminal and the coordinates of the reference satellite of each satellite, $v^{s'}(t_i)$ is the operating speed of the reference satellite of each satellite, $d\dot{t}^{s'}(t_i)$ is the clock error variation term of the reference satellite of each satellite, $e_a^s$ is the first unit observation vector, $v^s(t_i)$ is the operating speed of each satellite, $d\dot{t}^s(t_i)$ is the clock error variation term of each satellite, and c is the speed of light.

It is to be noted that the process of calculating the coordinates and moving speed of the first terminal and the coordinates and moving speed of the second terminal is similar to the process S3011.

The process that the electronic device constructs the inter-satellite single-difference observation value corresponding to the combination of each first satellite and the reference satellite of each first satellite is: substituting the first coordinates, the first operating speed, the coordinates of each first satellite, and the operating speed of each first satellite into a mathematical model for calculating Doppler measurement values to obtain a first Doppler observation expression (the mathematical model for calculating Doppler measurement values will be described below by taking the first Doppler observation expression as an example); meanwhile, substituting the first coordinates, the first operating speed, the coordinates of the reference satellite of each first satellite, and the operating speed of the reference satellite of each first satellite into the mathematical model for calculating Doppler measurement values to obtain a second Doppler observation expression, and then performing a difference operation by using the first Doppler observation expression and the second Doppler observation expression to eliminate unknown parameters such as clock error terms, clock error variation rates, Doppler measurement error parameters, and error correction numbers in the first Doppler observation expression and the second Doppler observation expression, so as to obtain the inter-satellite single-difference observation value corresponding to the combination of each first satellite and the reference satellite of each first satellite.

The embodiments of this application provide a formula for calculating the inter-satellite single-difference observation value, referring to equation (17):

$$\nabla\dot{\rho}^{s's}(t_i)=\dot{\rho}_a^s(t_i)-\dot{\rho}_a^{s'}(t_i) \quad (17)$$

where $\dot{\rho}_a^s(t_i)$ represents the first Doppler observation expression of the first terminal under each first satellite, $\dot{\rho}_a^{s'}(t_i)$ represents the constructed second Doppler observation expression of the first terminal under the reference satellite of each first satellite, and $\nabla\dot{\rho}_a^{s's}(t_i)$ is the inter-satellite single-difference observation value corresponding to the combination of the first satellite and the reference satellite of each first satellite.

The mathematical model for calculating Doppler measurement values is described below by taking the generation of a first Doppler observation expression for the first terminal under each first satellite as an example.

The process in which the electronic device constructs a first Doppler observation expression for the first terminal under each first satellite is: performing a norm operation on the difference value between the first coordinates and the coordinates of each first satellite so as to obtain a spatial geometric distance from the first terminal to each first satellite, obtaining a first unit observation vector from the first terminal to each first satellite by a difference value between the coordinates of each first satellite and the coordinates of the first terminal and the spatial geometric distance from the first terminal to each first satellite, multiplying a difference value between the operating speed of each first satellite and the operating speed of the first terminal by the first unit observation vector to obtain a first speed product factor, adding the product of the first unit observation vector and the operating speed of the first terminal to the speed of light, multiplying the obtained sum result by the clock error variation term of the first terminal to obtain a first terminal product factor, adding the product of the first unit observation vector and the operating speed of each first satellite to the speed of light, multiplying the sum result by the clock error variation term of each first satellite to obtain a first satellite product factor, and finally adding the speed product factor, the first terminal product factor, the satellite product factor, and the Doppler measurement error between the first terminal and each first satellite, so as to obtain a first Doppler observation expression.

It is to be understood that the respective clock error terms and Doppler measurement errors are unknown and, in the embodiments of this application, may be eliminated statistically.

The embodiments of this application provide a formula for calculating the first Doppler observation expression, referring to equation (18) as follows:

$$\dot{\rho}_a^s(t_i) = e_a^s \cdot (v^s(t_i) - v_a(t_i)) + (e_a^s \cdot v_a(t_i) + c) \cdot \dot{dt}_a(t_i) - (e_a^s \cdot v^s(t_i) + c) \cdot \dot{dt}^s(t_i) + \delta \dot{\rho}_a^s(t_i) \quad (18)$$

where $v^s(t_i)$ is the operating speed of each satellite, $v_a(t_i)$ is the first operating speed, $e_a^s$ is the first unit observation vector, $\dot{dt}_a(t_i)$ is the clock error variation term of the first terminal, $\dot{dt}^s(t_i)$ is the clock error variation term of each satellite, and $\tilde{\rho}_a^s(t_i)$ is the first Doppler observation expression.

It is to be understood that the process of constructing a second Doppler observation expression for the first terminal under the reference satellite of each first satellite is similar to the process of constructing the first Doppler observation expression for the first terminal under each first satellite.

S4032. The electronic device selects at least two first matched Doppler single-difference residual values corresponding to each first carrier-to-noise ratio-altitude angle category unit from the first Doppler single-difference residual value corresponding to the combination of each first satellite and the reference satellite of each first satellite according to the carrier-to-noise ratio and the first altitude angle of the satellite observed by the first terminal.

In other words, the electronic device determines a corresponding first carrier-to-noise ratio-altitude angle category unit for the satellite observed by the first terminal according to the carrier-to-noise ratio and the altitude angle of the satellite observed by the first terminal, and then classifies the first Doppler single-difference residual value into the first carrier-to-noise ratio-altitude angle category unit. Thus, at least two first Doppler single-difference residual values can be selected for each first carrier-to-noise ratio-altitude angle category unit, and these Doppler single-difference residual values are denoted as first matched Doppler single-difference residual values.

S4033. The electronic device generates the first Doppler single-difference residual sequence by using the at least first second matched Doppler single-difference residual values.

The electronic device combines at least two first matched Doppler single-difference residual values according to a random order to obtain a first Doppler single-difference residual sequence, or combines one or more first matched Doppler single-difference residual values according to descending values to obtain a first Doppler single-difference residual sequence.

In the embodiments of this application, the electronic device can calculate a first Doppler single-difference residual value corresponding to a combination of each first satellite and the reference satellite of each first satellite based on the coordinate data, the geometric parameters, the time information, and the first satellite parameters, then select at least two first matched Doppler single-difference residual values for each first carrier-to-noise ratio-altitude angle category unit according to the first carrier-to-noise ratio and the first altitude angle in the carrier-to-noise ratios and the altitude angles of all the satellites observed by each epoch, and finally combine these first matched Doppler single-difference residual values to obtain a first Doppler residual sequence, so as to facilitate subsequent construction of a first Doppler error sub-array corresponding to the first terminal.

In some embodiments of this application, the receiver data includes: coordinate data. An example implementation process of S503 in which the electronic device respectively determines second Doppler single-difference residual sequences for the plurality of second carrier-to-noise ratio-altitude angle category units according to the carrier-to-noise ratios and the altitude angles of all the satellites observed by the second terminal, the receiver data, the geometric parameters, the time information, and the second satellite parameters may include: the following S5031-S5033:

S5031. The electronic device calculates a second Doppler single-difference residual value corresponding to a combination of each second satellite and the reference satellite of each second satellite by using the coordinate data, the geometric parameters, and the second satellite parameters.

S5032. The electronic device selects at least two second matched Doppler single-difference residual values corresponding to each second carrier-to-noise ratio-altitude angle category unit from the second Doppler single-difference residual value corresponding to the combination of each second satellite and the reference satellite of each second satellite according to the carrier-to-noise ratio and the altitude angle observed by the second terminal.

S5033. The electronic device generates the second Doppler single-difference residual sequence by using the at least two second matched Doppler single-difference residual values.

It is to be noted that the implementation of S5031-S5033 is substantially similar to the implementation of S4031-S4034.

In the embodiments of this application, the electronic device can calculate a second Doppler single-difference residual value corresponding to a combination of each second satellite and the reference satellite of each second satellite based on the coordinate data, the geometric parameters, the time information, and the second satellite parameters, then select a plurality of second matched Doppler single-difference residual values for each second carrier-to-noise ratio-altitude angle category unit according to the carrier-to-noise ratio and the altitude angle of the satellite observed by the second terminal, and finally combine these second matched Doppler single-difference residual values to obtain a second Doppler residual sequence, so as to facilitate subsequent construction of a second Doppler error sub-array corresponding to the second terminal.

In some embodiments of this application, the observation data includes: sub-observation data of each epoch in a plurality of epochs. The sub-observation data includes: carrier-to-noise ratios and altitude angles of all satellites collectively observed by the first terminal and the second terminal, a carrier-to-noise ratio and an altitude angle of a first satellite corresponding to the first terminal, and a carrier-to-noise ratio and an altitude angle of a second satellite corresponding to the second terminal. In this case, an example implementation process of S101 in which the electronic device acquires satellite data according to the observation data may include: the following 1011-S1017:

S1011. The electronic device filters, for each satellite in all collectively observed satellites, a candidate reference satellite belonging to the same satellite system from all the collectively observed satellites.

S1012. When an error between a carrier-to-noise ratio of the candidate reference satellite and a carrier-to-noise ratio of each satellite is within an error range and an error between an altitude angle of the candidate reference satellite and an altitude angle of each satellite is within an error range, the electronic device determines the candidate reference satellite as a reference satellite of each satellite.

The electronic device may directly calculate an error between a carrier-to-noise ratio of the candidate reference satellite and a carrier-to-noise ratio of each satellite, determine whether the error is within an error range, calculate an error between an altitude angle of the candidate reference satellite and an altitude angle of each satellite, and determine whether the error is within an error range. The electronic device may also construct a grid array for each satellite system, determine whether a grid determined according to the carrier-to-noise ratio and the altitude angle of each satellite and a grid determined according to the carrier-to-noise ratio and the altitude angle of the candidate reference satellite are the same. When the grids are the same, it is determined that the candidate reference satellite is the reference satellite of each satellite.

In the case of the pth grid $$\left(p = \left[\frac{CN0_{s^j}}{\Delta}\right],\right.$$

$s^j$ is each satellite) from bottom to top along the vertical axis and the qth grid $$\left(q = \left[\frac{el_{s^j}}{\nabla}\right]\right)$$

from left to right along the horizontal axis in the grid array determined according to the carrier-to-noise ratio and the altitude angle of each satellite, the candidate reference satellite is determined as the reference satellite of each satellite when the candidate reference satellite satisfies $$\left[\frac{CN0_{s^{ri}}}{\Delta}\right] = p, \left[\frac{el_{s^{ri}}}{\nabla}\right] = q$$

($s^{ri}$ is the reference satellite of each satellite).

S1013. The electronic device filters, for each first satellite, a first candidate satellite belonging to the same satellite system.

S1014. When an error between a carrier-to-noise ratio of the first candidate satellite and a carrier-to-noise ratio of each first satellite is within an error range and an error between an altitude angle of the first candidate satellite and an altitude angle of each first satellite is within an error range, the electronic device determines the first candidate satellite as a reference satellite of each first satellite.

S1015. The electronic device filters, for each second satellite, a second candidate satellite belonging to the same satellite system.

S1016. When an error between a carrier-to-noise ratio of the second candidate satellite and a carrier-to-noise ratio of each second satellite is within an error range and an error between an altitude angle of the second candidate satellite and an altitude angle of each second satellite is within an error range, the electronic device determines the second candidate satellite as a reference satellite of each second satellite.

It is to be noted that the implementation of S1013-S1014 and the implementation of S1015-S1016 are both similar to the implementation of S1011-S1012.

In the case of the pth grid $$\left(p = \left[\frac{CN0_{s^k}}{\Delta}\right],\right.$$

$s^k$ is each satellite) from bottom to top along the vertical axis and the qth grid $$\left(q = \left[\frac{el_{s^k}}{\nabla}\right]\right)$$

from left to right along the horizontal axis in the grid array determined according to the carrier-to-noise ratio and the altitude angle of each first satellite, the first candidate satellite is determined as the reference satellite of the first satellite when the first candidate satellite satisfies $$\left[\frac{CN0_{s^{ra}}}{\Delta}\right] = p, \left[\frac{el_{s^{ra}}}{\nabla}\right] = q$$

($s^{ra}$ is the reference satellite of each satellite).

S1017. The electronic device respectively acquires satellite parameters corresponding to each satellite, the reference satellite of each satellite, each first satellite, the reference satellite of each first satellite, each second satellite, and the reference satellite of each second satellite from a precise ephemeris database, and determines satellite data by using the acquired satellite parameters.

In the embodiments of this application, the electronic device can first determine, from observation data, each satellite in all satellites collectively observed by the first terminal and the second terminal, the first satellite observed by the first terminal, the second satellite observed by the second terminal, and reference satellites of these satellites, acquire satellite parameters of these satellites and the reference satellites of these satellites, and then constitute satellite data by using the obtained satellite parameters.

In some embodiments of this application, after S103 in which the electronic device fits pseudo-range error models respectively corresponding to the at least two terminals by using the pseudo-range error array and fits Doppler error models respectively corresponding to the at least two terminals by using the Doppler error array, the method may further include: the following S104:

S104. The electronic device stores the pseudo-range error models and the Doppler error models in the at least two terminals, whereby the at least two terminals are positioned by the pseudo-range error models and the Doppler error models.

It is to be noted that since the pseudo-range error models and Doppler error models are calibrated based on the distribution situations of pseudo-range measurement errors under different carrier-to-noise ratios and altitude angles and the distribution situations of Doppler measurement errors under different carrier-to-noise ratios and altitude angles, the environment and the influence of terminal noise on pseudo-range and Doppler measurement values can be well reflected. Thus, the positioning based on the pseudo-range error models and Doppler error models will be more accurate.

In some embodiments of this application, after receiving observation data collected by a calibration device, the electronic device may also pre-process the observation data. For example, coarse values are eliminated from data such as the pseudo-range measurement value of the first terminal of each epoch, the pseudo-range measurement value of the second terminal, the Doppler measurement value of the first terminal, the Doppler measurement value of the second terminal, precision coordinates of the first satellite receiver, and precision coordinates of the second satellite receiver in the observation data to constitute data units. Then, the data units corresponding to each epoch are integrated so as to obtain the pre-processed observation data. In the subsequent calibration process, the various data of each epoch is directly extracted from the pre-processed observation data.

The pre-processed observation data may be as shown in equation (19):

$$\mathcal{R} = \left\{ \begin{array}{c} [\alpha_a(t_1), \alpha_b(t_1), \beta_a(t_1), \beta_b(t_1), r_A(t_1), r_B(t_1)] \\ \vdots \\ [\alpha_a(t_n), \alpha_b(t_n), \beta_a(t_n), \beta_b(t_n), r_A(t_n), r_B(t_n)] \end{array} \right\} \quad (19)$$

where there are n data units (one epoch corresponds to one data unit) in $\mathcal{R}$, $\alpha_a(t_i)$ is a pseudo-range observation value of a first terminal of an epoch $t_i$, $a_b(t_i)$ is a pseudo-range observation value of a second terminal of the epoch $t_i$, $\beta_a(t_i)$ is a Doppler observation value of the first terminal of the epoch $t_i$, $\beta_b(t_i)$ is a Doppler observation value of the second terminal of the epoch $t_i$, $r_A(t_i)$ is precise coordinates of a first satellite receiver of the epoch $t_i$, and $r_B(t_i)$ is precise coordinates of a second satellite receiver of the epoch $t_i$.

It is to be noted that the embodiments of this application also provide an error model-based positioning method. The method is performed by a terminal, and may include: the following S105-S109:

S105. The terminal acquires, when a trigger operation is received in a map interface, a pseudo-range error model and a Doppler error model in response to the trigger operation.

It is to be noted that the pseudo-range measurement error model is obtained by fitting a pseudo-range error array, the Doppler error model is obtained by fitting a Doppler error array, and the pseudo-range error array and the Doppler error array are determined by an electronic device based on observation data collected by a calibration device, satellite data corresponding to the observation data, and geometric parameters of the calibration device.

It is to be understood that the trigger operation may be long press, click, double-click, and other operations of a user on a display screen of the terminal, or a voice operation. For example, the trigger operation may be a user clicking a positioning button on a map interface, or a user clicking a voice assistant on a map interface and saying the statement "Where am I now?". This is not limited by this application herein.

S106. The terminal determines a target position based on the pseudo-range error model, the Doppler error model, and collected current observation data.

After obtaining the pseudo-range error model and the Doppler error model, the terminal will transmit information to a navigation satellite and collect relevant data of the observed satellite, determine a pseudo-range observation error and a Doppler observation error according to a carrier-to-noise ratio and an altitude angle of the satellite in the current observation data, calculate a pseudo-range observation true value and a Doppler observation true value in combination with a pseudo-range observation value and a Doppler observation value in the current observation data, and finally determine a current location of a user according to the pseudo-range observation true value and the Doppler observation true value, i.e. determine a current position.

S107. The terminal acquires map information within a position region where the current position is located from a map information database.

The terminal acquires map information within a position region where the current position is located, i.e. acquires map information that the distance from the current position is less than or equal to a place within the position region, from a map information database stored in the terminal or from an on-line map information database. It is to be understood that the position region may be 1 kilometer or 500 meters. This is not limited by this application herein.

S108. The terminal displays the map information on the map interface, and presents a positioning identifier on the current position.

The terminal draws and renders the acquired map information, and then presents the map information on the map interface. Moreover, in order to enable the user to find the current position in time, the terminal will present a positioning identifier on the current position to remind the user of the current position.

Figure 12:
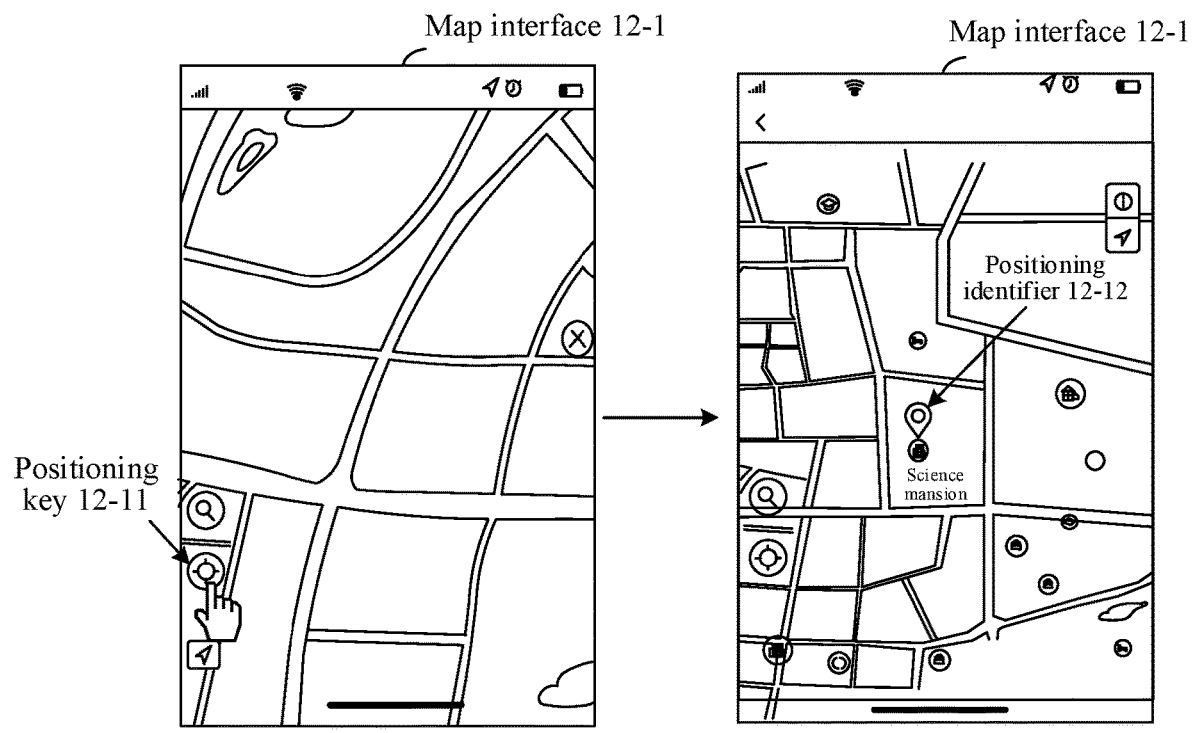
FIG. 12 is an example schematic diagram of a positioning process according to some embodiments of this application.

The embodiment of this application provide a schematic diagram of a positioning process. Referring to FIG. 12, a positioning key 12-11 is displayed on a map interface 12-1, and meanwhile, map information corresponding to an initial position is also displayed, which may be a previous position of the user or a position set by the user. When the user clicks the key, a pseudo-range error model and a Doppler error model are acquired, and current observation data is collected so as to determine a current position. Map information within a position region where the current position is located is drawn on the map interface 12-1, and the current position is marked out by using a positioning identifier 12-12. That is, the position of a science mansion is marked out so as to facilitate the user to view.

In the embodiments of this application, the terminal may perform positioning according to the pseudo-range error model and the Doppler error model, and display the positioned map information within the position region where the current position is located on a display interface of the terminal, so as to provide the user with more accurate positioning services.

In some embodiments of this application, the terminal may also provide the user with navigation services according to the current position obtained based on the pseudo-range error model and the Doppler error model, thereby making a navigation route more accurate.

The following describes an example application of this embodiment of this application in an actual application scenario.

Figure 13:
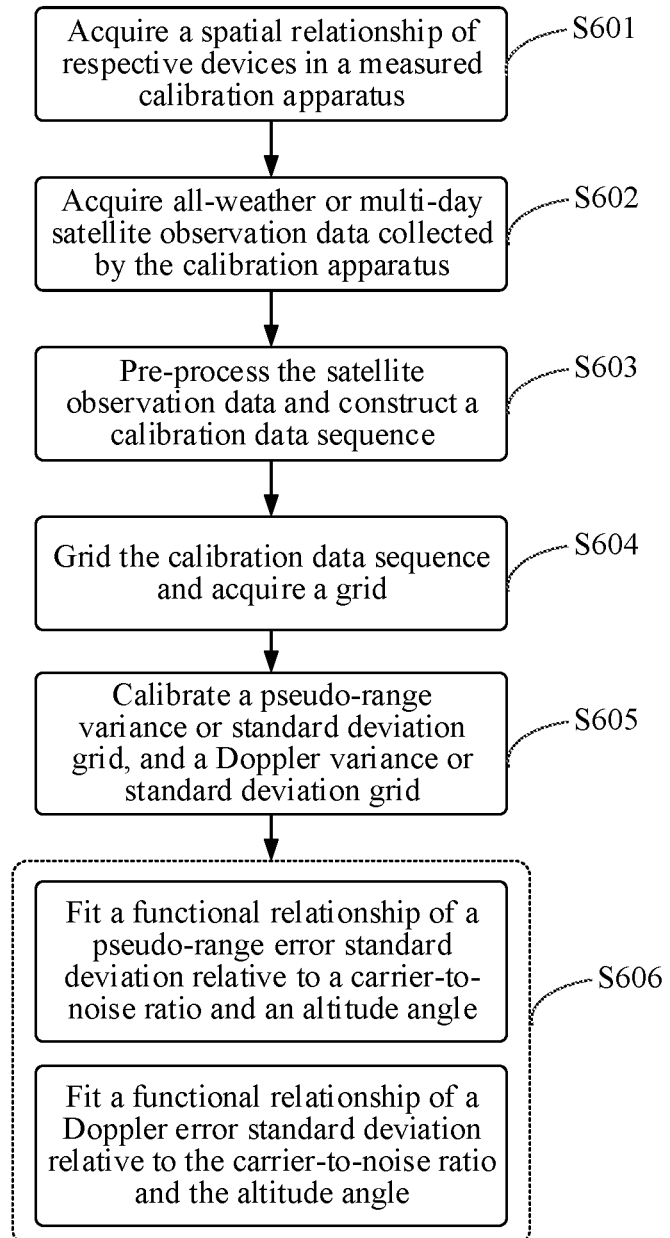
FIG. 13 is an example schematic diagram of a calibration flow according to some embodiments of this application.

The embodiments of this application are implemented in a scenario where a calculation device (electronic device) calibrates a pseudo-range error model and a Doppler error model by using a calibration apparatus (calibration device). Reference is now made to FIG. 13. FIG. 13 is a schematic diagram of a calibration flow according to an embodiment of this application. The calibration process includes the following steps:

S601. The calculation device acquires a spatial relationship (geometric parameters of the calibration device) of various devices in a measured calibration apparatus.

The calibration device includes two identical devices to be calibrated (at least two terminals: a first terminal and a second terminal), two high-precision GNSS receivers (two satellite receivers), four fixing apparatuses (used for fixing the devices to be calibrated and the high-precision GNSS receivers), and a device fixing plate (used for carrying the devices to be calibrated and the high-precision receivers). The two identical devices to be calibrated and GNSS measurement phase centers of the two high-precision GNSS receivers remain on the same straight line. Geometric distances between the respective devices are measured by using a laser ranger and other devices.

S602. The calculation device acquires all-weather or multi-day (multiple epochs) satellite observation data (observation data) collected by the calibration apparatus.

S603. The calculation device pre-processes the satellite observation data and constructs a calibration data sequence (pre-processed observation data).

Figure 14:
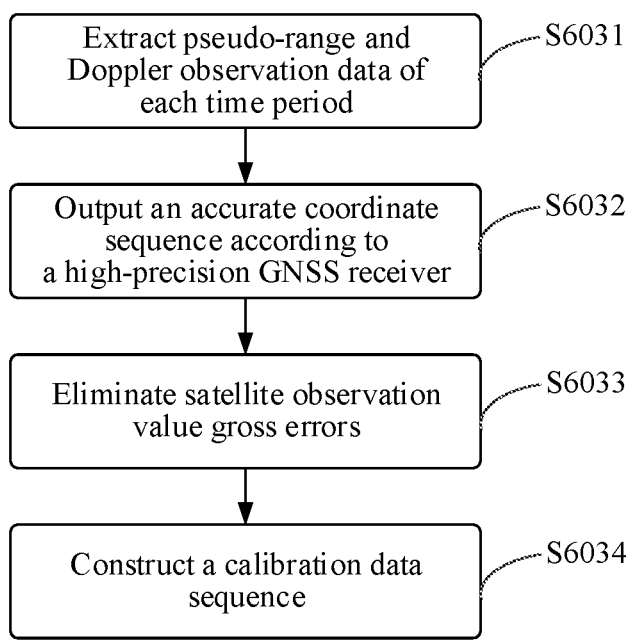
FIG. 14 is an example schematic diagram of a process of constructing a calibration data sequence according to some embodiments of this application.

The collected all-weather or multi-day observation data is pre-processed. FIG. 14 is a schematic diagram of a process of constructing a calibration data sequence according to an embodiment of this application. The process mainly includes the following steps:

S6031. The calculation device extracts pseudo-range and Doppler observation data (a Doppler measurement value and a pseudo-range measurement value of each epoch) of each time period.

S6032. The calculation device acquires an accurate coordinate sequence (coordinates of the first satellite receiver and coordinates of the second satellite receiver, i.e. coordinate data) output by the high-precision GNSS receivers.

S6033. The calculation device eliminates satellite observation value gross errors (such as observation errors or errors caused by device movement).

S6034. The calculation device constructs a calibration data sequence.

S604. The calculation device grids the calibration data sequence and acquires a grid.

S605. The calculation device calibrates a pseudo-range variance or standard deviation grid, and a Doppler variance or standard deviation grid (pseudo-range error array and Doppler error array).

S606. The calculation device fits a functional relationship of a pseudo-range error standard deviation relative to a carrier-to-noise ratio and a satellite altitude angle, and fits a functional relationship of a Doppler measurement error standard deviation relative to the carrier-to-noise ratio and the satellite altitude angle.

Figure 15:
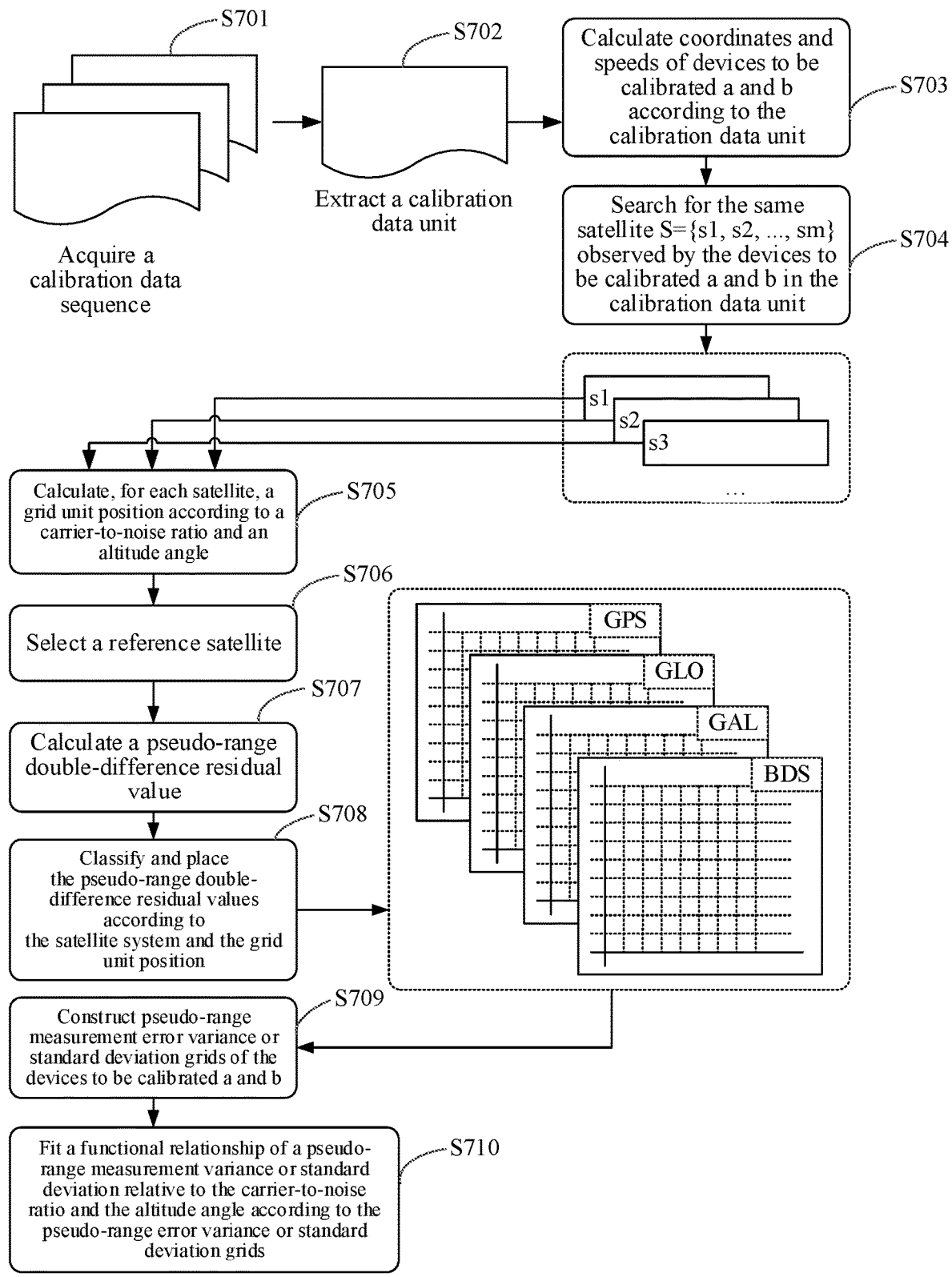
FIG. 15 is an example schematic diagram of a calibration flow of a pseudo-range error model according to some embodiments of this application.

The calibration processes of the pseudo-range error model and the Doppler error model are introduced below respectively. FIG. 15 is a schematic diagram of a calibration flow of a pseudo-range error model according to an embodiment of this application. Referring to FIG. 15, the process includes the following steps:

S701. Acquire a calibration data sequence.

S702. Extract a calibration data unit (sub-observation data corresponding to a current epoch).

S703. Calculate coordinates and speeds of devices to be calibrated a and b according to the calibration data unit.

The calculation device may calculate coordinates $r_a(t_i)$ of the device to be calibrated a, coordinates $r_b(t_i)$ of the device to be calibrated b, a moving speed $v_a(t_i)$ of the device to be calibrated a, and a moving speed $v_b(t_i)$ of the device to be calibrated b according to equations (4), (5), (6), and (7).

S704. Search for the same satellite S={s1, s2, sm} observed by the devices to be calibrated a and b in the calibration data unit.

Since each epoch corresponds to one calibration data unit, there are n calibration data units in total. The calculation device successively performs the following processing on the calibration data units (sub-observation data of each epoch) of an epoch $t_i$ (i=1, 2, . . . , n):

the devices to be calibrated a and b at the epoch $t_i$ observe $m_i$ identical satellites: $S(t_i)=\alpha_a(t_i) \cap \alpha_b(t_i)=\{s^1, s^2, s^{m_i}\}$ (i.e. all satellites collectively observed by the first terminal and the second terminal). Assuming that the carrier-to-noise ratio and the altitude angle of a satellite $s^j$ are $CN0_{s^j}$ and $el_{s^j}$, j=1, 2, . . . , $m_i$ (that is, each satellite in all the collectively observed satellites), a grid unit position of the satellite $s^j$ may be calculated according to $$p = \left[\frac{CN0_{s^j}}{\Delta}\right] \text{ and } q = \left[\frac{el_{s^j}}{\nabla}\right]$$

(i.e. first divided into a system carrier-to-noise ratio-altitude angle category unit for each satellite), where [ ] represents a rounding operation.

S5705. Calculate a grid unit position for each satellite (each satellite in all collectively observed satellites) according to a carrier-to-noise ratio and an altitude angle.

S5706. Select a reference satellite.

A reference satellite $s^{ri}$ belongs to the same satellite system with a satellite $s^j$, and satisfies $$\left[\frac{CN0_{s^{ri}}}{\Delta}\right] = p \text{ and } \left[\frac{el_{s^{ri}}}{\nabla}\right] = q$$

(i.e. the satellites may be divided into the same grid, or errors between the carrier-to-noise ratio and the altitude angle of the reference satellite and the carrier-to-noise ratio and the altitude angle of each satellite are within an error range).

S707. Calculate a pseudo-range double-difference residual value.

Figure 16:
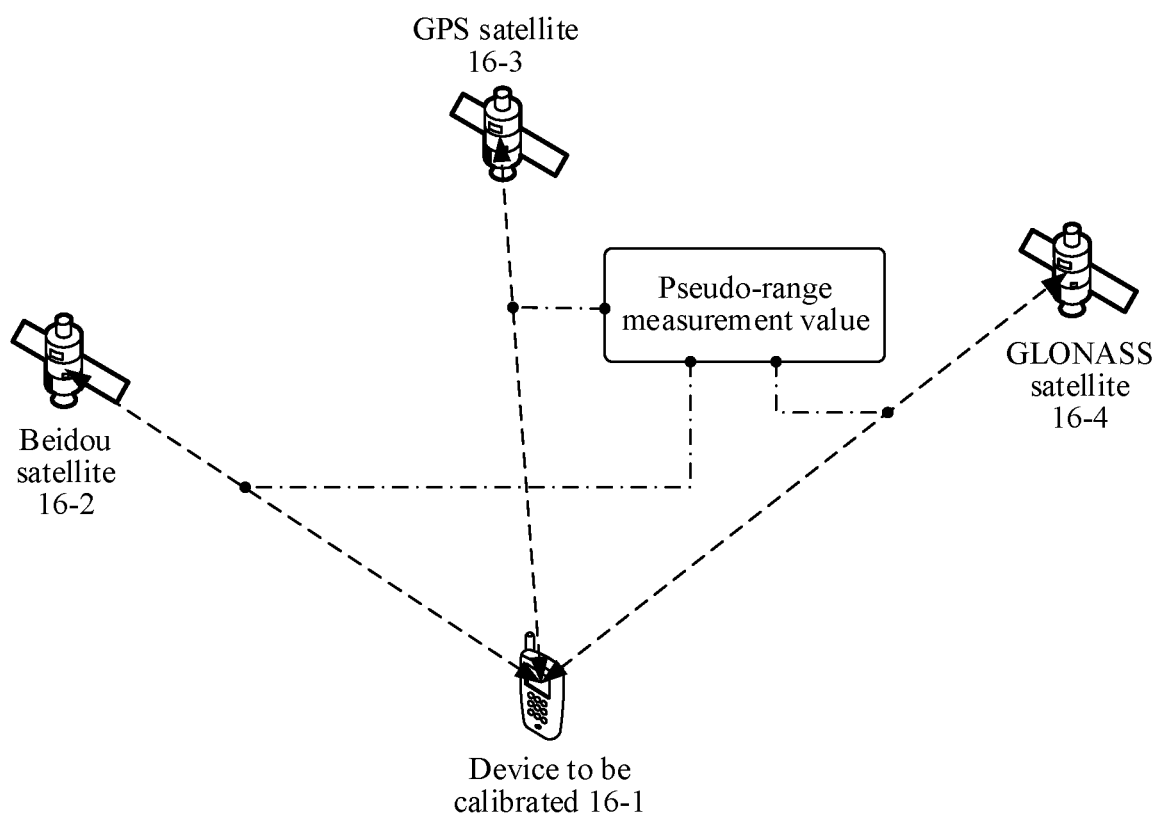
FIG. 16 is an example schematic diagram of distance measurement according to some embodiments of this application.

The pseudo-range double-difference residual value may be obtained by equation (12). The pseudo-range observation value represents a distance measurement value of the satellite and the device to be calibrated. FIG. 16 is a schematic diagram of distance measurement according to an embodiment of this application. Referring to FIG. 16, a distance from a device to be calibrated 16-1 to a Beidou satellite 16-2, a GPS satellite 16-3 and GLONASS 16-4 is the pseudo-range measurement value measured by the device to be calibrated.

Assuming that the device to be calibrated a observes a satellite s at an epoch $t_i$ and the pseudo-range measurement value thereof is $\tilde{p}_a^s(t_i) \in \alpha_a(t_1)$, there may be a pseudo-range observation equation as equation (9) (a first pseudo-range observation relationship, a second pseudo-range observation relationship, a third pseudo-range observation relationship, and a fourth pseudo-range observation relationship). Meanwhile, assuming that the satellite $s^r$ is a reference satellite and the devices to be calibrated a and b constitute a baseline, a pseudo-range double-difference observation value may be constituted, which is represented by equation (8), and the calculation device substitutes equation (9) into equation (8), so that unknown parameters such as an error correction number, an clock error of the device to be calibrated, and a satellite clock error may be eliminated, and after ignoring small terms, equation (12) can be obtained, thereby obtaining a pseudo-range double-difference residual value $\delta\rho_{ab}^{s^r,j}(t_i)$. The parameters in equation (12) are known, and may be obtained by equation (8), equation (10) (corresponding to a first pseudo-range residual factor), and equation (11) (corresponding to a second pseudo-range residual factor).

S5708. Classify and place the pseudo-range double-difference residual value according to the satellite system and the grid unit position.

That is, if $s^j$ belongs to a GPS satellite system, it is classified into a GPS grid unit $\{[a_p, b_p], [c_q, d_q]\}$. If $s^j$ belongs to a GLONASS satellite system, it is classified into a GLONASS grid unit $\{[a_p, b_p], [c_q, d_q]\}$. If $s^j$ belongs to a GALILEO satellite system, it is classified into a GALILEO grid unit $\{[a_p, b_p], [c_q, d_q]\}$. If $s^j$ belongs to a BDS satellite system, it is classified into a BDS grid unit $\{[a_p, b_p], [c_q, d_q]\}$ (i.e. determining a corresponding target pseudo-range double-difference residual value for each carrier-to-noise ratio-altitude angle category unit of each satellite system). By analogy, $m_i$ satellites $S(t_i)$ are classified into corresponding grid units (each carrier-to-noise ratio-altitude angle category unit determines at least two corresponding target pseudo-range double-difference residual values).

S5709. Construct pseudo-range measurement error variance or standard deviation grids of the devices to be calibrated a and b.

Each grid unit corresponds to a group of pseudo-range double-difference residual value sequences (a pseudo-range double-difference residual sequence corresponding to each system carrier-to-noise ratio-altitude angle category unit).

Next, variance values are calculated for a group of pseudo-range double-difference residual sequences by using equation (1), and then variance grids $\tilde{Y}_{m \times n, GPS}^2$, $\tilde{Y}_{m \times n, GLO}^2$, $\tilde{Y}_{m \times n, GAL}^2$, and $\tilde{Y}_{m \times n, BDS}^2$ of each satellite system are constructed, so as to obtain pseudo-range error variance grids $\tilde{\Psi}_{m \times n, GPS}^2$, $\tilde{\Psi}_{m \times n, GLO}^2$, $\tilde{\Psi}_{m \times n, GAL}^2$, and $\tilde{\Psi}_{m \times n, BDS}^2$ of the devices to be calibrated a and b, or pseudo-range error standard deviation grids $\tilde{\Psi}_{m \times n, GPS}$, $\tilde{\Psi}_{m \times n, GLO}$, $\tilde{\Psi}_{m \times n, GAL}$, and $\tilde{\Psi}_{m \times n, BDS}$ of each satellite system (i.e. a pseudo-range error array of each satellite system).

S710. Fit a functional relationship (pseudo-range error model) of a pseudo-range measurement variance or standard deviation relative to the carrier-to-noise ratio and the altitude angle according to the pseudo-range error variance grids or the pseudo-range error standard deviation grids.

Figure 17:
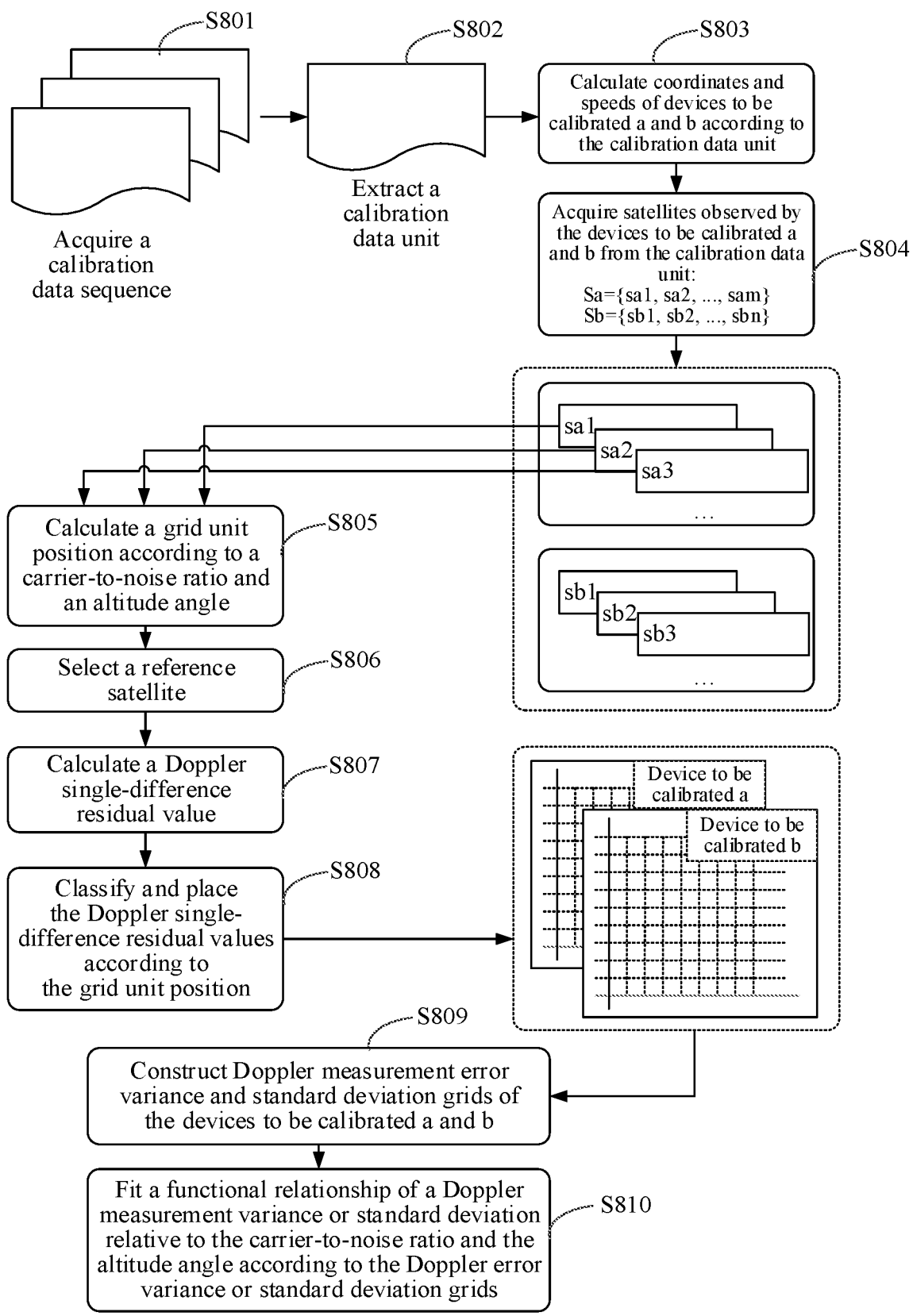
FIG. 17 is an example schematic diagram of a calibration flow of a Doppler error model according to some embodiments of this application.

FIG. 17 is a schematic diagram of a calibration flow of a Doppler error model according to an embodiment of this application. Referring to FIG. 17, the process includes the following steps:

S801. Acquire a calibration data sequence.

S802. Extract a calibration data unit.

S803. Calculate coordinates and speeds of devices to be calibrated a and b according to the calibration data unit.

The calculation device may calculate coordinates $r_a(t_i)$ of the device to be calibrated a, coordinates $r_b(t_i)$ of the device to be calibrated b, a moving speed $v_a(t_i)$ of the device to be calibrated a, and a moving speed $v_b(t_i)$ of the device to be calibrated b according to equations (4), (5), (6), and (7).

S804. Acquire, from the calibration data unit, observation satellites $Sa = \{sa1, sa2, \ldots, sam\}$ and $Sb = \{sb1, sb2, sbn\}$ of the devices to be calibrated a and b (determine a first satellite and a second satellite).

The device to be calibrated a observes $m_{ai}$ satellites (all first satellites) at an epoch $t_i$, and the device to be calibrated b observes $m_{bi}$ satellites (all second satellites) at the epoch $t_i$.

S805. Calculate a grid unit position according to a carrier-to-noise ratio and an altitude angle.

A grid unit position of a satellite $s^k$ (k=1, 2, . . . $m_{ai}$) is calculated by using $$p = \left[\frac{CN0_{s^k}}{\Delta}\right] \text{ and } q = \left[\frac{el_{s^k}}{\nabla}\right].$$

A grid unit position of a satellite $s^k$ (k=1, 2, . . . $m_{bi}$) is calculated by using $$x = \left[\frac{CN0_{s^k}}{\Delta}\right] \text{ and } y = \left[\frac{el_{s^k}}{\nabla}\right].$$

S806. Select a reference satellite.

A reference satellite $s^{ra}$ is selected from $m_{ai}$ satellites, needing to satisfy $$\left[\frac{el_{s^{ra}}}{\nabla}\right] = q \text{ and } \left[\frac{CN0_{s^{ra}}}{\Delta}\right] = p.$$

A reference satellite $s^{rb}$ is selected from $m_{bi}$ satellites, needing to satisfy the following relationships:

$$\left[\frac{el_{s^{rb}}}{\nabla}\right] = y \text{ and } \left[\frac{CN0_{s^{rb}}}{\Delta}\right] = x.$$

S807. Calculate a Doppler single-difference residual value.

Doppler single-difference residual values (first Doppler single-difference residual values) of a satellite $s^k$ and a reference satellite $s^{ra}$ may be calculated by equation (14), and Doppler single-difference residual values (second Doppler single-difference residual values) of the satellite $s^k$ and a reference satellite $s^{ra}$ may be obtained by a similar formula to equation (14), i.e. $\delta\dot{\rho}^{s^{rb}_s k}(t_i) = \nabla \dot{\tilde{\rho}}_b^{s^{rb}_s k}(t_i) - \nabla v_b^{s^{rb}_s k}(t_i) - \nabla d\dot{t}^{s^{rb}_s k}(t_i)$.

S808. Classify and place the Doppler single-difference residual values according to the grid unit position.

The Doppler single-difference residual value $\delta\dot{\rho}_a^{s^ra^k}(t_i)$ is classified into a grid unit $\{[a_p, b_p], [c_q, d_q]\}$ of a grid of the device to be calibrated b, and the Doppler single-difference residual value $\delta\dot{\rho}_b^{s^rb^k}(t_i)$ is classified into a grid unit $\{[a_x, b_x], [c_y, d_y]\}$ of a grid of the device to be calibrated b.

S809. Construct Doppler measurement error variance and standard deviation grids of the devices to be calibrated a and b.

A group of Doppler single-difference residual value sequences are determined for each grid unit in the grid $Y_{m \times n,a}$ corresponding to the device to be calibrated a. A group of Doppler single-difference residual value sequences are determined for the grid $Y_{m \times n,b}$ corresponding to the device to be calibrated b.

Next, according to the Doppler single-difference residual value sequence, a Doppler error variance grid $\tilde{\Psi}_{m \times n,a}^2$ or a Doppler error standard deviation grid $\tilde{\Psi}_{m \times n,a}$ (first Doppler error sub-array) of the device to be calibrated a is calculated by using equation (13), and a Doppler error variance grid $\tilde{\Psi}_{m \times n,b}^2$ or a Doppler error standard deviation grid $\tilde{\Psi}_{m \times n,b}$ (second Doppler error sub-array) of the device to be calibrated b is calculated. The two Doppler error variance grids or the two Doppler error standard deviation grids are summed to obtain Doppler error grids (a Doppler error array collectively corresponding to at least two terminals) of the devices to be calibrated a and b.

S810. Fit a functional relationship (Doppler error model) of a Doppler measurement variance or standard deviation relative to the carrier-to-noise ratio and the altitude angle according to the Doppler error variance or standard deviation grids.

In this way, pseudo-range error models and Doppler error models can be calibrated for mobile devices such as smart phones and vehicle navigation chips, the universality is high, and the pseudo-range error model and the Doppler error model are applied to a map positioning technology, so that the positioning accuracy of mobile terminals can be improved.

An example structure of the error model calibration apparatus 455 according to the embodiments of this application being implemented as a software module is continuously described below. In some embodiments, as shown in FIG. 2A, the software module in the error model calibration apparatus 455 stored in the first memory 450 may include:

a data acquisition module 4551, configured to receive observation data collected by a calibration device, and acquire satellite data according to the observation data;

an array calibration module 4552, configured to calibrate a pseudo-range error array and a Doppler error array, respectively, for at least two terminals in the calibration device based on the observation data, geometric parameters of the calibration device, and satellite data, the pseudo-range error array describing a discrete distribution of pseudo-range measurement errors of the at least two terminals under a carrier-to-noise ratio and an altitude angle of a satellite, and the Doppler error array describing a discrete distribution of Doppler measurement errors of the at least two terminals under the carrier-to-noise ratio and the altitude angle of the satellite; and a model fitting module 4553, configured to fit pseudo-range error models respectively corresponding to the at least two terminals by using the pseudo-range error array, and fit Doppler error models respectively corresponding to the at least two terminals by using the Doppler error array, the pseudo-range error models and the Doppler error models being collectively configured to position the at least two terminals.

In some embodiments of this application, the at least two terminals include: a first terminal and a second terminal. The observation data includes: sub-observation data of each epoch in a plurality of epochs.

The array calibration module 4552 is further configured to calibrate a pseudo-range error array collectively corresponding to the first terminal and the second terminal based on the sub-observation data of each epoch, the geometric parameters, and matched satellite parameters of each epoch in the satellite data, the matched satellite parameters including parameters of satellites collectively observed by the first terminal and the second terminal and parameters of reference satellites of the collectively observed satellites; calibrate a Doppler error array collectively corresponding to the first terminal and the second terminal according to the sub-observation data corresponding to each epoch, the geometric parameters, and first satellite parameters and second satellite parameters of each epoch in the satellite data, the first satellite parameters including parameters of a first satellite observed by the first terminal and parameters of a reference satellite of the first satellite, and the second satellite parameters including parameters of a second satellite observed by the second terminal and parameters of a reference satellite of the second satellite.

In some embodiments of this application, the calibration device includes: at least two satellite receivers. The sub-observation data of each epoch includes: terminal data collected by the first terminal and the second terminal, receiver data collected by the at least two satellite receivers, and time information of each epoch.

The array calibration module 4552 is further configured to extract carrier-to-noise ratios and altitude angles of satellites collectively observed by the first terminal and the second terminal of each epoch from the terminal data, the number of the collectively observed satellites being one or more, and the plurality of collectively observed satellites coming from one or more satellite systems; grid, for each satellite system, a plurality of system carrier-to-noise ratio-altitude angle category units based on the carrier-to-noise ratios and the altitude angles of the collectively observed satellites; determine a corresponding pseudo-range double-difference residual sequence for each system carrier-to-noise ratio-altitude angle category unit according to the time information, the receiver data, the geometric parameters, and the matched satellite parameters; calculate a pseudo-range error parameter of each system carrier-to-noise ratio-altitude angle category unit by using the pseudo-range double-difference residual sequence, and generate a pseudo-range error sub-array corresponding to each satellite system by using the pseudo-range error parameter of each system carrier-to-noise ratio-altitude angle category unit; and determine a pseudo-range error sub-array corresponding to each satellite system as the pseudo-range error array to which the first terminal and the second terminal collectively correspond.

In some embodiments of this application, the receiver data includes: coordinate data.

The array calibration module 4552 is further configured to calculate a pseudo-range double-difference residual value of a satellite combination by using the time information, the coordinate data, the geometric parameters, and the matched satellite parameters, the satellite combination being composed of each satellite in the collectively observed satellites and a reference satellite of each satellite; determine at least two target pseudo-range double-difference residual values for each system carrier-to-noise ratio-altitude angle category unit from the pseudo-range double-difference residual value of the satellite combination according to the carrier-to-noise ratio and the altitude angle of each satellite; and generate the pseudo-range double-difference residual sequence by using the at least two target pseudo-range double-difference residual values.

In some embodiments of this application, the matched satellite parameters include: coordinates and an operating speed of each satellite and coordinates and an operating speed of a reference satellite of each satellite.

The array calibration module 4552 is further configured to calculate first coordinates of the first terminal and second coordinates of the second terminal according to the coordinate data and the geometric parameters; calculate a first operating speed of the first terminal and a second operating speed of the second terminal according to the time information, the coordinate data, and the geometric parameters; construct a double-difference observation value of the satellite combination based on the first coordinates, the first operating speed, the second coordinates, the second operating speed, the coordinates of each satellite, the operating speed of each satellite, the coordinates of the reference satellite of each satellite, and the operating speed of the reference satellite of each satellite; construct a first pseudo-range residual factor according to the first coordinates, the second coordinates, the coordinates of each satellite, and the coordinates of the reference satellite of each satellite; construct a second pseudo-range residual factor based on the first coordinates, the second coordinates, the coordinates of each satellite, the coordinates of the reference satellite of each satellite, the operating speed of each satellite, and the operating speed of the reference satellite of each satellite; and successively subtract the double-difference observation value, the first pseudo-range residual factor, and the second pseudo-range residual factor to obtain a pseudo-range double-difference residual value of the satellite combination.

In some embodiments of this application, the array calibration module 4552 is further configured to extract a maximum system carrier-to-noise ratio and a maximum system altitude angle corresponding to each satellite system from the carrier-to-noise ratios and the altitude angles of the collectively observed satellites; and divide the maximum system carrier-to-noise ratio and the maximum system altitude angle according to a carrier-to-noise ratio interval and an altitude angle interval to obtain the plurality of system carrier-to-noise ratio-altitude angle category units.

In some embodiments of this application, the pseudo-range error parameter is: a pseudo-range variance value or a pseudo-range standard deviation value. The pseudo-range double-difference residual sequence includes: at least two target pseudo-range double-difference residual values.

The array calibration module 4552 is further configured to perform variance calculation on the at least two target pseudo-range double-difference residual values to obtain a pseudo-range variance value corresponding to each system carrier-to-noise ratio-altitude angle category unit, and generate a pseudo-range error sub-array corresponding to each satellite system by using the pseudo-range variance value corresponding to each system carrier-to-noise ratio-altitude angle category unit; or, perform standard deviation calculation on the at least two target pseudo-range double-difference residual values to obtain a pseudo-range standard deviation value corresponding to each system carrier-to-noise ratio-altitude angle category unit, and generate a pseudo-range error sub-array corresponding to each satellite system by using the pseudo-range standard deviation value corresponding to each system carrier-to-noise ratio-altitude angle category unit.

In some embodiments of this application, the array calibration module 4552 is further configured to extract, from the terminal data, time information corresponding to each epoch, a carrier-to-noise ratio and an altitude angle of a satellite observed by the first terminal of each epoch, and a carrier-to-noise ratio and an altitude angle of a satellite observed by the second terminal of each epoch; calibrate a first Doppler error sub-array of the first terminal according to the carrier-to-noise ratio and the altitude angle of the satellite observed by the first terminal, the receiver data, the geometric parameters, the time information, and the first satellite parameters; calibrate a second Doppler error sub-array of the second terminal by using the carrier-to-noise ratio and the altitude angle of the satellite observed by the second terminal, the receiver data, the geometric parameters, the time information, and the second satellite parameters; and fuse the first Doppler error sub-array and the second Doppler error sub-array to obtain a Doppler error array to which the first terminal and the second terminal collectively correspond.

In some embodiments of this application, the array calibration module 4552 is further configured to extract a maximum first carrier-to-noise ratio and a maximum first altitude angle from the carrier-to-noise ratio and the altitude angle of the satellite observed by the first terminal; grid the maximum first carrier-to-noise ratio and the maximum first altitude angle according to a carrier-to-noise ratio interval and an altitude angle interval to obtain a plurality of first carrier-to-noise ratio-altitude angle category units; respectively determine first Doppler single-difference residual sequences for the plurality of first carrier-to-noise ratio-altitude angle category units according to the carrier-to-noise ratio and the altitude angle of the satellite observed by the first terminal, the receiver data, the geometric parameters, the time information, and the first satellite parameters; and calculate first Doppler error parameters respectively corresponding to the plurality of first carrier-to-noise ratio-altitude angle category units by using the first Doppler single-difference residual sequences, and generate a first Doppler error sub-array of the first terminal by using the first Doppler error parameters of the plurality of first carrier-to-noise ratio-altitude angle category units.

In some embodiments of this application, the array calibration module 4552 is further configured to respectively extract a maximum second carrier-to-noise ratio and a maximum second altitude angle corresponding to the second terminal from the carrier-to-noise ratio and the altitude angle of the satellite observed by the second terminal; grid the maximum second carrier-to-noise ratio and the maximum second altitude angle according to a carrier-to-noise ratio interval and an altitude angle interval to obtain a plurality of second carrier-to-noise ratio-altitude angle category units; respectively determine second Doppler single-difference residual sequences for the plurality of second carrier-to-noise ratio-altitude angle category units according to the carrier-to-noise ratios and the altitude angles of all the satellites observed by the second terminal, the receiver data, the geometric parameters, the time information, and the second satellite parameters; and calculate second Doppler error parameters respectively corresponding to the plurality of second carrier-to-noise ratio-altitude angle category units according to the second Doppler single-difference residual sequences, and generate a second Doppler error sub-array of the second terminal by using the second Doppler error parameters of each of the second carrier-to-noise ratio-altitude angle category units.

In some embodiments of this application, the receiver data includes: coordinate data. The array calibration module 4552 is further configured to: calculate a first Doppler single-difference residual value corresponding to a combination of each first satellite and the reference satellite of each first satellite based on the coordinate data, the geometric parameters, the time information, and the first satellite parameters; select at least two first matched Doppler single-difference residual values corresponding to each first carrier-to-noise ratio-altitude angle category unit from the first Doppler single-difference residual value corresponding to the combination of each first satellite and the reference satellite of each first satellite according to the carrier-to-noise ratio and the first altitude angle of the satellite observed by the first terminal; and constitute the first Doppler single-difference residual sequence by using the at least two first matched Doppler single-difference residual values.

In some embodiments of this application, the receiver data includes: coordinate data. The array calibration module 4552 is further configured to calculate a second Doppler single-difference residual value corresponding to a combination of each second satellite and the reference satellite of each second satellite by using the coordinate data, the geometric parameters, and the second satellite parameters; select at least two second matched Doppler single-difference residual values corresponding to each second carrier-to-noise ratio-altitude angle category unit from the second Doppler single-difference residual value corresponding to the combination of each second satellite and the reference satellite of each second satellite according to the carrier-to-noise ratio and the altitude angle observed by the second terminal; and generate the second Doppler single-difference residual sequence by using the at least two second matched Doppler single-difference residual values.

In some embodiments of this application, the error model calibration apparatus 455 further includes: a model storage module 4554. The model storage module 4554 is configured to store, after fitting pseudo-range error models of the at least two terminals by using the pseudo-range error array and fitting Doppler error models of the at least two terminals by using the Doppler error array, the pseudo-range error models and the Doppler error models in the at least two terminals.

An example structure of the error model-based positioning apparatus 555 according to the embodiments of this application being implemented as a software module is continuously described below. In some embodiments, as shown in FIG. 2B, the software module in the error model-based positioning apparatus 555 stored in the second memory 550 may include:

a model acquisition module 5551, configured to acquire, when a trigger operation is received in a map interface, a pseudo-range error model and a Doppler error model in response to the trigger operation, the pseudo-range error model being obtained by fitting a pseudo-range error array, the Doppler error model being obtained by fitting a Doppler error array, and the pseudo-range error array and the Doppler error array being determined by an electronic device based on observation data collected by a calibration device, satellite data corresponding to the observation data, and geometric parameters of the calibration device;

a position determination module 5552, configured to determine a current position based on the pseudo-range error model, the Doppler error model, and collected current observation data;

a map acquisition module 5553, configured to acquire map information within a position region where the current position is located from a map information database; and a map display module 5554, configured to display the map information on the map interface, and present a positioning identifier on the current position.

According to some embodiments of this application, a computer program product or a computer program is provided, the computer program product or the computer program including computer instructions, the computer instructions being stored in a non-transitory computer-readable storage medium. A processor of a computer device reads the computer instructions from the non-transitory computer-readable storage medium, and executes the computer instructions, to cause the computer device to perform the error model calibration method in the embodiment of this application.

An embodiment of this application provides a non-transitory computer-readable storage medium storing an executable instruction. When the executable instruction is executed by a first processor, the first processor is caused to perform the error model calibration method provided by the electronic device side in the embodiments of this application, when the executable instruction is executed by a second processor, the second processor is caused to perform the error model-based positioning method provided by the electronic device side in the embodiments of this application.

In some embodiments, the non-transitory computer-readable storage medium may be a memory such as an FRAM, a ROM, a PROM, an EPROM, an EEPROM, a flash memory, a magnetic surface memory, an optical disk, or a CD-ROM; or may be any device including one of or any combination of the foregoing memories.

In an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

The foregoing descriptions are merely embodiments of this application and are not intended to limit the protection scope of this application. Any modification, equivalent replacement, or improvement made without departing from the spirit and range of this application shall fall within the protection scope of this application.

What is claimed is:

1. An error model calibration method comprising:
receiving observation data collected by a calibration device, the calibration device comprising at least two terminals;
acquiring satellite data based on the observation data;
calibrating a pseudo-range error array and a Doppler error array based on the observation data, the satellite data, and geometric parameters of the calibration device for the at least two terminals, wherein the pseudo-range error array describes a discrete distribution of pseudo-range measurement errors of the at least two terminals under a carrier-to-noise ratio and an altitude angle of a satellite, and the Doppler error array describes a discrete distribution of Doppler measurement errors of the at least two terminals under the carrier-to-noise ratio and the altitude angle of the satellite;

fitting respective pseudo-range error models corresponding to the at least two terminals using the pseudo-range error array; and fitting respective Doppler error models corresponding to the at least two terminals using the Doppler error array and the pseudo-range error models, the Doppler error models collectively configured to position the at least two terminals.

2. The method according to claim 1, the at least two terminals comprising a first terminal and a second terminal, and the observation data comprising sub-observation data of each epoch in a plurality of epochs, and the calibrating a pseudo-range error array and a Doppler error array, comprising:

calibrating a pseudo-range error array collectively corresponding to the first terminal and the second terminal based on the sub-observation data of each epoch, the geometric parameters, and matched satellite parameters of each epoch in the satellite data, the matched satellite parameters comprising parameters of satellites collectively observed by the first terminal and the second terminal, and parameters of reference satellites of the collectively observed satellites; and calibrating a Doppler error array collectively corresponding to the first terminal and the second terminal based on the sub-observation data corresponding to each epoch, the geometric parameters, and first satellite parameters and second satellite parameters of each epoch in the satellite data, the first satellite parameters comprising parameters of a first satellite observed by the first terminal and parameters of a reference satellite of the first satellite, and the second satellite parameters comprising parameters of a second satellite observed by the second terminal and parameters of a reference satellite of the second satellite.

3. The method according to claim 2, the calibration device comprising at least two satellite receivers, the sub-observation data of each epoch comprising terminal data collected by the first terminal and the second terminal, receiver data collected by the at least two satellite receivers, and time information of each epoch; and the calibrating a pseudo-range error array collectively corresponding to the first terminal and the second terminal comprising:

extracting carrier-to-noise ratios and altitude angles of one or more satellites collectively observed by the first terminal and the second terminal, the one or more satellites being part of one or more satellite systems;

gridding, for each satellite system of the of the one or more satellite systems, a plurality of system carrier-to-noise ratio-altitude angle category units based on the carrier-to-noise ratios and the altitude angles of the one or more satellites;

determining a corresponding pseudo-range double-difference residual sequence for each satellite system carrier-to-noise ratio-altitude angle category unit based on the time information, the receiver data, the geometric parameters, and the matched satellite parameters;

calculating a pseudo-range error parameter of each system carrier-to-noise ratio-altitude angle category unit using the pseudo-range double-difference residual sequence;

generating a pseudo-range error sub-array corresponding to each satellite system using the pseudo-range error parameter of each system carrier-to-noise ratio-altitude angle category unit; and determining a pseudo-range error sub-array corresponding to each satellite system as the pseudo-range error array to which the first terminal and the second terminal collectively correspond.

4. The method according to claim 3, the receiver data comprising coordinate data, and the determining a corresponding pseudo-range double-difference residual sequence comprising:

calculating a pseudo-range double-difference residual value of a satellite combination using the time information, the coordinate data, the geometric parameters, and the matched satellite parameters, the satellite combination comprising the one or more satellites and a reference satellite for each of the one or more satellites;

determining at least two target pseudo-range double-difference residual values for each system carrier-to-noise ratio-altitude angle category unit from the pseudo-range double-difference residual value of the satellite combination based on the carrier-to-noise ratio and the altitude angle of the one or more satellites; and generating the pseudo-range double-difference residual sequence using the at least two target pseudo-range double-difference residual values.

5. The method according to claim 4, the matched satellite parameters comprising coordinates and an operating speed of each satellite and coordinates and an operating speed of a reference satellite of each satellite; and the calculating the pseudo-range double-difference residual value of a satellite combination comprising:

calculating first coordinates of the first terminal and second coordinates of the second terminal based on the coordinate data and the geometric parameters;

calculating a first operating speed of the first terminal and a second operating speed of the second terminal based on the time information, the coordinate data, and the geometric parameters;

constructing a double-difference observation value of the satellite combination based on the first coordinates, the first operating speed, the second coordinates, the second operating speed, the coordinates of each satellite, the operating speed of the one or more satellites, the coordinates of the reference satellite for each of the one or more satellites, and the operating speed of the reference satellite for each of the one or more satellites;

constructing a first pseudo-range residual factor based on the first coordinates, the second coordinates, the coordinates of each satellite, and the coordinates of the reference satellite for each of the one or more satellites;

constructing a second pseudo-range residual factor based on the first coordinates, the second coordinates, the coordinates of each satellite, the coordinates of the reference satellite for each of the one or more satellites, the operating speed of each of the one or more satellites, and the operating speed of the reference satellite for each of the one or more satellites; and successively subtracting the double-difference observation value, the first pseudo-range residual factor, and the second pseudo-range residual factor to obtain a pseudo-range double-difference residual value of the satellite combination.

6. The method according to claim 3, the gridding comprising:
    extracting a maximum system carrier-to-noise ratio and a maximum system altitude angle corresponding to each satellite system from the carrier-to-noise ratios and the altitude angles of the one or more satellites collectively observed; and
    dividing the maximum system carrier-to-noise ratio and the maximum system altitude angle based on a carrier-to-noise ratio interval and an altitude angle interval to obtain the plurality of system carrier-to-noise ratio-altitude angle category units.

7. The method according to claim 3, wherein the pseudo-range error parameter is a pseudo-range variance value or a pseudo-range standard deviation value, and the pseudo-range double-difference residual sequence comprising: at least two target pseudo-range double-difference residual values; and
    the calculating the pseudo-range error parameter comprising:
        performing a variance calculation on the at least two target pseudo-range double-difference residual values to obtain a pseudo-range variance value corresponding to each system carrier-to-noise ratio-altitude angle category unit, and generating a pseudo-range error sub-array corresponding to each satellite system using the pseudo-range variance value corresponding to each system carrier-to-noise ratio-altitude angle category unit; or,
        performing a standard deviation calculation on the at least two target pseudo-range double-difference residual values to obtain a pseudo-range standard deviation value corresponding to each system carrier-to-noise ratio-altitude angle category unit, and generating a pseudo-range error sub-array corresponding to each satellite system using the pseudo-range standard deviation value corresponding to each system carrier-to-noise ratio-altitude angle category unit.

8. The method according to claim 3, the calibrating a Doppler error array comprising:
    extracting, from the terminal data, time information corresponding to each epoch, a carrier-to-noise ratio and an altitude angle of the first satellite observed by the first terminal, and a carrier-to-noise ratio and an altitude angle of the second satellite observed by the second terminal;
    calibrating a first Doppler error sub-array of the first terminal according to the carrier-to-noise ratio and the altitude angle of the first satellite observed by the first terminal, the receiver data, the geometric parameters, the time information, and the first satellite parameters;
    calibrating a second Doppler error sub-array of the second terminal using the carrier-to-noise ratio and the altitude angle of the second satellite observed by the second terminal, the receiver data, the geometric parameters, the time information, and the second satellite parameters; and
    fusing the first Doppler error sub-array and the second Doppler error sub-array to obtain a Doppler error array to which the first terminal and the second terminal collectively correspond.

9. The method according to claim 8, the calibrating a first Doppler error sub-array of the first terminal comprising:
    extracting a maximum first carrier-to-noise ratio and a maximum first altitude angle from the carrier-to-noise ratio and the altitude angle of the first satellite;
    gridding the maximum first carrier-to-noise ratio and the maximum first altitude angle according to a carrier-to-noise ratio interval and an altitude angle interval to obtain a plurality of first carrier-to-noise ratio-altitude angle category units;
    respectively determining first Doppler single-difference residual sequences for the plurality of first carrier-to-noise ratio-altitude angle category units based on the carrier-to-noise ratio and the altitude angle of the first satellite, the receiver data, the geometric parameters, the time information, and the first satellite parameters; and
    calculating first Doppler error parameters respectively corresponding to the plurality of first carrier-to-noise ratio-altitude angle category units by using the first Doppler single-difference residual sequences, and generating a first Doppler error sub-array of the first terminal using the first Doppler error parameters of the plurality of first carrier-to-noise ratio-altitude angle category units.

10. The method according to claim 8, the calibrating a second Doppler error sub-array of the second terminal comprising:
    extracting a maximum second carrier-to-noise ratio and a maximum second altitude angle from the carrier-to-noise ratio and the altitude angle of the second satellite;
    gridding the maximum second carrier-to-noise ratio and the maximum second altitude angle according to a carrier-to-noise ratio interval and an altitude angle interval to obtain a plurality of second carrier-to-noise ratio-altitude angle category units;
    respectively determining second Doppler single-difference residual sequences for the plurality of second carrier-to-noise ratio-altitude angle category units based on the carrier-to-noise ratio and the altitude angle of the second satellite, the receiver data, the geometric parameters, the time information, and the second satellite parameters; and
    calculating second Doppler error parameters respectively corresponding to the plurality of second carrier-to-noise ratio-altitude angle category units based on the second Doppler single-difference residual sequences, and generating a second Doppler error sub-array of the second terminal using the second Doppler error parameters of the plurality of second carrier-to-noise ratio-altitude angle category units.

11. The method according to claim 9, the receiver data comprising coordinate data, and the respectively determining the first Doppler single-difference residual sequences comprising:
    calculating a first Doppler single-difference residual value corresponding to a combination of the first satellite and the reference satellite for the first satellite based on the coordinate data, the geometric parameters, the time information, and the first satellite parameters;
    selecting at least two first matched Doppler single-difference residual values corresponding to each first carrier-to-noise ratio-altitude angle category unit from the first Doppler single-difference residual value corresponding to the combination of the first satellite and the reference satellite for the first satellite based on the carrier-to-noise ratio and the altitude angle of the satellite observed by the first terminal; and
    generating the first Doppler single-difference residual sequence using the at least two first matched Doppler single-difference residual values.

12. The method according to claim 10, the receiver data comprising coordinate data and the respectively determining second Doppler single-difference residual sequences comprising:

calculating a second Doppler single-difference residual value corresponding to a combination of the second satellite and the reference satellite for the second satellite based on the coordinate data, the geometric parameters, and the second satellite parameters;

selecting at least two second matched Doppler single-difference residual values corresponding to each second carrier-to-noise ratio-altitude angle category unit from the second Doppler single-difference residual value corresponding to the combination of the second satellite and the reference satellite for the second satellite based on the carrier-to-noise ratio and the altitude angle of the satellite observed by the second terminal; and generating the second Doppler single-difference residual sequence using the at least two second matched Doppler single-difference residual values.

13. The method according to claim 1, further comprising: storing both the pseudo-range error models and the Doppler error models in the at least two terminals.

14. The method according to claim 1, the calibration device comprising a first terminal, a second terminal, a first satellite receiver, a second satellite receiver, a fixing device, and a fixing plate; the first terminal and the second terminal having the same model;

the first terminal, the second terminal, the first satellite receiver, and the second satellite receiver being fixed on the fixing plate through the fixing device; and a phase center of the first terminal, a phase center of the second terminal, a phase center of the first satellite receiver, and a phase center of the second satellite receiver all remaining on the same straight line.

15. A non-transitory computer-readable storage medium according to claim 1, storing at least one instruction, at least one program, a code set, or an instruction set, the at least one instruction, the at least one program, the code set, or the instruction set being loaded and executed by at least one processor, causing the at least one processor to perform the error model calibration method.

16. An error model calibration apparatus comprising at least one processor and at least one memory, the at least one memory storing computer-readable instructions, the computer-readable instructions, when executed by the at least one processor, causing the at least one processor to:

receive observation data collected by a calibration device, the calibration device comprising at least two terminals;

acquire satellite data according to the observation data;

calibrate a pseudo-range error array and a Doppler error array based on the observation data, the satellite data, and geometric parameters of the calibration device, wherein the pseudo-range error array describes a discrete distribution of pseudo-range measurement errors of the at least two terminals under a carrier-to-noise ratio and an altitude angle of a satellite, and the Doppler error array describing a discrete distribution of Doppler measurement errors of the at least two terminals under the carrier-to-noise ratio and the altitude angle of the satellite;

fit respective pseudo-range error models corresponding to the at least two terminals using the pseudo-range error array; and fit respective Doppler error models corresponding to the at least two terminals using the Doppler error array and the pseudo-range error models, the Doppler error models collectively configured to position the at least two terminals.

17. The error model calibration apparatus according to claim 16, wherein the at least two terminals comprise a first terminal and a second terminal, and the observation data comprises sub-observation data of each epoch in a plurality of epochs, and the calibrate a pseudo-range error array and a Doppler error array is further configured to:

calibrate a pseudo-range error array collectively corresponding to the first terminal and the second terminal based on the sub-observation data of each epoch, the geometric parameters, and matched satellite parameters of each epoch in the satellite data, the matched satellite parameters comprising parameters of satellites collectively observed by the first terminal and the second terminal, and parameters of reference satellites of the collectively observed satellites; and calibrate a Doppler error array collectively corresponding to the first terminal and the second terminal based on the sub-observation data corresponding to each epoch, the geometric parameters, and first satellite parameters and second satellite parameters of each epoch in the satellite data, the first satellite parameters comprising parameters of a first satellite observed by the first terminal and parameters of a reference satellite of the first satellite, and the second satellite parameters comprising parameters of a second satellite observed by the second terminal and parameters of a reference satellite of the second satellite.

18. The error calibration apparatus according to claim 16, wherein the calibration device comprises at least two satellite receivers, the sub-observation data of each epoch comprises terminal data collected by the first terminal and the second terminal, receiver data collected by the at least two satellite receivers, and time information of each epoch; and the calibrate a pseudo-range error array collectively corresponding to the first terminal and the second terminal if further configured to:

extract carrier-to-noise ratios and altitude angles of one or more satellites collectively observed by the first terminal and the second terminal, the one or more satellites being part of one or more satellite systems;

grid, for each satellite system of the of the one or more satellite systems, a plurality of system carrier-to-noise ratio-altitude angle category units based on the carrier-to-noise ratios and the altitude angles of the one or more satellites;

determine a corresponding pseudo-range double-difference residual sequence for each satellite system carrier-to-noise ratio-altitude angle category unit based on the time information, the receiver data, the geometric parameters, and the matched satellite parameters;

calculate a pseudo-range error parameter of each system carrier-to-noise ratio-altitude angle category unit using the pseudo-range double-difference residual sequence;

generate a pseudo-range error sub-array corresponding to each satellite system using the pseudo-range error parameter of each system carrier-to-noise ratio-altitude angle category unit; and determine a pseudo-range error sub-array corresponding to each satellite system as the pseudo-range error array to which the first terminal and the second terminal collectively correspond.

* * * * *